(12) United States Patent
Sharma

(10) Patent No.: US 7,848,972 B1
(45) Date of Patent: Dec. 7, 2010

(54) ELECTRONIC BILL PRESENTMENT AND PAYMENT SYSTEMS AND PROCESSES

(75) Inventor: Dushyant Sharma, Richmond Hill (CA)

(73) Assignee: Metavante Corporation, Milwaukee, WI (US)

( * ) Notice: Subject to any disclaimer, the term of this patent is extended or adjusted under 35 U.S.C. 154(b) by 902 days.

(21) Appl. No.: 09/543,938

(22) Filed: Apr. 6, 2000

(51) Int. Cl.
*G06F 17/20* (2006.01)

(52) U.S. Cl. .............................. 705/34; 705/35; 705/37; 705/40

(58) Field of Classification Search ................... 700/40, 700/34, 42, 35, 37
See application file for complete search history.

(56) References Cited

U.S. PATENT DOCUMENTS

| | | |
|---|---|---|
| 3,653,480 A | 4/1972 | Yamamoto et al. |
| 3,833,885 A | 9/1974 | Gentile et al. |
| 4,277,837 A | 7/1981 | Stuckert |
| 4,315,101 A | 2/1982 | Atalla |
| 4,317,957 A | 3/1982 | Sendrow |
| 4,322,613 A | 3/1982 | Oldenkamp |
| 4,420,751 A | 12/1983 | Paganini et al. |
| 4,454,414 A | 6/1984 | Benton |
| 4,460,960 A | 7/1984 | Anderson et al. |
| 4,544,834 A | 10/1985 | Newport et al. |
| 4,634,845 A | 1/1987 | Hale et al. |
| 4,649,563 A | 3/1987 | Riskin |
| 4,678,895 A | 7/1987 | Tateisi et al. |
| 4,689,478 A | 8/1987 | Hale et al. |

(Continued)

FOREIGN PATENT DOCUMENTS

WO    WO99/05628    2/1999

(Continued)

OTHER PUBLICATIONS

Yahoo.com (Nov. 29, 2000).

(Continued)

*Primary Examiner*—Evens J Augustin
(74) *Attorney, Agent, or Firm*—Reinhart Boerner Van Deuren S.C.

(57) ABSTRACT

EBPP systems and processes which employ a common document model/data model to accommodate the interests and preferences of billers, customers, financial institutions, other EBPP organizations and others in the context of EBPP specifically and electronic commerce more generally. The common document model/data model allows the biller to outsource billing activities to the EBPP organization while retaining control over the billing information or how or where bills will be presented. Billers are incentivized to use the system because they avoid the expense and effort of building a customized system in house, but get the same advantages of an in house system while leveraging the expertise of an outside EBPP organization who operates across a range of industries, customers, geographical locations and financial fields. The systems also allow billers enhanced opportunities to build brand and customer relationships not offered in paper-based billing systems. Customers are incentivized to use the system because they can pay all or most all of their bills in one place, the place of their choice with bills presented how they choose, and because they may communicate more effectively with billers if and when things go wrong rather than wasting inordinate time on the telephone attempting to sort things out with uninformed people as is often the case in paper based billing systems where the relevant data never seems to catch up with the biller's customer service personnel. The result is a ubiquitous EBPP presence that makes everyone's life easier and better by reducing bill generation and payment burdens.

44 Claims, 78 Drawing Sheets

U.S. PATENT DOCUMENTS

| | | | |
|---|---|---|---|
| 4,695,880 A | 9/1987 | Johnson et al. | |
| 4,711,993 A | 12/1987 | Kosednar et al. | |
| 4,713,761 A | 12/1987 | Sharpe et al. | |
| 4,727,243 A | 2/1988 | Savar | |
| 4,734,858 A | 3/1988 | Schlafly | |
| 4,799,156 A | 1/1989 | Shavit et al. | |
| 4,823,264 A | 4/1989 | Deming | |
| 4,859,837 A | 8/1989 | Halpern | |
| 4,870,260 A | 9/1989 | Niepolomski et al. | |
| 4,922,646 A | 5/1990 | Basgal | |
| 4,947,028 A | 8/1990 | Gorog | |
| 4,987,538 A * | 1/1991 | Johnson et al. | 705/2 |
| 5,007,084 A | 4/1991 | Materna et al. | |
| 5,025,373 A | 6/1991 | Keyser, Jr. et al. | |
| 5,097,115 A | 3/1992 | Ogasawara et al. | |
| 5,121,945 A | 6/1992 | Thomson et al. | |
| 5,168,151 A | 12/1992 | Nara | |
| 5,179,584 A | 1/1993 | Tsumura | |
| 4,947,028 A | 6/1993 | Gorog | |
| 5,220,501 A | 6/1993 | Lawlor et al. | |
| 5,231,571 A | 7/1993 | D'Agostino | |
| 5,265,033 A | 11/1993 | Vajk et al. | |
| 5,283,829 A | 2/1994 | Anderson | |
| 5,287,270 A | 2/1994 | Hardy et al. | |
| 5,317,137 A | 5/1994 | Wilkins | |
| 5,325,290 A | 6/1994 | Cauffman et al. | |
| 5,326,959 A | 7/1994 | Perazza | |
| 5,336,870 A | 8/1994 | Hughes et al. | |
| 5,341,429 A | 8/1994 | Stringer et al. | |
| 5,347,632 A | 9/1994 | Filepp et al. | |
| 5,383,113 A | 1/1995 | Kight et al. | |
| 5,420,405 A | 5/1995 | Chasek | |
| 5,424,938 A | 6/1995 | Wagner et al. | |
| 5,465,206 A | 11/1995 | Hilt et al. | |
| 5,473,143 A | 12/1995 | Vak et al. | |
| 5,483,445 A | 1/1996 | Pickering | |
| 5,504,677 A | 4/1996 | Pollin | |
| 5,544,086 A | 8/1996 | Davis et al. | |
| 5,557,518 A | 9/1996 | Rosen | |
| 5,572,004 A | 11/1996 | Raimann | |
| 5,594,910 A | 1/1997 | Filepp et al. | |
| 5,636,346 A * | 6/1997 | Saxe | 705/1 |
| 5,649,117 A | 7/1997 | Landry | |
| 5,652,786 A | 7/1997 | Rogers | |
| 5,655,089 A | 8/1997 | Bucci | |
| 5,671,285 A | 9/1997 | Newman | |
| 5,699,528 A * | 12/1997 | Hogan | 705/40 |
| 5,710,889 A | 1/1998 | Clark et al. | |
| 5,717,868 A | 2/1998 | James | |
| 5,727,249 A | 3/1998 | Pollin | |
| 5,729,693 A | 3/1998 | Holda-Fleck | |
| 5,745,886 A | 4/1998 | Rosen | |
| 5,787,403 A | 7/1998 | Randle | |
| 5,815,665 A | 9/1998 | Teper et al. | |
| 5,832,460 A | 11/1998 | Bednar et al. | |
| 5,845,267 A | 12/1998 | Ronen | |
| 5,848,400 A | 12/1998 | Chang | |
| 5,884,290 A | 3/1999 | Clark et al. | |
| 5,890,140 A | 3/1999 | Clark et al. | |
| 5,903,721 A | 5/1999 | Sixtus | |
| 5,903,732 A | 5/1999 | Reed et al. | |
| 5,905,976 A | 5/1999 | Mjolsnes et al. | |
| 5,920,847 A * | 7/1999 | Kolling et al. | 705/40 |
| 5,930,759 A | 7/1999 | Moore et al. | |
| 5,943,656 A | 8/1999 | Crooks et al. | |
| 5,956,695 A | 9/1999 | Carrithers et al. | |
| 5,956,700 A | 9/1999 | Landry | |
| 5,963,925 A * | 10/1999 | Kolling et al. | 705/40 |
| 5,978,780 A | 11/1999 | Watson | |
| 6,029,151 A | 2/2000 | Nikander | |
| 6,032,133 A * | 2/2000 | Hilt et al. | 705/40 |
| 6,044,362 A | 3/2000 | Neely | |
| 6,052,457 A | 4/2000 | Abdelaal et al. | |
| 6,058,380 A | 5/2000 | Anderson et al. | |
| 6,065,012 A | 5/2000 | Balsara et al. | |
| 6,070,150 A * | 5/2000 | Remington et al. | 705/34 |
| 6,072,870 A | 6/2000 | Nguyen et al. | |
| 6,078,907 A * | 6/2000 | Lamm | 705/40 |
| 6,085,177 A | 7/2000 | Semple et al. | |
| 6,097,834 A | 8/2000 | Krouse et al. | |
| 6,098,053 A | 8/2000 | Slater | |
| 6,119,106 A | 9/2000 | Mersky et al. | |
| 6,119,107 A | 9/2000 | Polk | |
| 6,119,109 A | 9/2000 | Muratani et al. | |
| 6,122,625 A | 9/2000 | Rosen | |
| 6,128,603 A * | 10/2000 | Dent et al. | 705/33 |
| 6,173,272 B1 * | 1/2001 | Thomas et al. | 705/42 |
| 6,289,322 B1 * | 9/2001 | Kitchen et al. | 705/34 |
| 6,292,789 B1 * | 9/2001 | Schutzer | 705/34 |
| 6,304,857 B1 * | 10/2001 | Heindel et al. | 705/34 |
| 6,381,584 B1 | 4/2002 | Ogram | |
| 6,385,595 B1 * | 5/2002 | Kolling et al. | 705/40 |
| 7,072,858 B1 * | 7/2006 | Litzow et al. | 705/26 |
| 7,146,332 B2 * | 12/2006 | Owen, Jr. | 705/30 |
| 7,263,503 B1 * | 8/2007 | Phibbs, Jr. | 705/35 |
| 7,280,979 B1 * | 10/2007 | Katz et al. | 705/26 |
| 7,308,427 B1 * | 12/2007 | Hood | 705/35 |
| 7,321,869 B1 * | 1/2008 | Phibbs, Jr. | 705/30 |
| 7,349,874 B1 * | 3/2008 | Hood | 705/35 |
| 7,349,875 B1 * | 3/2008 | Hood et al. | 705/35 |
| 7,364,068 B1 * | 4/2008 | Strubbe et al. | 235/376 |
| 2002/0026394 A1 * | 2/2002 | Savage et al. | 705/34 |
| 2002/0194125 A1 | 12/2002 | Shimada | |

FOREIGN PATENT DOCUMENTS

| | | |
|---|---|---|
| WO | WO99/07102 | 2/1999 |
| WO | WO99/10823 | 3/1999 |
| WO | WO99/13421 | 3/1999 |
| WO | WO99/15999 | 4/1999 |
| WO | WO 99/18529 | 4/1999 |
| WO | WO99/42944 | 8/1999 |
| WO | WO99/58339 | 11/1999 |
| WO | WO00/42551 | 7/2000 |
| WO | WO00/48085 | 8/2000 |
| WO | WO01/77938 | 10/2001 |
| WO | WO 02/14985 | 2/2002 |

OTHER PUBLICATIONS

CheckFree.com (Nov. 29, 2000).
Quicken.com (Nov. 29, 2000).
AOL.com (Nov. 29, 2000).
GO2Net.com (Nov. 29, 2000).
Oracle.com (Nov. 29, 2000).
Ebay.com (Nov. 29, 2000).
PalmPilot.com (Nov. 29, 2000).
CyberCash.com (Nov. 29, 2000).
BDOS.com (Nov. 29, 2000).
DocuLabs.com (Nov. 29, 2000).
Inetbiller.com (Nov. 29, 2000).
Quickbooks.com (Nov. 29, 2000).
MSMoney.com (Nov. 29, 2000).
Infoseek.com (Nov. 29, 2000).
PageMaker.com (Nov. 29, 2000).
Transpoint.com (Nov. 29, 2000).
Bluegill.com (Nov. 29, 2000).
Edocs.com (Nov. 29, 2000).
@Work.com (Nov. 29, 2000).
Billserv.com (Nov. 29, 2000).
InvoiceLink.com (Nov. 29, 2000).
Princeton.com (Nov. 29, 2000).
Just In Time.com (Nov. 29, 2000).
Intuit.com (Nov. 29, 2000).
Spectrum.com (Nov. 29, 2000).

Excite.com (Nov. 29, 2000).
Innovision.com (Nov. 29, 2000).
Edify.com (Nov. 29, 2000).
SecurityFirst.com (Nov. 29, 2000).
Corillian.com (Nov. 29, 2000).
NetCenter.com (Nov. 29, 2000).
Sharon Osberg, "Wells Fargo: Standards-Based Electronic Bill Presentment and Payment (EBPP)", Nov. 1999, XP-002192923.

Stoneman, B., Fitting It All Together, Banking Strategies, Mar./Apr. 2000, vol. 76, No. 2, pp. 50-58.
Hallerman, D., Banks Strike Back With an E-Bill Challenge, Bank Technology News, Aug. 1999.
No Author Name Given, Non-Bank Puts E-Payments at ATMs to the Test, Bank Network News, May 1999.

* cited by examiner

ABC UTILITY — Work Items | Communication | Quality Control | Administration
Customer Service | Marketing Tools | Operations Center | Reports

*Customer Service*

- Bills
- Accounts
- Customer Profile
- Enrollments
- Payment Instruments
- Schedule Payments
- E-mail
- Notes

CURRENT CUSTOMER:
NAME: John Smith
ADDRESS: 123 Main St.

SEARCH NEW CUSTOMER:
SEARCH BY: Account Number   GO

Customer Profile

| Field | Value |
|---|---|
| Last Name: | Jones |
| First Name: | Tom |
| User ID: | tjones |
| Account Number: | 112-548-9999 |
| Address: | 199 1st St. |
|  | Atlanta, GA 30303 |
| Soc Sec Number: | 293-775-5555 |
| E-mail: | tjones@hotmail.com |
| Telephone: | 404-555-5555 | powered by Derivio — Internet Billing that P...

© 1999 Derivion. All Rights Reserved.

| | Policy Number | Last Name | First Name | Address |
|---|---|---|---|---|
| ☑ | 411-076-029 | Smith, | John | 677 Cherry Street, 30222 |
| ☑ | 441-086-046 | Smith, | John | 677 Cherry Street, 30222 |
| ☑ | 412-054-299 | Smith, | John | 677 Cherry Street, 30222 |
| ☐ | 451-239-589 | Smith, | Guy | 089 Alpine Street, 28393 |
| ☐ | 414-329-849 | Smith, | Helm | 284 Nutts Street, 39830 |
| ☐ | 511-990-028 | Smyth, | Neil | 223 Northside Drive, 27303 |
| ☐ | 413-329-384 | Smyth, | Mike | 374 17th Street, 39384 |
| ☐ | 523-494-968 | Smyth, | Miller | 873 Wesley Street, 84984 |
| ☐ | 491-394-575 | Smyth, | Michelle | 908 Mine Street, 39449 |

ELECTRONIC BILL PRESENTMENT AND PAYMENT SYSTEMS AND PROCESSES

The present invention relates generally to electronic commerce, and more particularly to methods and systems for providing end-to-end electronic bill presentment and payment systems, processes and functionality.

BACKGROUND OF THE INVENTION

Some people think dealing with bills is not fun. They consider it a burden which they would love to lift from their shoulders or at least reduce. Billers do not like having to create and send them and bill payers do not like paying them. But billing consumers for goods and services has always been a necessary exercise and transaction cost of engaging in credit-based commerce. Traditional paper-based billing processes seek three major objectives: to (1) deliver bills to the customer base reliably (2) at minimum cost and (3) in a manner that causes quick payment. Although as reliable as the postal system, conventional paper-based billing is expensive and gives the customer a significant float thus depriving the biller of the time value of money. For example, a company with 100,000 accounts which are billed on a monthly basis may spend over two million dollars a year in paper-based billing expenses; a single paper based billing, transaction can cost between one and two dollars. Much of this expense stems from the cost of materials, printing, postage, and manual processing of the paper bills, inserts and envelopes.

The time delay associated with paper based billing can be particularly vexsome to small billers and non-recurrent billers who tend to rely more heavily on cash flow. For larger billers such as a utility whose average billed amount is $75 with a customer population of 100,000, the float assuming a 6 day round trip through the postal system and interest at the rate of 8% is more than $115,000 per year.

Paper-based billing can also deprive billers of an opportunity to build brand. Although many paper billers include various types of marketing inserts with their bills in an attempt to use the billing activity as an additional opportunity to build brand and customer relationships, those materials cannot be targeted as effectively as in an interactive session. For instance, billers do not have significant realistic control over the circumstances under which, or whether, a consumer views particular inserts. In fact, studies have shown that many consumers disregard such inserts altogether.

Electronic bill presentment and payment (EBPP) arose with the advent of the Internet because it addresses three needs of billers. First, it reduces billing cost. Second, it allows more effective marketing through the billing process than paper-based billing. Third, it allows better customer relationship management than with paper-based billing. Instead of preparing and mailing paper bills, EBPP enables businesses to publish, distribute and/or present bills electronically on web pages. Instead of writing checks and applying stamps, consumers have the opportunity to pay bills such as by an electronic credit card charge or direct bank draft. The biller benefits by avoiding the cost of generating and mailing paper bills, and by avoiding the payment float occasioned by two-way mail delay and other delays in paper-based remittance. The customer benefits with the added convenience of conducting transactions online, and the opportunity to pay many or all bills on one site or in one virtual space. The biller has the opportunity to present customized content on the screenface with the bill, without having to foot the extra printing and insertion cost associated with paper inserts. The biller can stay in closer communication with the customer via electronic mail and other electronic techniques, and can communicate interactively.

Nothing is free, however, and there are costs associated with moving from paper-based billing to EBPP. EBPP in any event presents significant hardware, software, security and storage issues, as well as significant human resources issues. Outsourcing these issues is a viable alternative for an organization that does not desire to custom build a proprietary EBPP function or whose size or economic base does not cost justify such an in-house solution, but outsourcing always sacrifices control of the system, of where and how the bills are presented, and over the potential to build brand and customer relationships through the billing process. In short, across the population of various types of conventional EBPP architectures and systems, there is always a tradeoff between complexity and control over the process. In-house systems tend to be complex and expensive, but give maximum real time control over the process. Outsourcing solutions can be less expensive to pursue, but conventionally only by giving up significant real time control.

Real time control over the billing process is of massive importance, because it allows building of brand and customer relationships. For example, special discounts can be applied online in real time if the customer pays in a certain period, and the account immediately adjusted and balanced. Specially targeted inserts can be presented on screen with the bill according to a particular group in which the customer fits, where he or she is geographically located, or according to any other desired demographic data or category. Time sensitive content can be displayed with the bill, such as promotions relating to events which occur on certain days, limited time only sales or marketing efforts, or any other time sensitive information which obviously needs to be added, deleted or supplanted when the relevant time starts or expires.

In one common approach to EBPP, for example, which is often referred to as the custom development method, billers create a proprietary electronic billing system and link it to a third-party for payment processing. Because custom development is mostly an internal EBPP solution, it gives billers the advantage of tight control over the billing system. However, this type of solution is expensive. Not only is it a technology risk because billers lose the flexibility to adapt to other EBPP standards, but it also requires a substantial commitment of manpower, infrastructure and consultant resources for planning, development and implementation. Among other things, merely obtaining a license to run the relational database application for managing billing information is often viewed as prohibitive, especially for smaller billers. Furthermore, such systems innately discourage consumer use or popularity, since the consumer is required to log onto and initiate a session on a separate site, with different passwords and different logon procedures, for each different bill the consumer wishes to pay.

One example of the custom development or "in-house" approach to EBPP is the direct rendering approach. In the direct rendering approach, billers merely present electronic representations of the paper bills to consumers. For example, the paper bills may be electronically "redrawn" via electronic scanning and then digitally presented to consumers in any standard electronic format such as an HTML web page or a PDF file. However, because the information contained in the paper bills is not extracted from the document, billers are unable to perform any useful processing of the electronic bill or apply any marketing or business rules other than merely electronically presenting the bill and accepting payment. For instance, the biller is not able to query a database and obtain a report of all bills with a balance over $40.00. Since images are stored rather than data, for the bills to be formatted differently for another type of platform such as for a personal digital assistant or cellphone rather than for a personal computer, they must be electronically rerendered. Bills cannot be grouped according to demographic or other target marketed parameters for customized advertising, promotional or brand building content or graphics. Customer service based on accessing a database of the information in response to customer inquires is precluded. Reports cannot be prepared for the biller to show aging or other information about status of bills. The direct rendering is perhaps the most static of EBPP systems.

A second approach to EBPP is the front-end rendering approach. In front-end rendering, parsing rules are applied to a billing stream at the time the billing stream is loaded. The rules transform the data into a generic format for processing and storage, such as using XML, but only in a snapshot fashion at parsing time and without the ability to change bills or otherwise operate on the data stored in the database. Thus, although the front-end rendering approach does enable billers to perform certain load time decisions and rules, it tends to create a static rather than dynamic set of data with concomitant limitations. It tends to focus on parsing and presentment of bills, with less emphasis on the processing aspect. It tends to be fast, even if not dynamic. Because this EBPP paradigm merely shoots a snapshot at processing time, billers cannot make modifications to the electronic bill at the time of presentment, for example. It cannot create and use various report and view formats via which to view and operate on the billing data stored in the database. It cannot create and set permissions for access to and processing of such data. In addition to loss of control of this sort and other sorts, the front-end rendering approach is expensive due to substantial implementation costs and because it requires the use of multiple application program interfaces to handle the electronic billing data. A central reason for loss of control of data once the biller stream has been parsed is that the biller-side data has not been decoupled sufficiently from the presentment-side data.

A third conventional EBPP approach, which is referred to as the consolidator approach trades control of the billing interface and branding opportunity for a reduction in cost, risk, and internal staffing by outsourcing the EBPP to a third party consolidator. Here, the electronic payment processor takes on a lock box function of holding and moving cash during billing and payment. The payment processor performs an aggregation function by presenting multiple billers' statements at a single, consolidating web site. Not only does interposition of the consolidator and its interface between billers and consumers interrupt any existing relationship and potential to build brand, but it also precludes exploitation of new biller opportunities to interact with consumers.

In addition to the problems already mentioned, existing EBPP systems and processes have various other disadvantages. For example, they remain an expensive option for most billers who lack sufficient economies of scale necessary to overcome the high fixed cost of implementation. These EBPP methods, which primarily focus on reducing biller costs, also often fail to address the issue of consumer convenience adequately, much less to provide effective incentives for consumer adoption.

Furthermore, conventional EBPP approaches often require redundant resources supported by multiple entities and consequently waste processing and transport resources. For example, using existing EBPP methods, if a consumer desires to pay AT&T bills electronically at a website such as Yahoo.com., the following occurs. First, the consumer requests that Yahoo.com receive the AT&T bill and send it to the consumer. Then, assuming AT&T partners with an electronic payment facilitator such as CheckFree, Yahoo.com makes a request to CheckFree. Finally, CheckFree initiates the request to AT&T. Because each of these entities is independent, each requires its own resident database and other support functionality. Such conventional EBPP approaches leave open significant opportunity to increase efficiency and effectiveness by reducing throughput, redundancy and concurrency tasks and issues.

SUMMARY OF THE INVENTION

The present invention provides end-to-end electronic bill presentment and payment systems and processes which seek to be the Switzerland of EBPP sources. Such systems and processes speak in a lingua franca to enable any and all billers to interface with any and all banks and other financial institutions, payment facilitators, consumers, web portals and/or bill presenters and other entities in order to accomplish bill presentment and payment.

Core to systems and processes according to the present invention are databases which store billing data and their metadata or attributes according to a lingua franca that is easily, efficiently and accurately understood and traded on anywhere on the Internet or any other data network. Systems and processes according to the present invention seek to transform billing data from any biller, customer or financial institution into a lingua franca or a form that allows quick conversion into the lingua franca. In some ways, systems and processes according to the present invention treat data similar to how packages are treated in the FEDEX system. There, all packages go via air to Memphis where they are collected and sorted in the middle of the night according to highly automated processes, and then launched on the correct aircraft for direction to their destination. Although intuition suggests that FEDEX should send an Atlanta shipper's package directed to an Atlanta address directly to that address rather than to Memphis and back overnight, studies showed that efficiency was served by instead always applying a highly automated and efficient common collection, storage and distribution process in Memphis, even if it did require package travel over greater geographic distance. Similarly, systems and processes according to the present invention transform data and its attributes into a form that can be stored in a common document storage model before operating on it. That model allows efficient and accurate access, processing, and distribution via a lingua franca such as XML, for access and use by the billers, financial institutions, other EBPP processors, and of course the customers. In some ways, the common document model/ storage models according to the present invention can be compared to Memphis in the FEDEX system or the hub and spoke architecture that airlines use for efficient "processing" of passengers to their destinations.

Systems and processes according to the present invention thus use common document models and storage models which are generic in some ways and not confined to a particular industry, biller, or type of customer. The models accommodate a range of billers, bill types, record types, presentation types, presentation media types, biller output data streams, and data interchange protocols and processes.

According to a preferred embodiment of the present invention, a data stream from a biller, which may be a print stream, data interchange stream or any other sequence of data, is the subject of a rules application process. The rules application process uses a special rules development language that allows a quasi-skilled specialist in minimum time to generate a translator that parses the biller's data stream into a common document model tree. In the tree, which may be based on XML or successors to it, the data and their attributes are mapped into nodes which fit the common document model for storage in the database. Because of the generic and universal nature in which the billing data and its attributes are stored, the database can be coupled to presentment processors, such as via XML, that may include style sheets and other applications that transform the stored data into whatever desired form and format to support bill presentment wherever and whenever desired.

Such systems can provide billers a complete end-to-end solution for electronic bill presentment and payment. The biller's data may be transformed efficiently and effectively using the rules definition language into data and its attributes that can be stored in a manner that allow the biller new opportunities not available in conventional EBPP systems. These stem from the fact that the biller can access the billing data and attributes stored in databases according to the present invention in order (1) to operate on it; (2) to query it for information; (3) to control how it will be presented to customers and with what other information such as brand building or customer relationship building information; and (4) to access, use and perhaps change it while communicating with customers such as via a help desk or customer service lines. Thus, according to the present invention, the biller may have "offloaded" the data to an outsource for EBPP, but without losing the opportunity to access and operate on the billing data, and to control in real time the data that will be presented to customers in the form of bills as well as the look and feel according to which the bills are presented, to obtain reports about bill status, to help effectuate the payment process, to categorize or group bills or customers for various purposes such as adding demographically or other based content, and for other purposes. Because of the universality of its structure, the billers can control from a billing console functionality how the bills and billing data will be presented on any desired platform using any desired applications, formats and protocols, via presentment engines that include style sheets, translators, processors or other techniques which allow efficient and ready transformation into a state ready for use by such platforms, applications, formats and protocols. For example, for a single biller, the database can simultaneously present bills for different customers from a single batch of bills in various spoken languages, on HTML based browsers, on OFX supported applications, or in any other way desired by any biller or customer.

EBPP systems and processes according to the present invention for the first time promote EBPP aggregation. From the biller's point of view, these systems and processes allow many types of billers to have their bills processed, presented and paid using a single source using the common document model/storage model. Each of such billers is incentivized to use this source, because with it, they can outsource their billing problems but still maintain control over their billing data and how it is presented. Thus, value propositions for the biller from systems and processes according to the present invention include:

a. end to end electronic billing services which can be outsourced relatively inexpensively without loss of control over bill processing, presentment or payment;

b. establish a base for entering the electronic commerce field;

c. leverage brand building, customer relationship building and marketing opportunities offered by these EBPP systems, by unlimited ability to control the way the bill looks, what is contained in it and why, and how and according to what terms it can be paid;

d. use existing payment relationships with minimum interruption or inconvenience to financial institutions or customers;

e. deliver bills wherever the customer wants;

f. establish an online presence;

g. unpack the biller's own information, support HTML presentation so that for the first time, biller's own employees may access it and use it to service customers;

h. promote quick payment;

i. avoid the costs and human resources requirements of doing these things in house;

j. cost reduction over paper based billing;

k. pay as you use; avoid capital costs of in house billing system;

l. leverage marketing and EBPP expertise and talent of EBPP processor who operates across a range of industries and customers and is thus current with latest trends;

From the customer's point of view, because of the common document model/storage model, such systems and processes can present and enable payment of bills ubiquitously—customers can have their bills presented and paid on web portals, on their home financial application, via electronic mail, or wherever else they desire. Because billers are incentivized to use the systems and processes, customers can pay all or most all of their bills in one place, but in a manner where each bill is presented to the customer in a way that is specially tailored to the customer with graphics, advertising, and other information that has been demographically proven to connect with that particular customer. Value propositions for the customer from EBPP systems according to the present invention include:

a. bills delivered to place, site, space, application, of choice;

b. pay all or most bills in one place;

c. convenience over collecting and paying paper bills;

d. leverage convenience for institutional customers; for example, a university with thousands of electric meters can now receive one bill with the meters netted up, to effectuate a single payment bill thus avoiding the significant costs of preparing and paying thousands of bills;

e. reminders if desired;

f. ability to receive relevant and demographically tailored and targeted information of value from the biller;

g. cost and convenience over buying stamps and depositing paid bills in the mail.

Financial institutions connected to such systems find that they can leverage off the time value of money because quick payment means more accrued debt on which interest accrues. In short, every entity in the connected environment has incentive to use systems and processes according to the present invention, chiefly because they can be connected and transact in a way where each retains maximum control, gets maximum useful information, and transacts with minimum inefficiency and overhead.

BRIEF DESCRIPTION OF THE DRAWINGS

FIG. 10B is one portion of an enrollment parameters customization screen shot of a biller interface generated by a preferred embodiment of systems and processes of the present invention.

FIG. 10C is another portion of an enrollment parameters customization screen shot of a biller interface generated by a preferred embodiment of systems and processes of the present invention.

FIG. 10D is a further portion of an enrollment parameters customization screen shot of a biller interface generated by a preferred embodiment of systems and processes of the present invention.

FIG. 11 is a quality assurance screen shot of a biller interface generated by a preferred embodiment of systems and processes of the present invention.

FIG. 14B is another quality assurance screen shot of a biller interface generated by a preferred embodiment of systems and processes of the present invention.

FIG. 15 is an inbound document control screen shot of a biller interface generated by a preferred embodiment of systems and processes of the present invention.

FIG. 16 is an inbound document control screen shot of a biller interface generated by a preferred embodiment of systems and processes of the present invention.

FIG. 17 is an outbound document control screen shot of a biller interface generated by a preferred embodiment of systems and processes of the present invention.

FIG. 18 is an inbound document control screen shot of a biller interface generated by a preferred embodiment of systems and processes of the present invention.

FIG. 20 is a compose mass email screen shot of a biller interface generated by a preferred embodiment of systems and processes of the present invention.

FIG. 24 is a customer bills screen shot of a biller interface generated by a preferred embodiment of systems and processes of the present invention.

FIG. 26 is a customer profile screen shot of a biller interface generated by a preferred embodiment of systems and processes of the present invention.

Figure 40A:
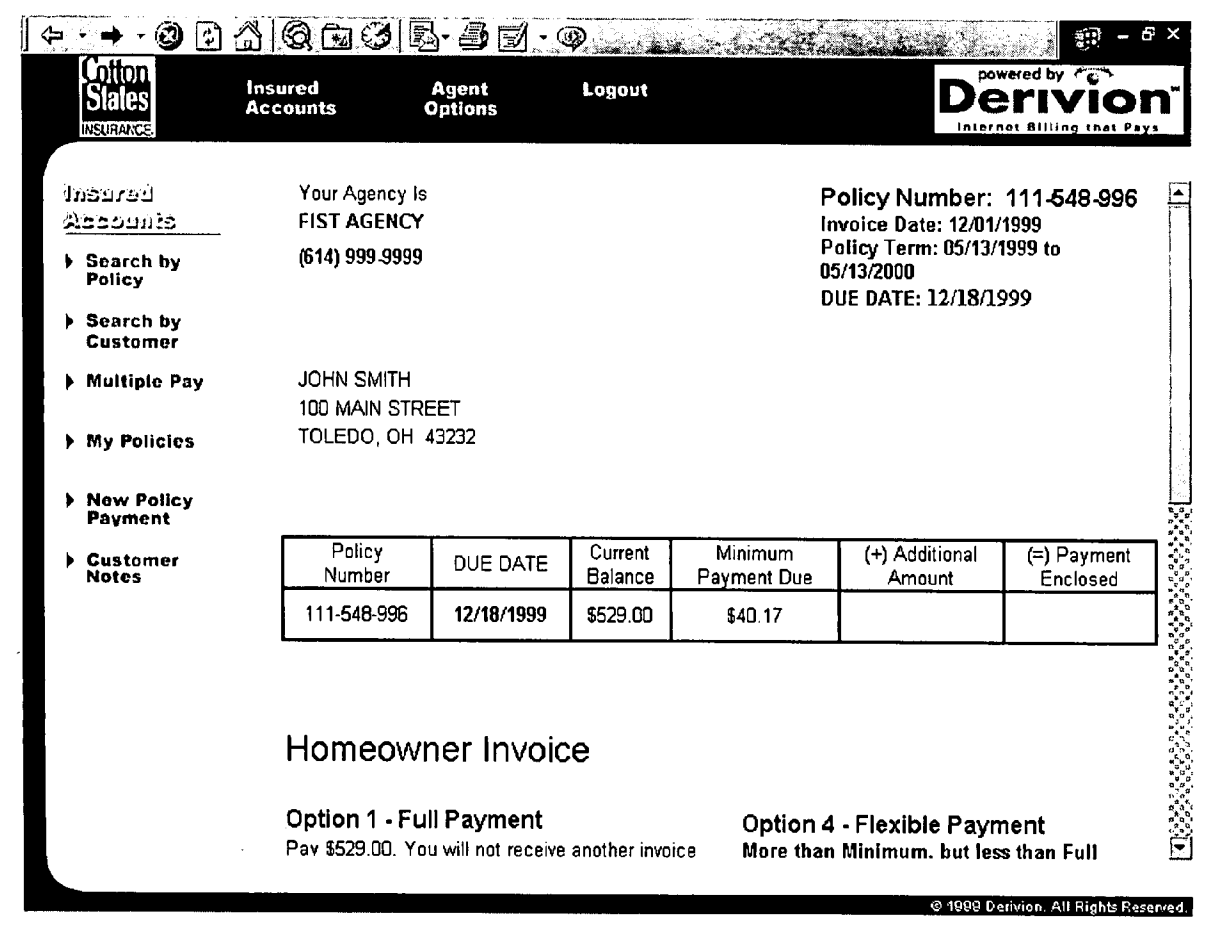

FIG. 40A is a customer policy display screen shot of an agent interface generated by a preferred embodiment of systems and processes of the present invention.

Figure 44:
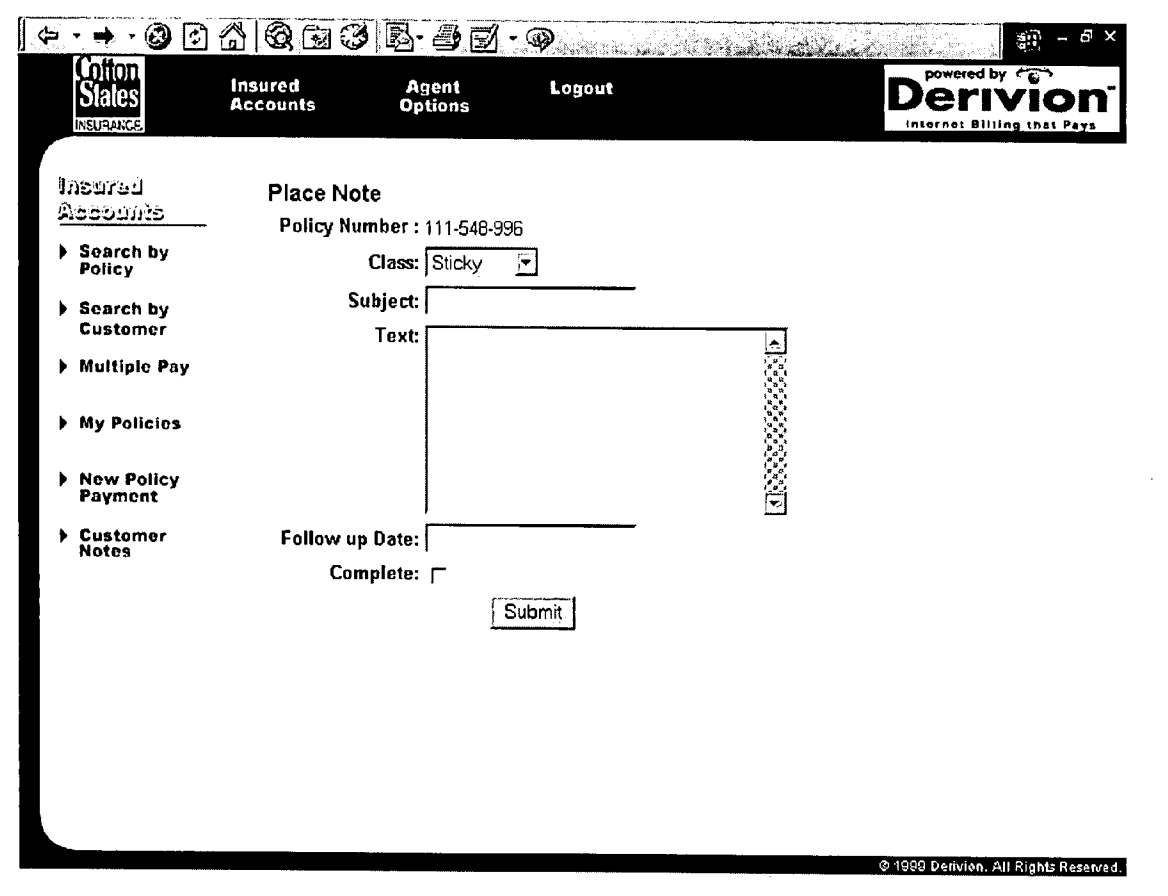

FIG. 44 is an agent customer service note screen shot of an agent interface generated by a preferred embodiment of systems and processes of the present invention.

FIG. 48 is a multiple payment search results screen shot of an agent interface generated by a preferred embodiment of systems and processes of the present invention.

FIG. 50 is another customer policy payment screen shot of an agent interface generated by a preferred embodiment of systems and processes of the present invention.

FIG. 56 is a new policy payment details screen shot of an agent interface generated by a preferred embodiment of systems and processes of the present invention.

FIG. 59 is a place note screen shot of an agent interface generated by a preferred embodiment of systems and processes of the present invention.

DETAILED DESCRIPTION

Figure 1:
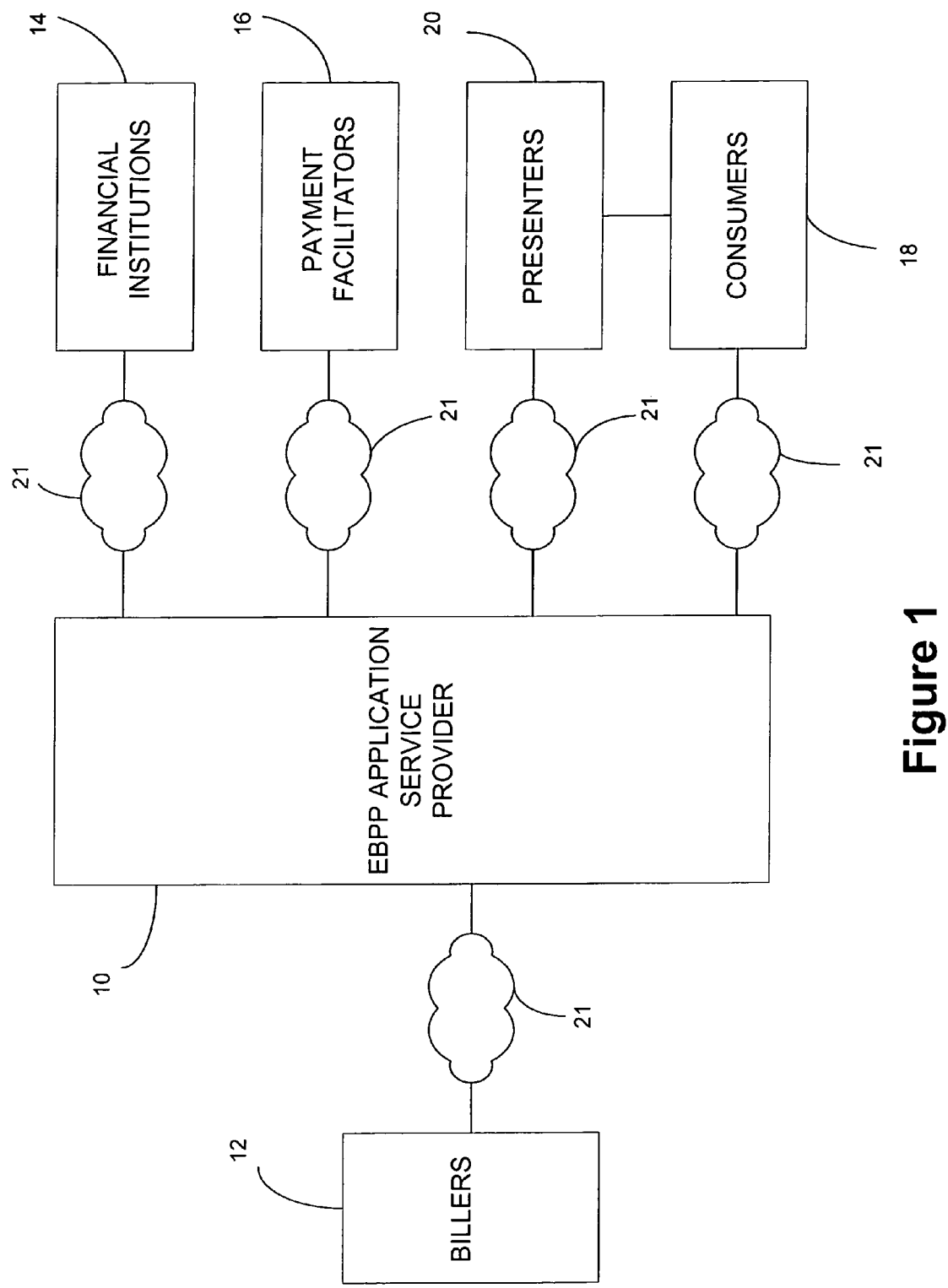
FIG. 1 is a diagram illustrating external connectivity of a preferred embodiment of an electronic bill presentment and payment platform according to the present invention.

FIG. 1 shows connectivity of a preferred embodiment of a platform 10 of electronic bill presentment and payment processes and systems according to the present invention to other entities. Platform 10 can interface with, among other external entities, billers 12, banks and other financial institutions 14, payment facilitators or aggregators 16, consumers 18, and web portals, applications and/or bill presenters 20. Platform 10 can provide billers 12 a complete end-to-end solution for electronic bill presentment and payment that also accommodates the interests and convenience of consumers 18. Billers 12 can be any organization or institution that engages in paper based billing or conventional EBPP, or any other organization that has need or desire to engage in the sort of aggregated electronic commerce offered by systems and processes according to the present invention. Oil companies, insurance companies, utilities, telecommunications companies, communication service providers, retail institutions, credit organizations and others similarly situated fit within the broad and limitless profile of organizations who can leverage from systems and processes according to the present invention.

Financial institutions 14 which may connect, interact and/or transact with systems and processes according to the present invention include banks, credit organizations, brokerages, insurance companies, and any other organization which can have a need or desire to interact with systems and processes according to the present invention to help effectuate electronic bill presentment and/or payment, or to enhance or build their own online presence for marketing and any other desired purpose.

Payment facilitators 16 can include other EBPP facilitators or organizations, credit card companies, credit unions, banks, or any other organization which can have a need or desire to interact with systems and processes according to the present invention to help effectuate electronic bill presentment and/or payment, or to enhance or build their own online presence for marketing and any other desired purpose.

Consumers 18 can be individuals, businesses, educational institutions, or any other entity that pays bills.

Presenters 20 can be web portals, financial applications on a consumer's 18 system, web sites specifically supported for the purpose of EBPP, the site of biller 12, or any other desired interface where a bill can be presented.

Platform 10 may take the form of a network of desired platforms, computers, or other functionality, located in one or more geographical locations, running any desired operating systems and applications. In the preferred embodiment, platform 10 is implemented on a Solaris operating system using an Oracle database and CORBA firmware and is configured in a scaleable and fault tolerant environment. Platform 10 may be connected to billers 12, financial institutions 14, payment facilitators 16, presenters 20 and any other desired entity via public or private packet-switched or other data networks including the Internet, circuit switched networks such as the public switched telephone network, wireless networks, or any other desired communications infrastructure 21.

Figure 2:
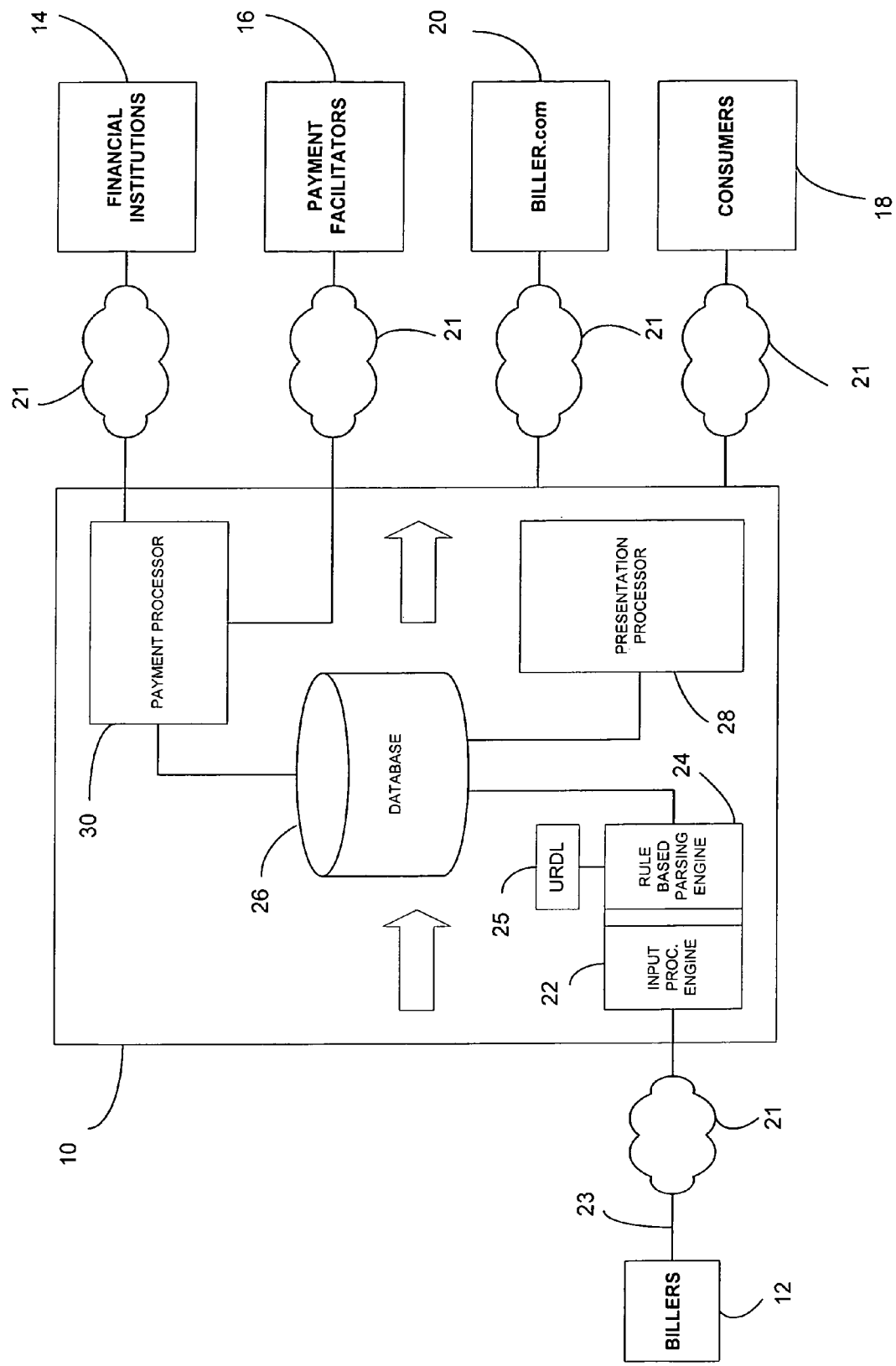
FIG. 2 is a diagram illustrating the architecture of the platform of FIG. 1.

Referring to FIG. 2, platform 10 may accept biller data 23 in any form or format supplied by any biller 12. Biller data 23 may be a print stream or it may otherwise include data, data records, or other information about bills that are to be presented to consumers 18 for payment. Information in biller data 23 may include, for instance, consumer names, statement numbers, statement dates, account numbers, addresses, data about items or services provided or sold, amount due, billing history, marketing and/or advertising data, and any other information, whether in the form of text, graphics, audio, video or any alternative multimedia content, that billers 12 desire to present to consumers 18. Biller data 23 can be according to AFP, Metacode, Line Data (ASCII or EBCDIC for example), PCL, DJ/DE, OFX, XML, or any other format or protocol, whether print stream, electronic data interchange, or otherwise.

Input processing engines 22 may be adapted to support any of these standards, in order to transform biller data 23 into a form and format suitable for processing by rules based parsing engine 24. Input processing engine 22 may be implemented using an Oracle Parallel Server running on a clustered Sun platform, for example, or according to any other desired implementation. The main concept is to modularize the preprocessing of biller data 23; if a new form of biller data 23 is encountered or must be dealt with for transformation into a form and format usable by rules based engine 24, then a new input processing engine is built to handle that data in a modular way. The preprocessing of AFP, for example, is different than preprocessing of metacode, so it makes more sense to have a separate engine 22 for each, so that the output of each is ready for processing by rules based parsing engine 24. Preprocessing of various types of biller data 23 is done in the same sort of conventional way that print streams or other financial or EDI data streams are processed or converted for various purposes. It may be that some biller data 23 does not need to be preprocessed, in which case there may be no need for an input processing engine for that data 23.

Rules based parsing engine 24 allows a wide variety of biller data 23 types and formats to be operated on or parsed by rules in order to fit a common document or data model which can store and process both data and its attributes. In other words, it is important for the common data or document model to know not only an account number being stored, but also that it is an account number and not a bill number or date. The parsing engine 24 helps progress data 23 toward a form or format according to which both the data and its attributes can be known, stored and processed. It does not matter if rules engine 24 outputs a tight set of data and tags or other corresponding attributes, or if that is done later; the parsing engine 24's main task is to accept a wide variety of data 23 from various billers and put it into a form and format where it is at least easier to generate and correlate the attributes for various data in a form that can be used by the common document or data model.

The rules used in parsing engine 24 are in turn preferably written using a uniform rules definition language. That URDL 25 seeks to allow a technician to take a new form of biller data 23 and write rules to parse that data 23 without extenuating work or investment of time. For example, URDL 25 currently in use allows technicians to write a set of rules for new data presented by a new biller in several days, without the need for people who are more deeply immersed in the whys and wherefores of financial data interchange. URDL 25 instead seeks to institutionalize that financial data interchange knowledge by writing a language using certain syllogisms, algorithms, inferences and conclusions to be formed upon encountering various data types, certain realities about what the common document model/data model needs to have in the form of data and attributes, and allowing a technician merely to apply what is written in the language in a more mechanistic fashion to cause proper parsing to happen. The language is written using conventional knowledge about various print streams and electronic data interchange formats, knowledge about the common document model/data model, and techniques often applied to simplify preparation of various forms of data and its attributes to fit desired situations, such as text to be presented attractively in HTML, or data to be transacted on usefully in the form of XML data. Parsing engines 24 based on URDL 25 are thus advantageous because they can allow parsing of billing streams without the need to develop new application program interfaces or other functionality that requires overemployment of skill or time. Parsing engine 24 may also be implemented using an Oracle Parallel Server running on a clustered Sun platform.

As an example of what parsing engine 24 does, it may be adapted to parse relevant biller data 23 from each data record in a billing data stream based on instruction sets created to: identify individual data records within the input billing streams; locate, extract, and validate the relevant billing data within each data record; and assign meaningful attributes to the relevant billing data. Parsing engine 24 may output the relevant billing data and corresponding meaningful attributes ultimately for storage in database 26 (after further processing) and for further processing by presentation processor 28 and payment processor 30.

Figure 3:
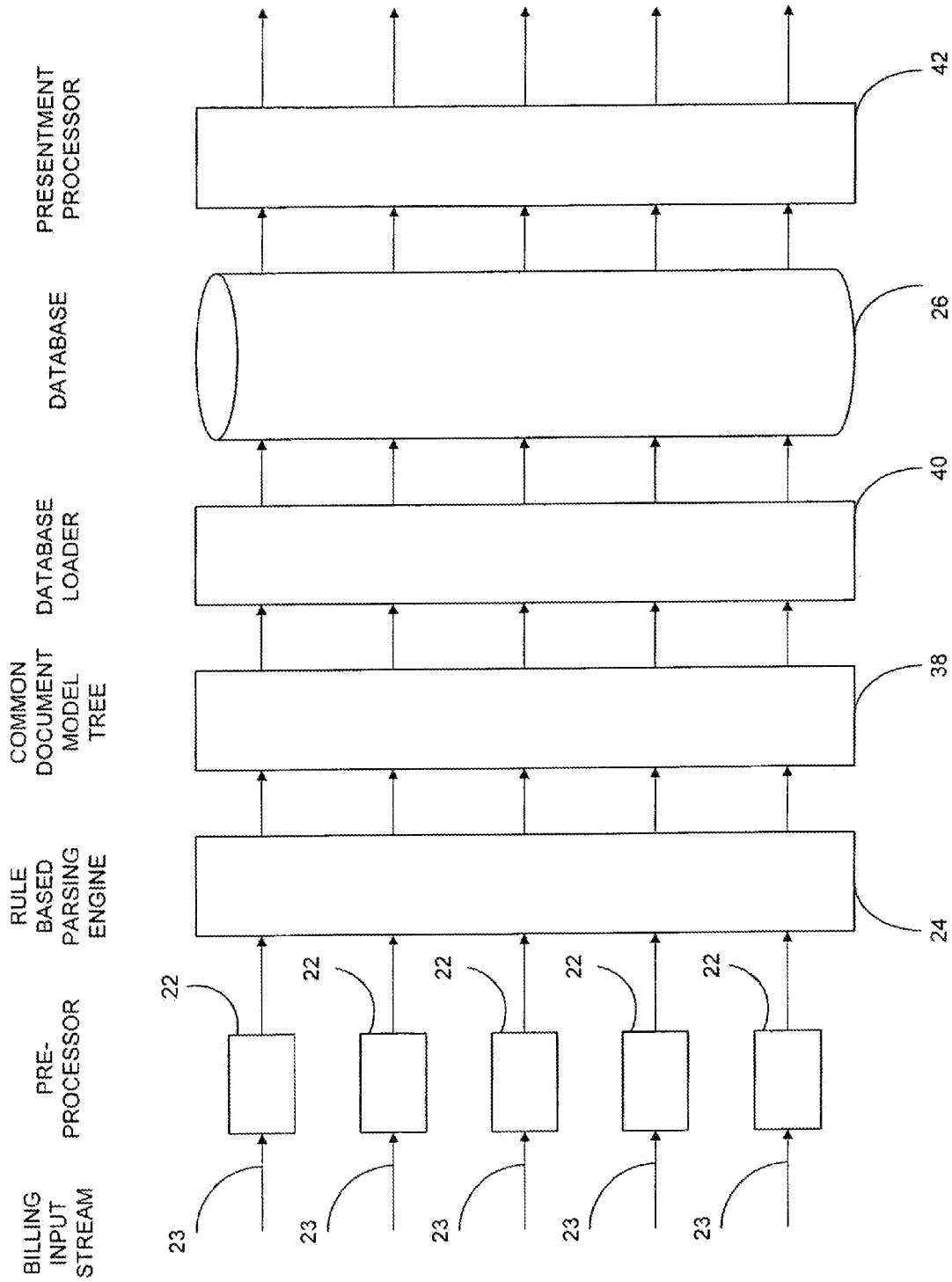
FIG. 3 is a general level diagram showing components of and processes carried out by preferred embodiments of systems and processes according to the present invention.

FIG. 3 shows a more detailed diagram of functionality that processes biller data 23 and stores it in database 26 according to a common document model/data model. The broad idea that FIG. 3 seeks to convey is the notion of modularity in taking various types of biller data 23, preprocessing where necessary, and parsing according to rules in parsing engine 24 (which may be need not be done according to a URDL 25), in order to place that biller data 23 in the form of a common document model tree. Think of the common document model/data model according to the present invention as a list of every field of data, and its attribute (such as, for example, bill number and tag denoting bill number) that could occur in any bill desired to be presented by any biller. Not every biller's biller data 23 or bill will have all of that information; instead, it only has a subset of all data and attributes which could be accommodated by the common document model/ data model. Accordingly, the biller's subset, which contains data and attributes which can be stored and processed according to the model, but not all of them, is known as the common document model/data model tree 38. Tree 38, or fairly close to it, is the output of parsing engine 24. Database loader 40 then takes tree 38 and loads it efficiently, effectively, and in conventional fashion in the same sort of way various subsets of data are loaded, for example into a global XML data model, onto database 26 which is structured according to common document model/storage models of the present invention.

Figure 4:
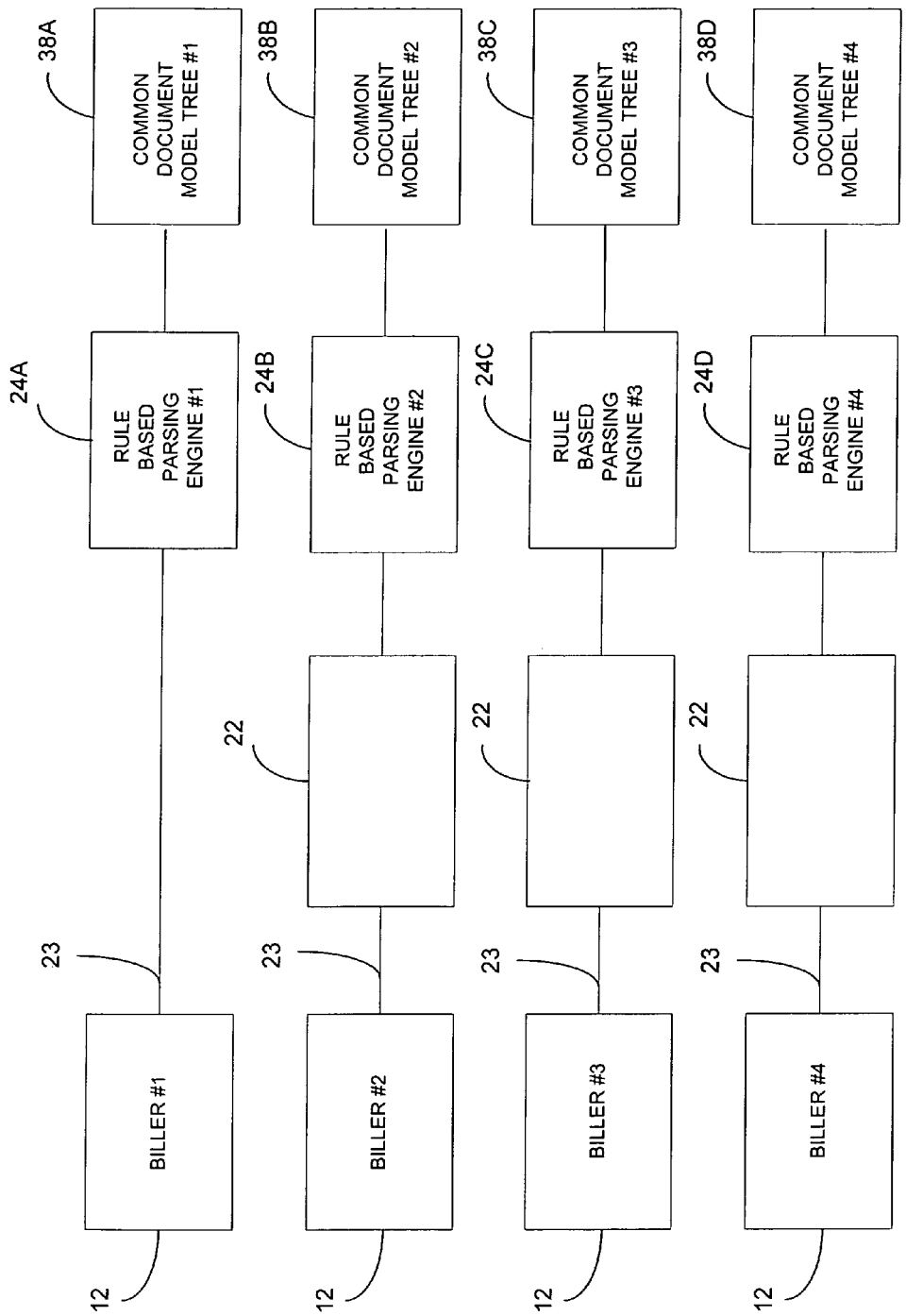
FIG. 4 is a diagram showing components of and biller data input processes carried out by preferred embodiments of systems and processes according to the present invention.

FIG. 4 shows processing of biller data 23 into form suitable for storage and use according to common document models/ data models according to a preferred embodiment of the invention at a deeper level. Biller #1 shown in FIG. 4 presents a text stream of biller data 23 to be accommodated to platform 10 according to a preferred embodiment of the present invention. That text stream does not happen to require preprocessing, but instead is operated on directly by parsing engine 24A which applies an instruction set written in URDL 25. The instruction set was quickly and conveniently prepared by a technician to transform biller data 23 to conform to common document model tree #1 (38A), which is biller #1's biller data 23 transformed into a subset of data and its attributes which conform to the common document model/data model used in platform 10. Biller #2's data is in AFP, an IBM print stream format which requires some preprocessing and text extraction before it is suitable for parsing by parsing engine 24B. Again, parsing engine 24B applies an instruction set which was specially prepared with minimum effort and specialized knowledge. After parsing, biller #2's data is in the form of common document model tree #2 (38B). The biller data 23 for Biller #3 and Biller #4 also require preprocessing and text extraction, as shown in FIG. 4, although it is not necessarily the case that any or all biller data 23 in AFP, metacode or otherwise will always or invariably require or not require preprocessing, text extraction or anything else to be operated on by parsing engine 24. If desired, for example, preprocessing, text extraction and other operations on biller data 23 could be accomplished in parsing engines 24. Modularity is preferred but not necessary according to the present invention.

Figure 5:
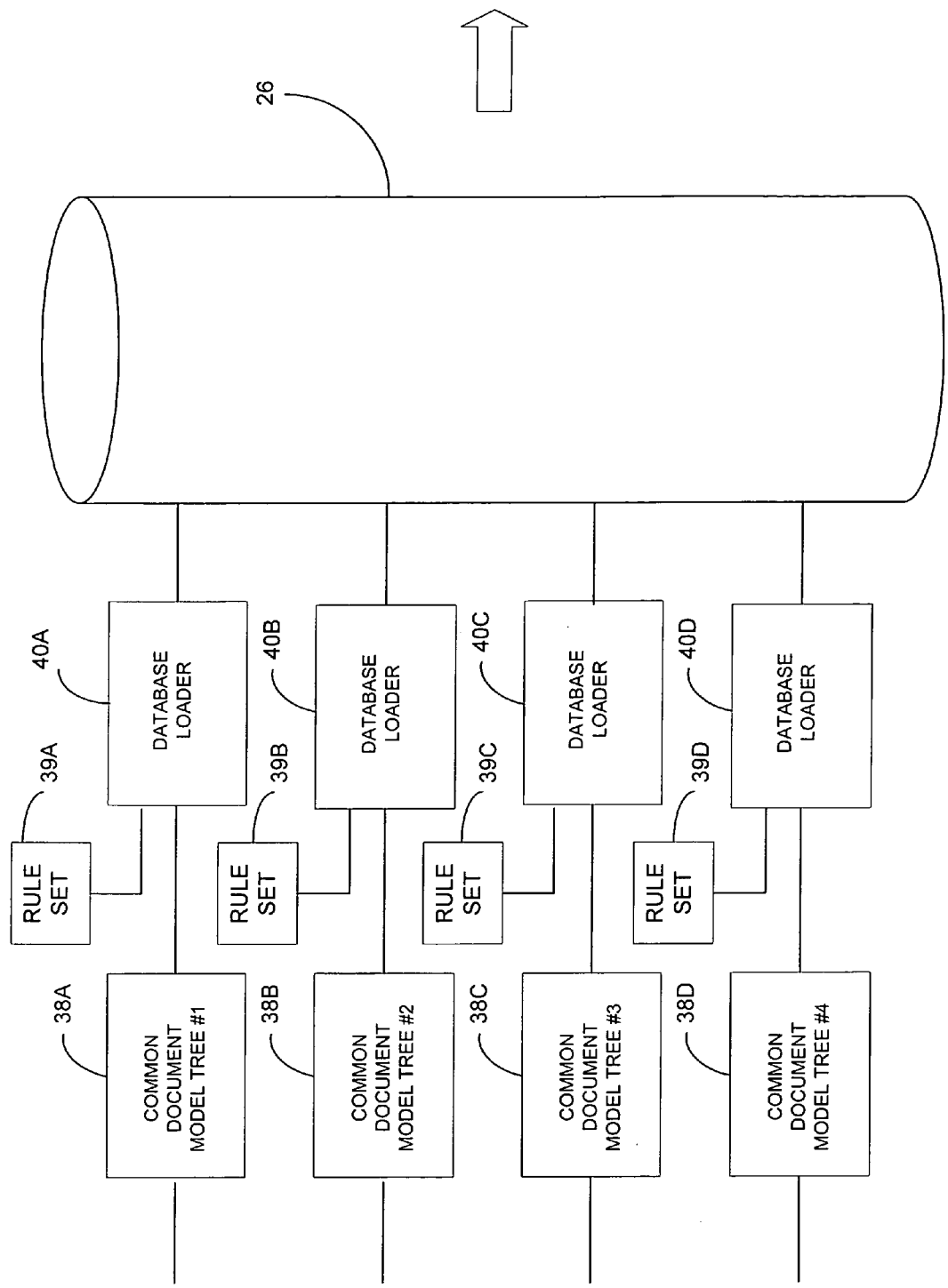
FIG. 5 is a diagram showing components of and database load processes carried out by preferred embodiments of systems and processes according to the present invention.

FIG. 5 continues from FIG. 4 to show loading of data and its attributes from common document model trees 38 A-D into database 26 for biller #'s 1-4. Again, the preferred paradigm is modular, even if not necessary. For example, separate database loaders 40 can be used, each with its own special rule set 39 to accommodate a particular biller, but one or fewer loaders 40 could be used with separate rule sets 39, or one or fewer loaders 40 with one or fewer (even if bigger) rule sets 39. Loaders 40 take the data and its attributes in common document model trees 38 A-D and load it efficiently and effectively into database 26, thus loading subsets of common document model/data model into storage according to the model itself.

Figure 6:
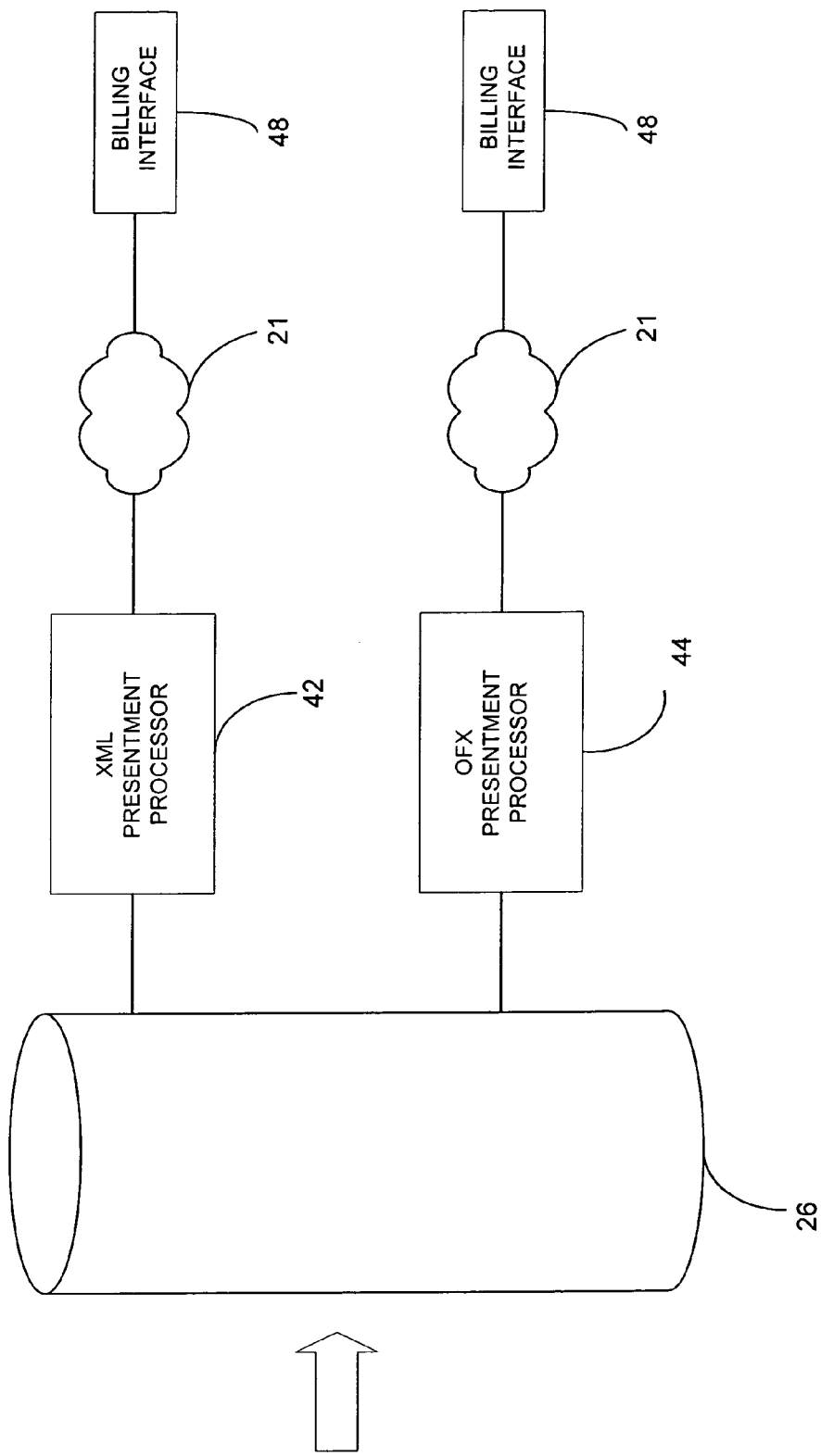
FIG. 6 is a diagram showing components of and bill presentment processes carried out by preferred embodiments of systems and processes according to the present invention.

FIG. 6 shows the presentment side of a preferred embodiment of electronic bill presentment and payment systems and processes of the present invention. The broader concept is that data and its attributes stored according to a common document model/data model in a database 26 according to the present invention is in a lingua franca that allows it to be transformed into electronic bills anywhere and everywhere, however desired by the biller 12 or the customer 18. In a preferred embodiment, output from the database 26 is in a form of XML or its equivalent or successor, which allows that data to be handled by any platform or application anywhere.

In FIG. 6, two presentment processors 42 happen to be used. Any number could be used. Presentment processors 42 and 44 may be adapted to communicate with database 26 to retrieve, store, and modify common document model/data model information. Processor 42 is simply in the form of an XML style sheet which allows the data to be presented in whatever manner and to appear however and wherever desired by a biller 12 or customer 18. For instance, a style sheet that works with a billing interface 48 supported on Yahoo will be different from the style sheet that supports a billing interface 48 supported on AOL. Where the bill is to be presented on a customer's Quicken application or to a financial institution where OFX is the format, the processor 44 transforms the XML data and attributes into OFX for presentment. Again, the data whether in HTML, OFX or any other format, can be distributed over infrastructure 21 which is any kind of public or private packet switched, circuit switched, or wireless infrastructure. Presentment processors may be prepared for any sort of data format, and it is important to note that systems and processors according to the present invention give the biller 12 control over processors 42 and 44 in order to control how their bills will look and feel wherever presented.

Platform 10 can enable billers 12 to exercise substantial management and administrative control over the electronic bill presentment and payment process. Platform 10 may provide billers 12 with an interface to database 26 and presentation processors 42 and 44, which may enable billers 12 to manage the administrative functions of electronic billing. The biller interface may enable billers 12, including employees and agents of billers 12, to perform a variety of administrative, customer service, management, and quality control functions. For instance, the biller interface may enable billers 12 to perform the following functions: view current and previous consumers bills, view payment history, view consumer emails, modify consumer enrollment, verify consumer identity, confirm consumer enrollment, perform consumer account maintenance, associate accounts to a consumer, make payment adjustments, change employee access permissions to the biller interface, send news and messages to consumers, associate accounts to news, perform online consumer statistics, create payment settlement and periodic reports, select manual billing, view selected bills, perform quality feedback updates, print quality assurance reports, and release bills for publishing.

System embodiment 10 may also enable billers 12 to perform a variety of marketing functions via the biller interface. For example, the biller interface may enable billers 12 to create virtual groups. Virtual groups are market segments of the class of consumers 18 identified by billers 12 based on specific marketing rules. Billers 12 may use virtual groups to send emails to a portion of consumers 18 or to send marketing promotions to specific groups of consumers 18. Alternatively, the biller interface may enable billers 12 to use virtual groups to send any intelligent messaging to consumers 18.

Figure 7:
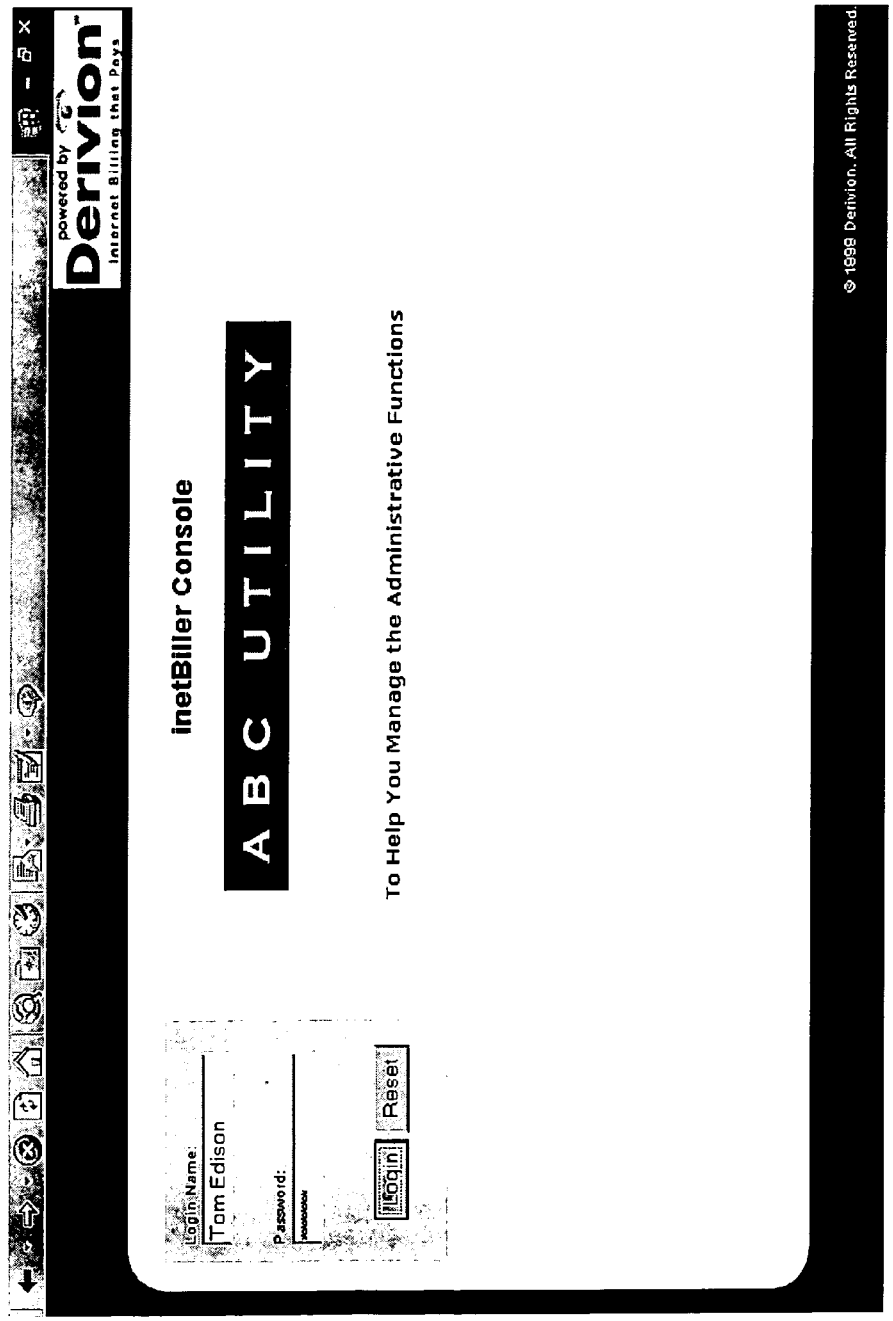
FIG. 7 is a sign in screen shot of a biller interface generated by a preferred embodiment of systems and processes of the present invention.
Figure 8:
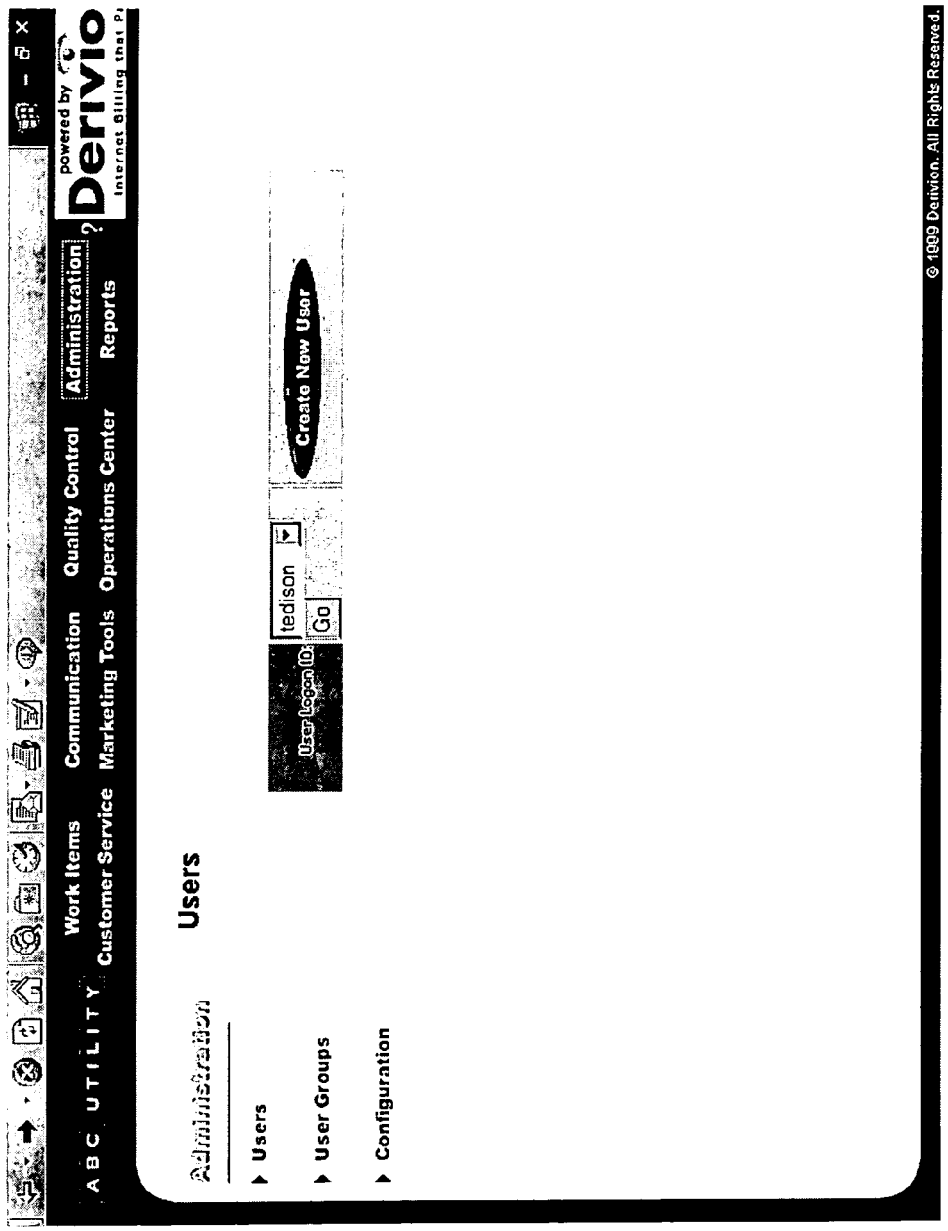
FIG. 8 is a user selection screen shot of a biller interface generated by a preferred embodiment of systems and processes of the present invention.
Figure 9:
FIG. 9 is a new user creation screen shot of a biller interface generated by a preferred embodiment of systems and processes of the present invention.

FIGS. 7-32 show a series of web pages for a preferred embodiment of a biller interface supported by platform 10 according to a preferred embodiment of the present invention. These screen shots are exemplary only; currently they are implemented in HTML but they or any interface to platform 10 may be implemented in whatever desired matter according to technology current or conventional as of the date of this document or later technology. In any event, FIG. 7 shows a web page that enables billers 12 to access platform 10 by entering a login name and password. After billers 12 are authenticated, platform 10 enables billers 12 to perform a number of functions for managing electronic bill presentment and payment, such as system administration, reporting management, quality control, operations management, marketing, and customer service. For instance, FIGS. 8-10 show a series of web pages that enable billers 12 to administer and manage an electronic bill presentment and payment program. As shown in FIG. 8, billers 12, including employees and agents, may select a user logon ID, which may be used for tracking administrative transactions, to gain access to the administration services and for other desired purposes. As shown in FIG. 9, billers 12 may create new users that may access the administrative functions by creating a user profile, which contains information such as user logon, user password, employee name, employee telephone, and user group, such as quality assurance, customer service, or payment. Billers 12 may also control what administrative functions a user is permitted to perform on platform 10 by assigning the user to one of a number of predefined user groups each having different access parameters.

Figure 10A:
FIG. 10A is a general parameters customization screen shot of a biller interface generated by a preferred embodiment of systems and processes of the present invention.
Figure 10B:
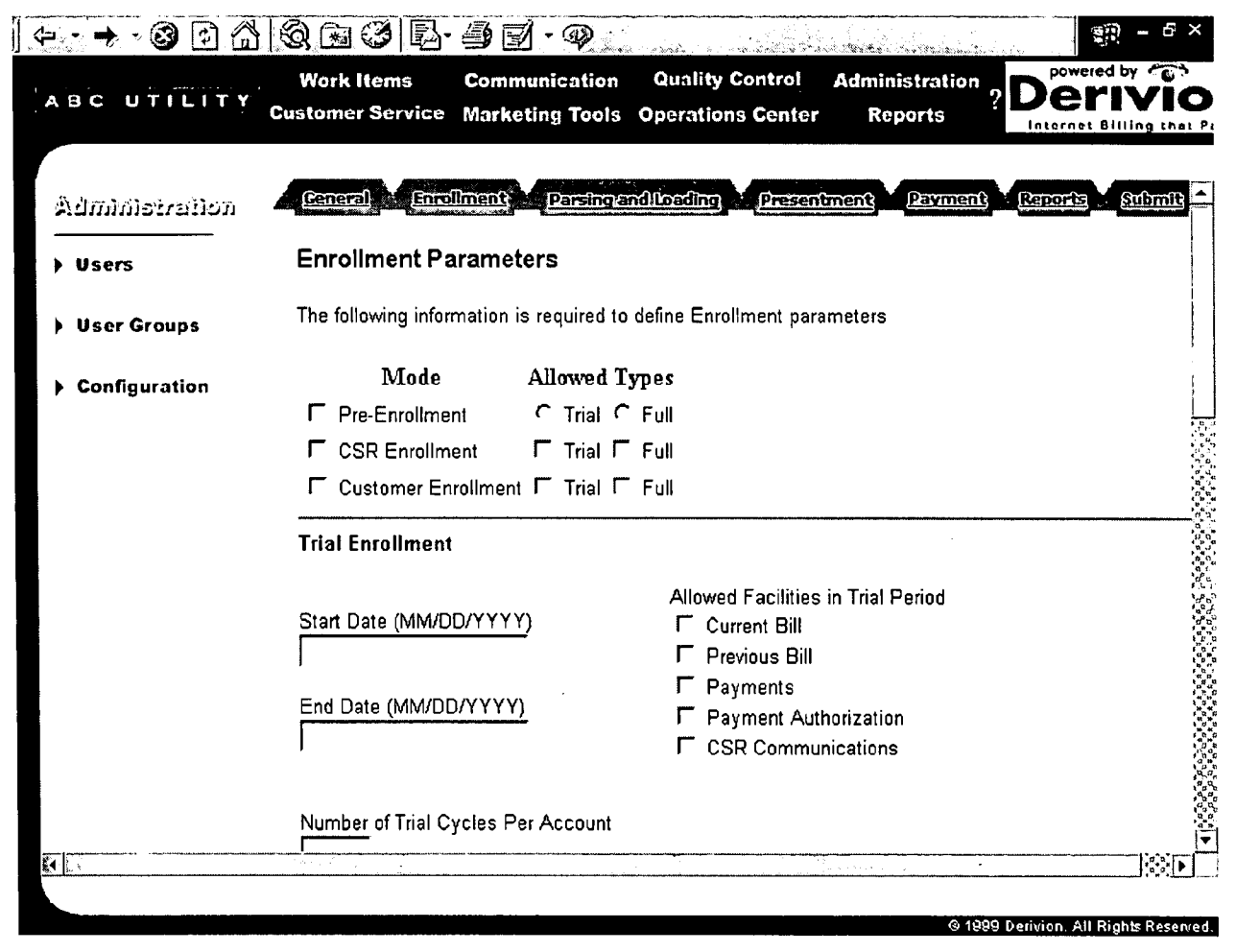
Figure 10C:
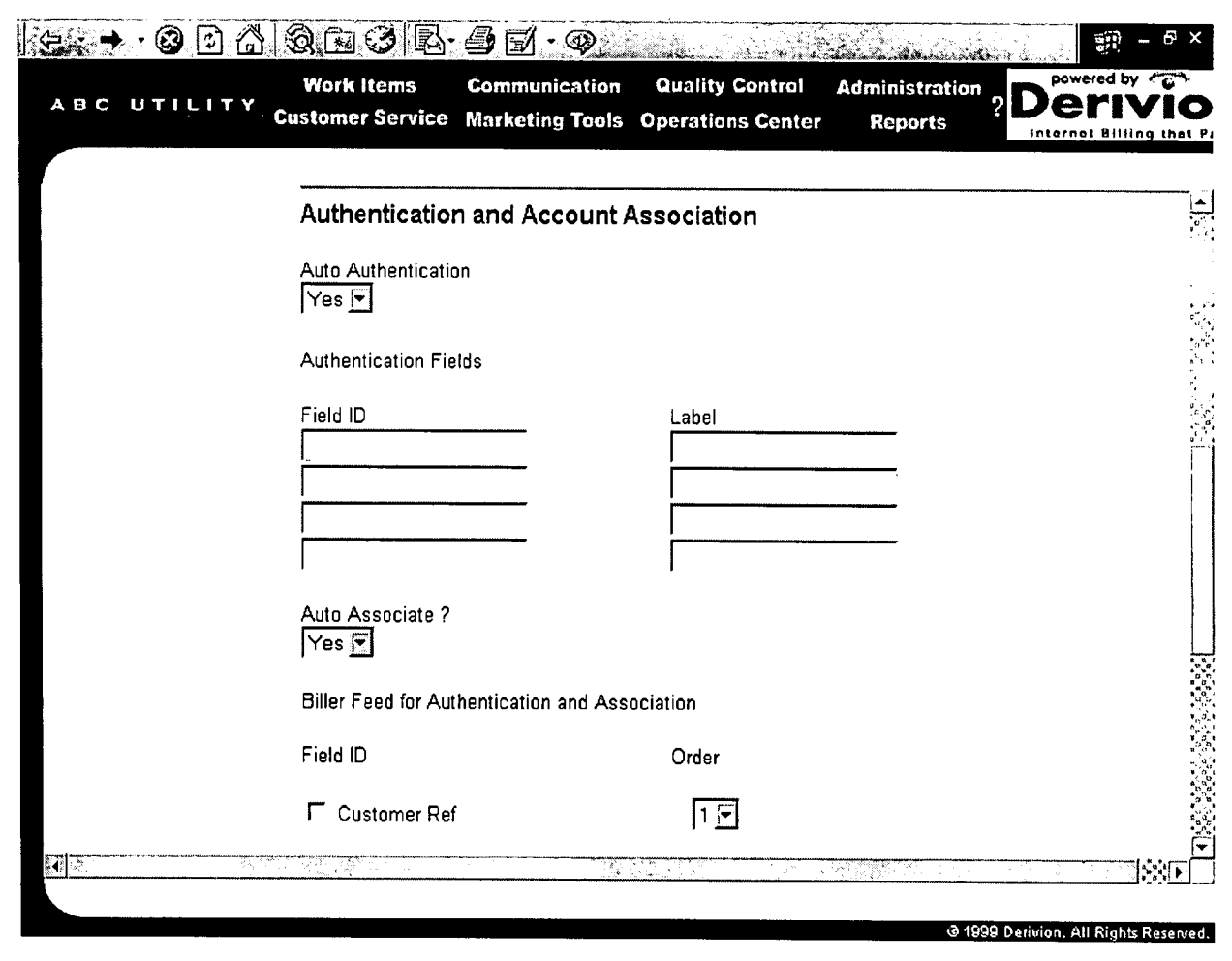
Figure 10D:
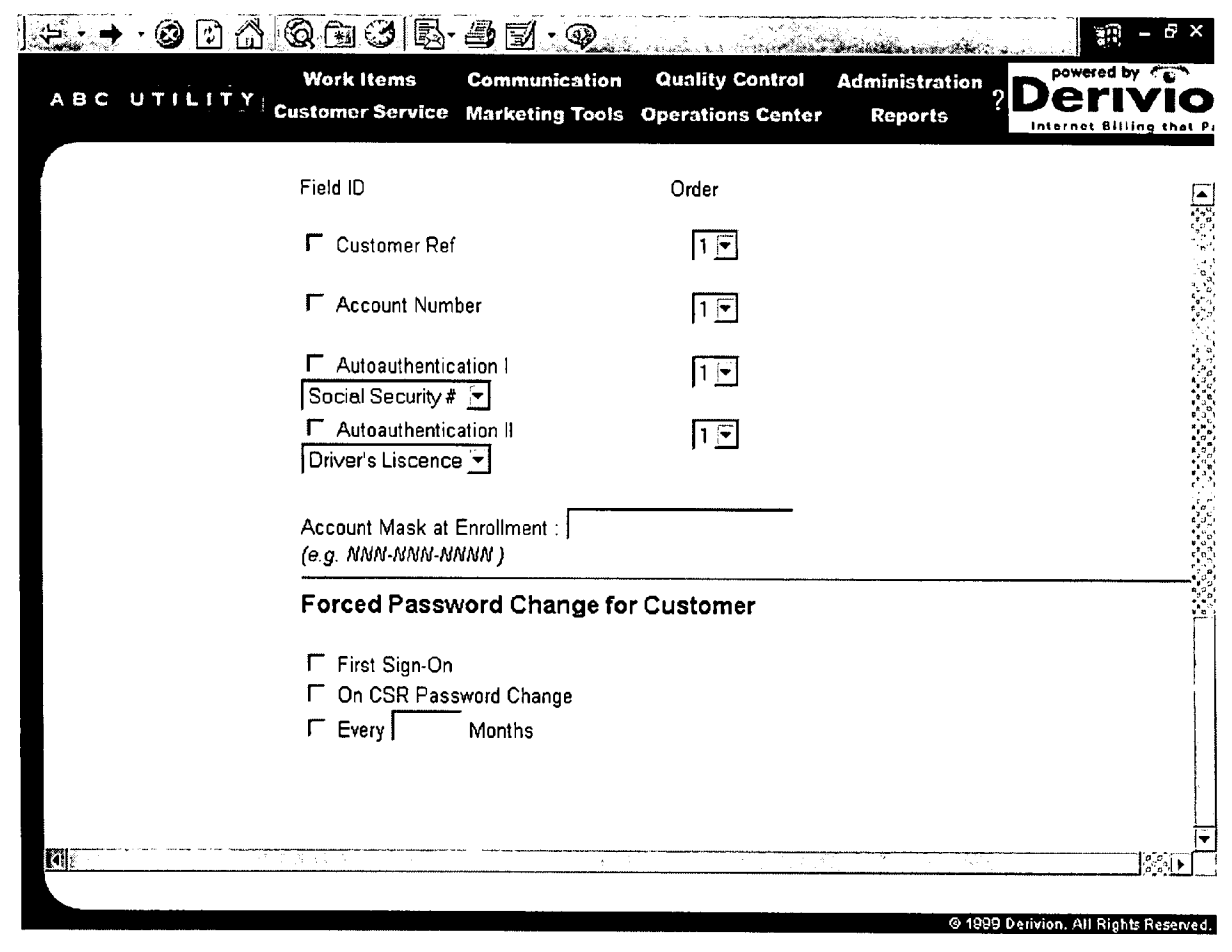
Figure 10E:
FIG. 10E is a parsing and loading parameters customization screen shot of a biller interface generated by a preferred embodiment of systems and processes of the present invention.
Figure 10F:
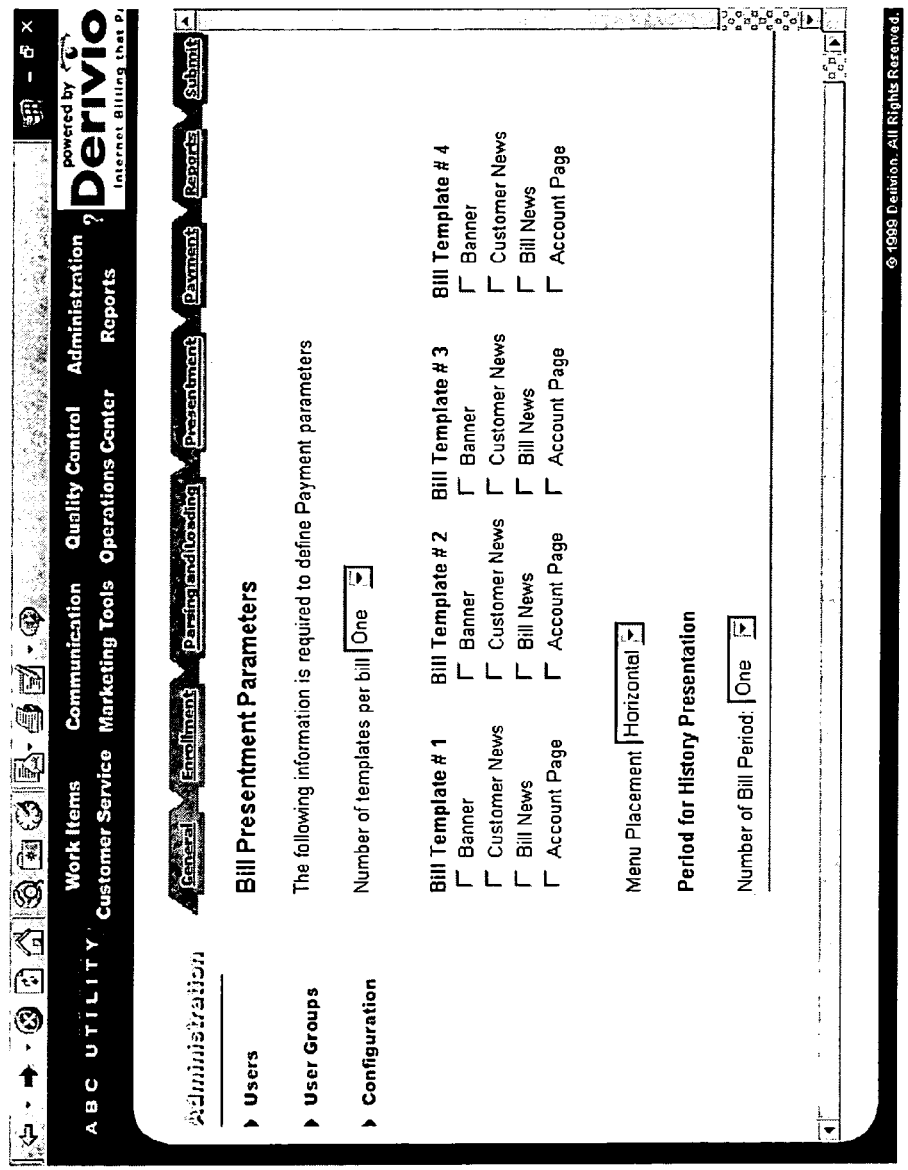
FIG. 10F is a bill presentment parameters customization screen shot of a biller interface generated by a preferred embodiment of systems and processes of the present invention.
Figure 10G:
FIG. 10G is a portion of a payment parameters customization screen shot of a biller interface generated by a preferred embodiment of systems and processes of the present invention.
Figure 10H:
FIG. 10H is another portion of a payment parameters customization screen shot of a biller interface generated by a preferred embodiment of systems and processes of the present invention.
Figure 10I:
FIG. 10I is a further portion of a payment parameters customization screen shot of a biller interface generated by a preferred embodiment of systems and processes of the present invention.
Figure 10J:
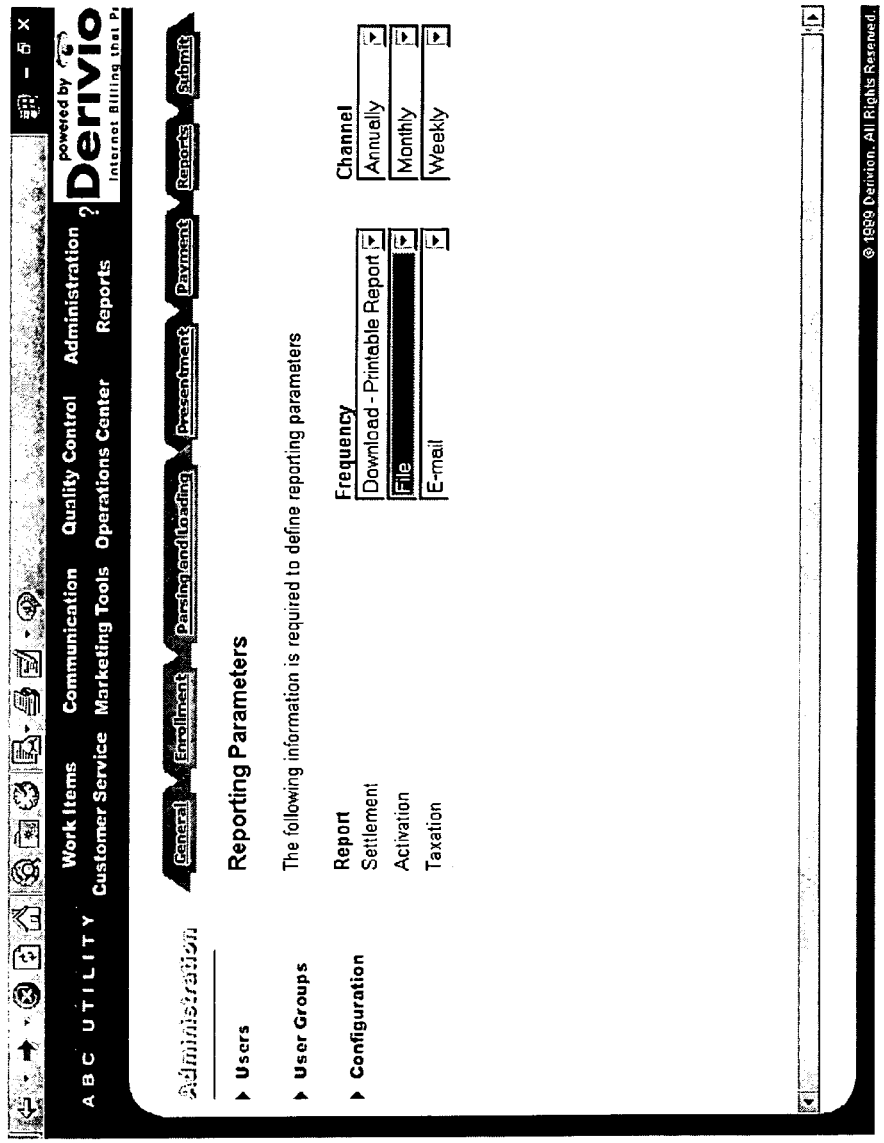
FIG. 10J is a reporting parameters customization screen shot of a biller interface generated by a preferred embodiment of systems and processes of the present invention.

In the preferred embodiment, billers 12 may also use the biller interface to configure and modify a customized electronic bill presentment and payment solution by controlling a number of parameters, such as general parameters, enrollment parameters, parsing and loading parameters, bill presentment parameters, payment parameters, and reporting parameters. FIGS. 10A-10J show a series of web pages that enable billers 12 to customize an EBPP solution. For example, as shown in FIG. 10A, billers 12 configure general billing parameters, such as biller currency, such as US dollars, date format, whether multiple accounts will be permitted, whether consolidation will be permitted, and what type of consolidation will be permitted. Billers 12 may also specify any number of document control parameters. As shown in FIGS. 10B-10E, billers 12 may also configure enrollment parameters. For example, billers 12 may define the facilities that are permitted during trial periods, the number of trial cycles per account, and customer access options. FIG. 10E shows a web page that enables billers 12 to define parsing and loading parameters, such as the type of print stream that is provided to platform 10 and the frequency with which the billing stream will be provided to platform 10. FIG. 10F shows a web page that enables billers 12 to modify and configure bill presentment parameters. For instance, billers 12 may control the appearance of electronic bills by defining different bill presentment templates based on criteria such as the type of banner, customer news, bill news, account page, and menu placement and positioning. Billers 12 may also control the method customers use to pay bills. As shown in FIGS. 10G-10I, billers 12 may enable consumers to pay bills either by direct debit or credit card, such as Visa, MasterCard, Amex, and Discover. FIG. 10J shows a web page that enables billers 12 to define channel and frequency parameters for settlement reports, activation reports, and taxation reports.

Figure 11:
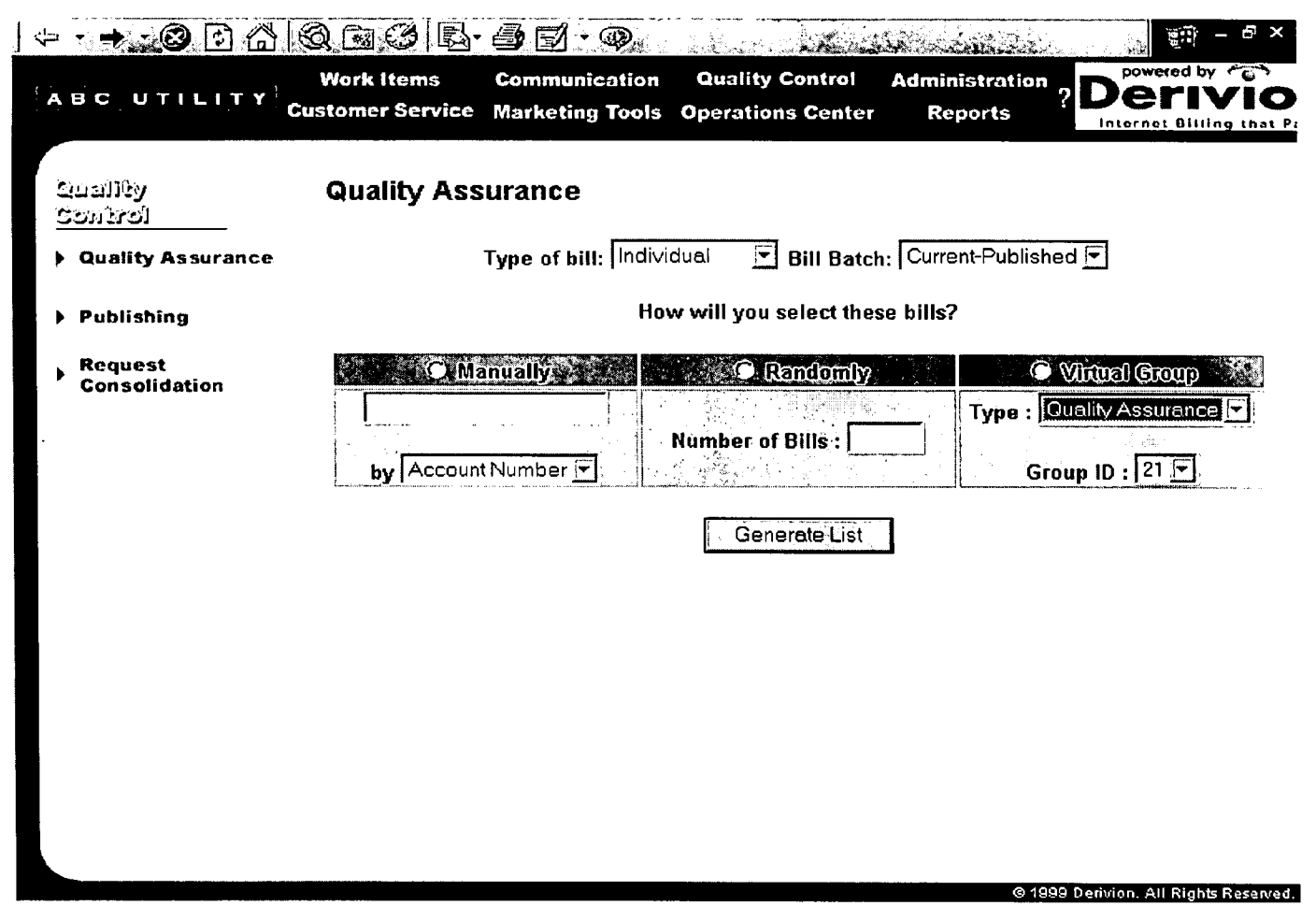
Figure 12:
FIG. 12 is another quality assurance screen shot of a biller interface generated by a preferred embodiment of systems and processes of the present invention.
Figure 13:
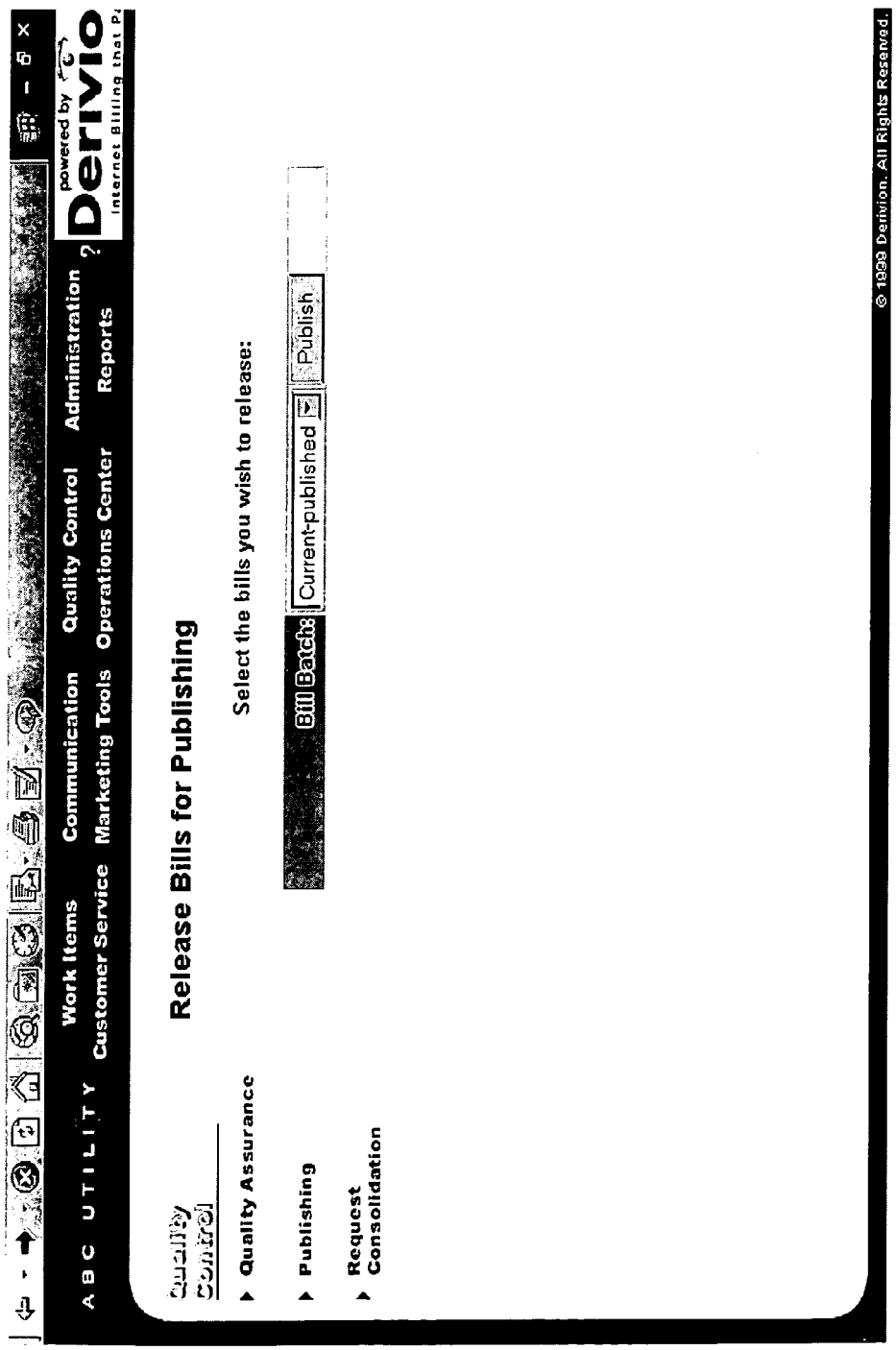
FIG. 13 is a bill publishing screen shot of a biller interface generated by a preferred embodiment of systems and processes of the present invention.
Figure 14A:
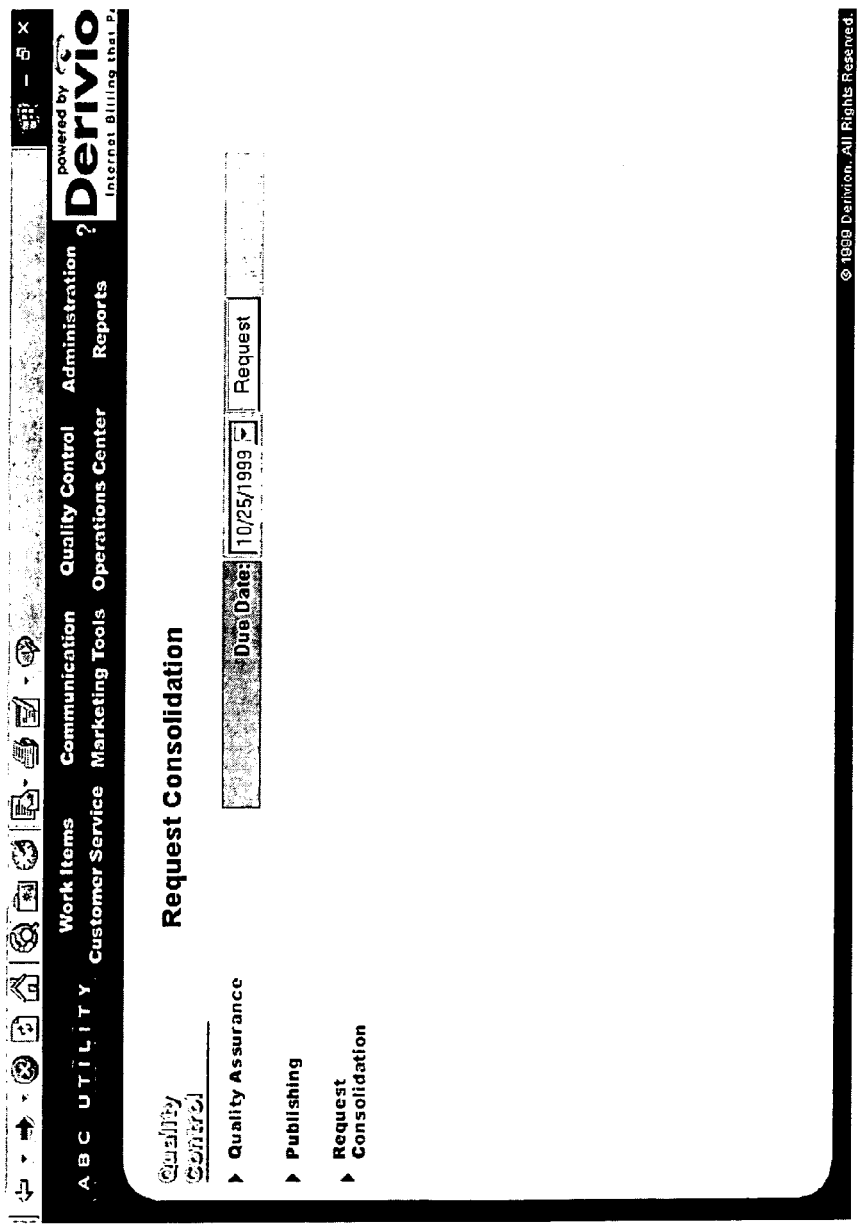
FIG. 14A is a request consolidation screen shot of a biller interface generated by a preferred embodiment of systems and processes of the present invention.
Figure 14B:
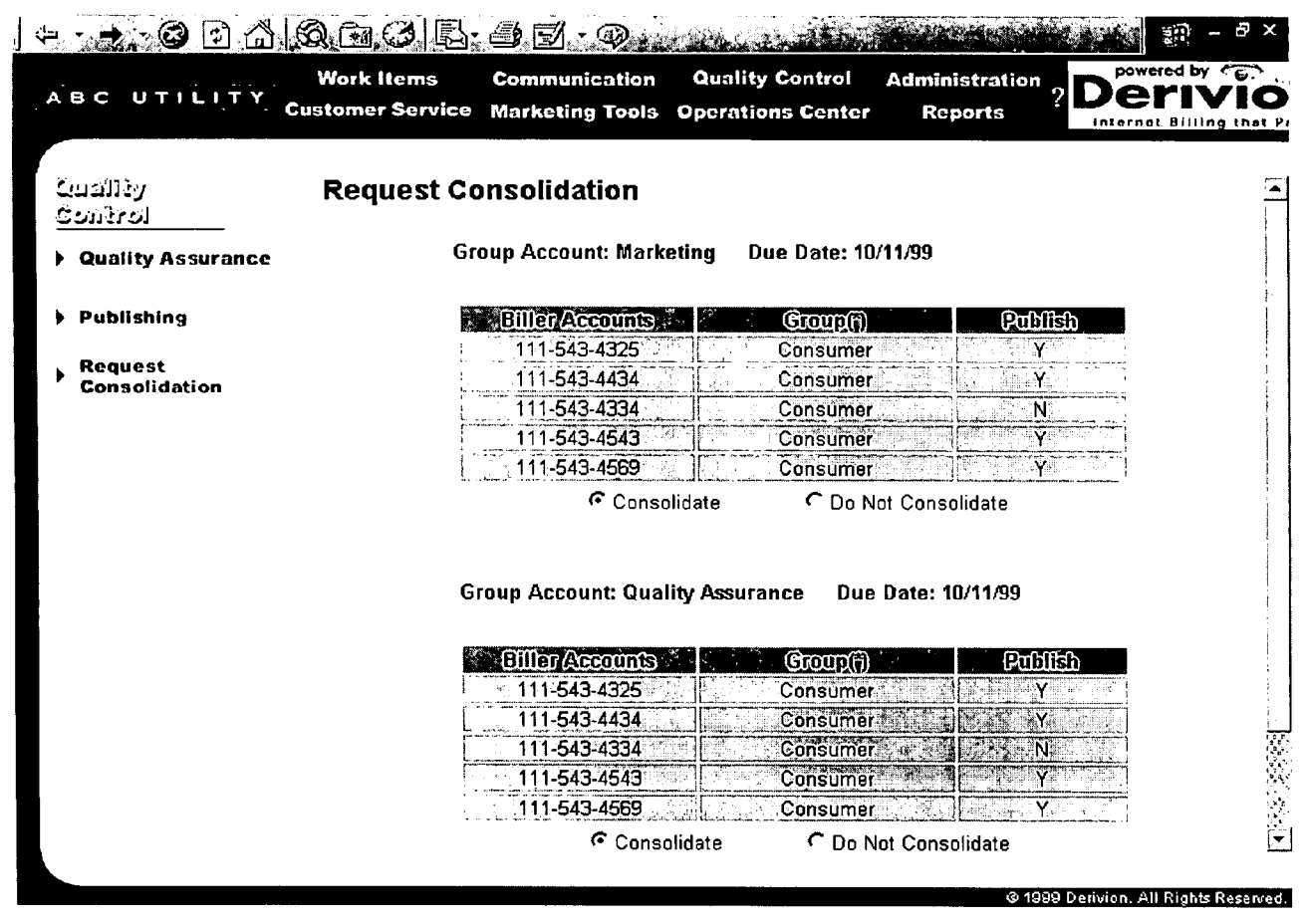

In the preferred embodiment, the biller interface to platform 10 also enables billers 12 to manage an electronic bill presentment and payment quality assurance program. FIG. 11 shows a web page that enables billers 12 to review a particular type of bill or an entire bill batch, such as all bills that have recently been published. The bills may be selected manually by account number, randomly, or based on a particular virtual group and group ID. FIG. 12 shows a web page that enables billers 12 to select and view various biller accounts. Billers 12 may also use the biller interface to release bills for publishing, as shown in FIG. 13, and request bill consolidation, as shown in FIGS. 14A and 14B.

Figure 15:
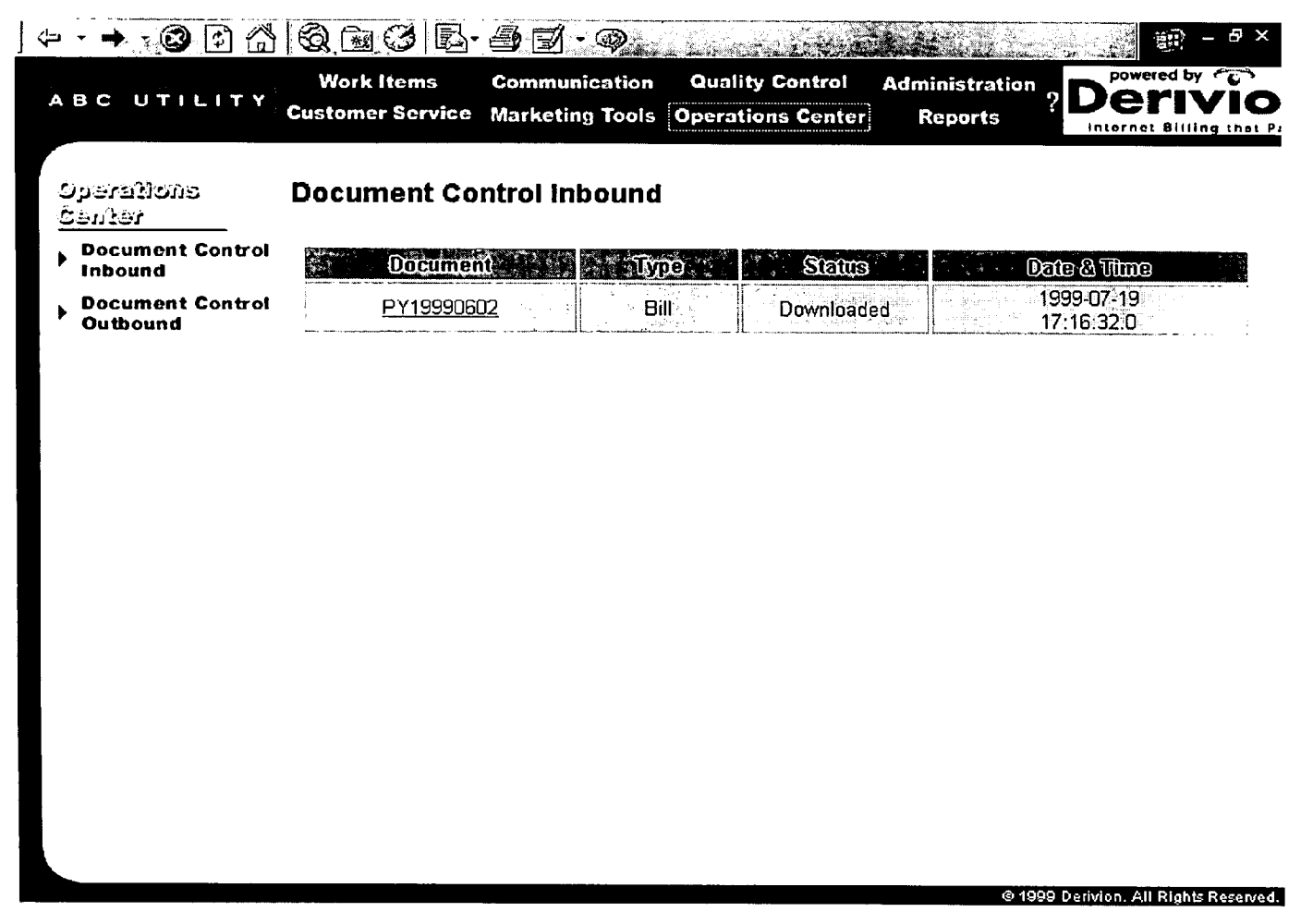
Figure 16:
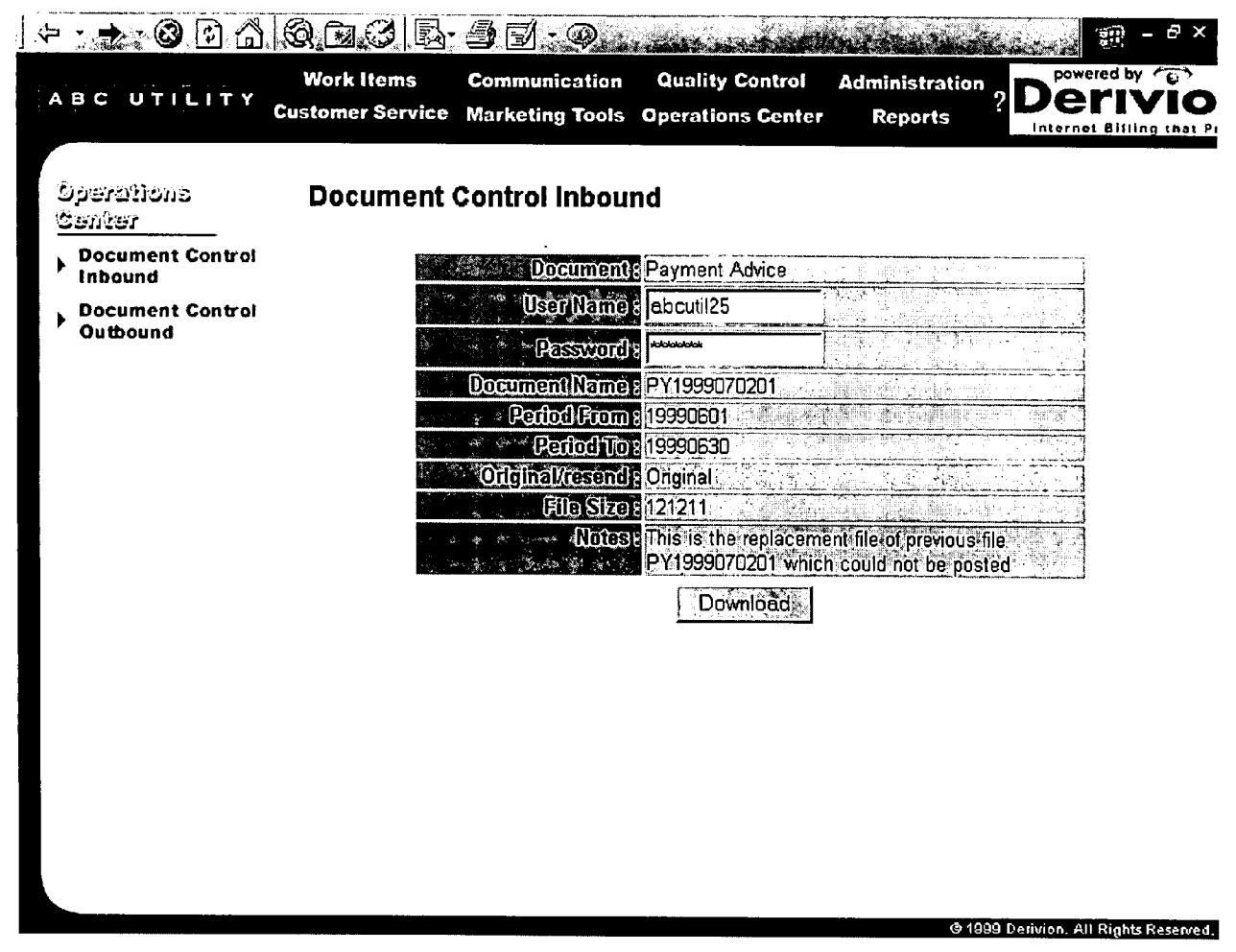
Figure 17:
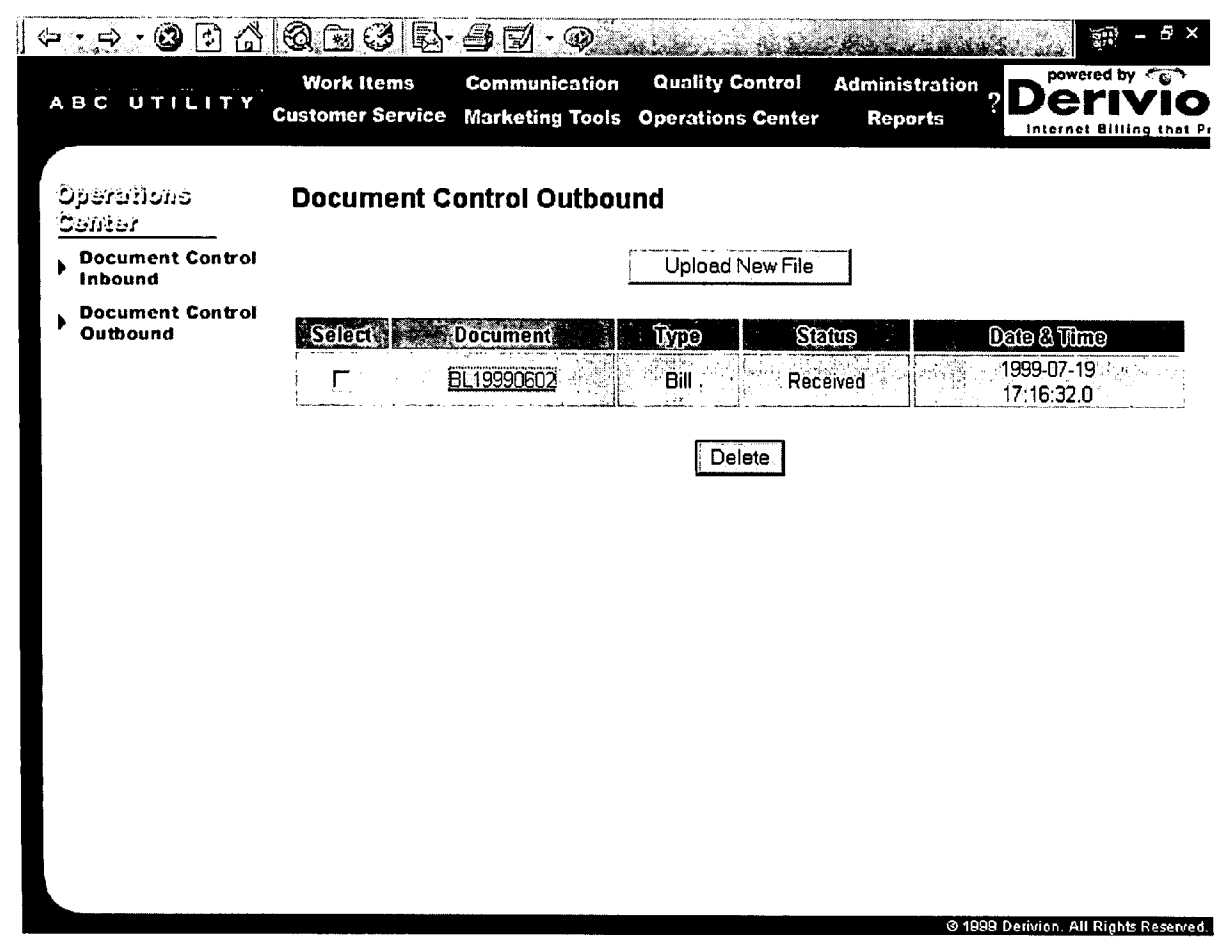
Figure 18:
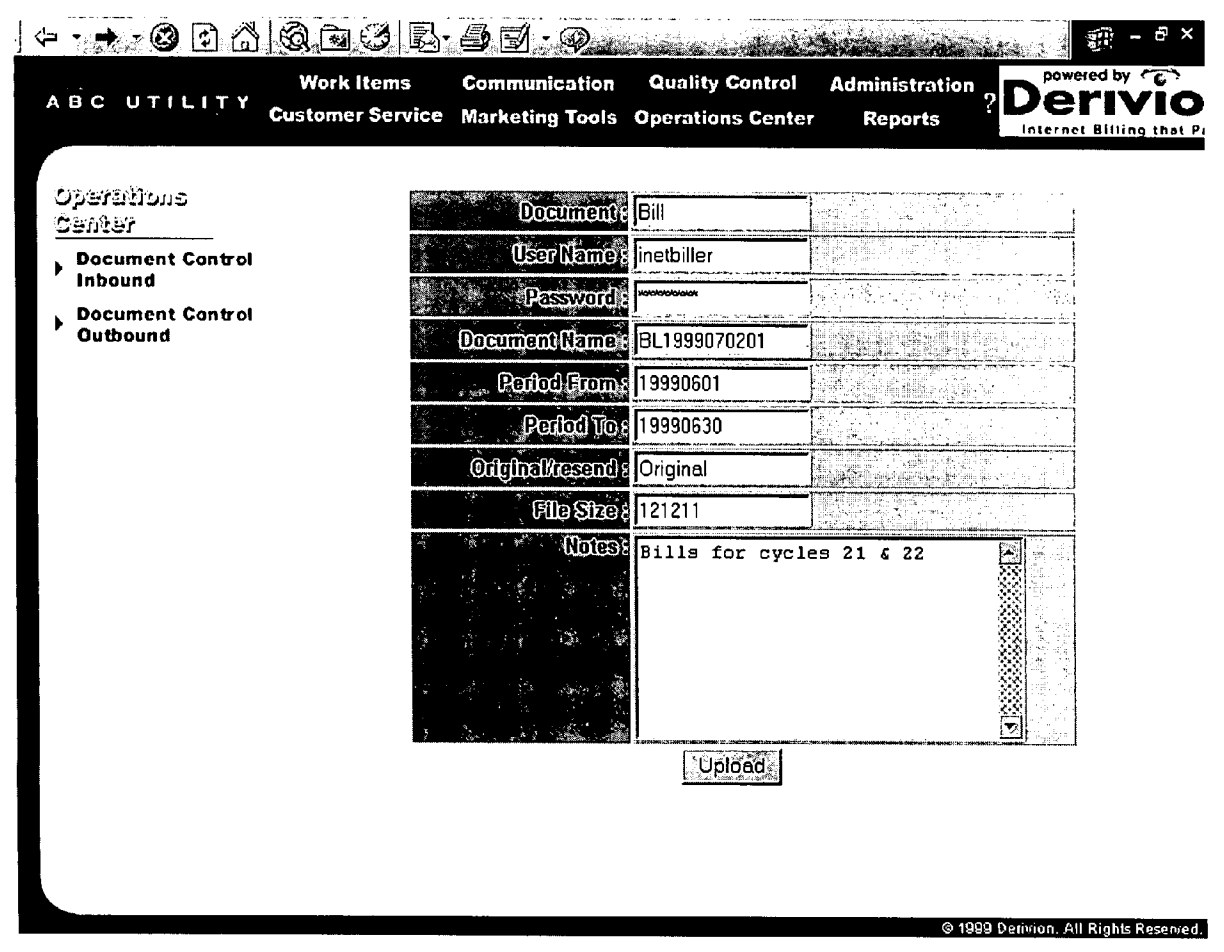

As shown in FIGS. 15-18, the preferred embodiment of the biller interface also enables billers 12 to manage an electronic bill presentment and payment operations center. As shown in FIGS. 15 and 16, billers 12 may control inbound documents received from consumers. The documents may be identified by document number, document type, status, and the date and time they were received. Billers 12 may also control outbound documents in a similar manner, as shown in FIGS. 17 and 18.

Figure 19:
FIG. 19 is a mass email screen shot of a biller interface generated by a preferred embodiment of systems and processes of the present invention.
Figure 20:
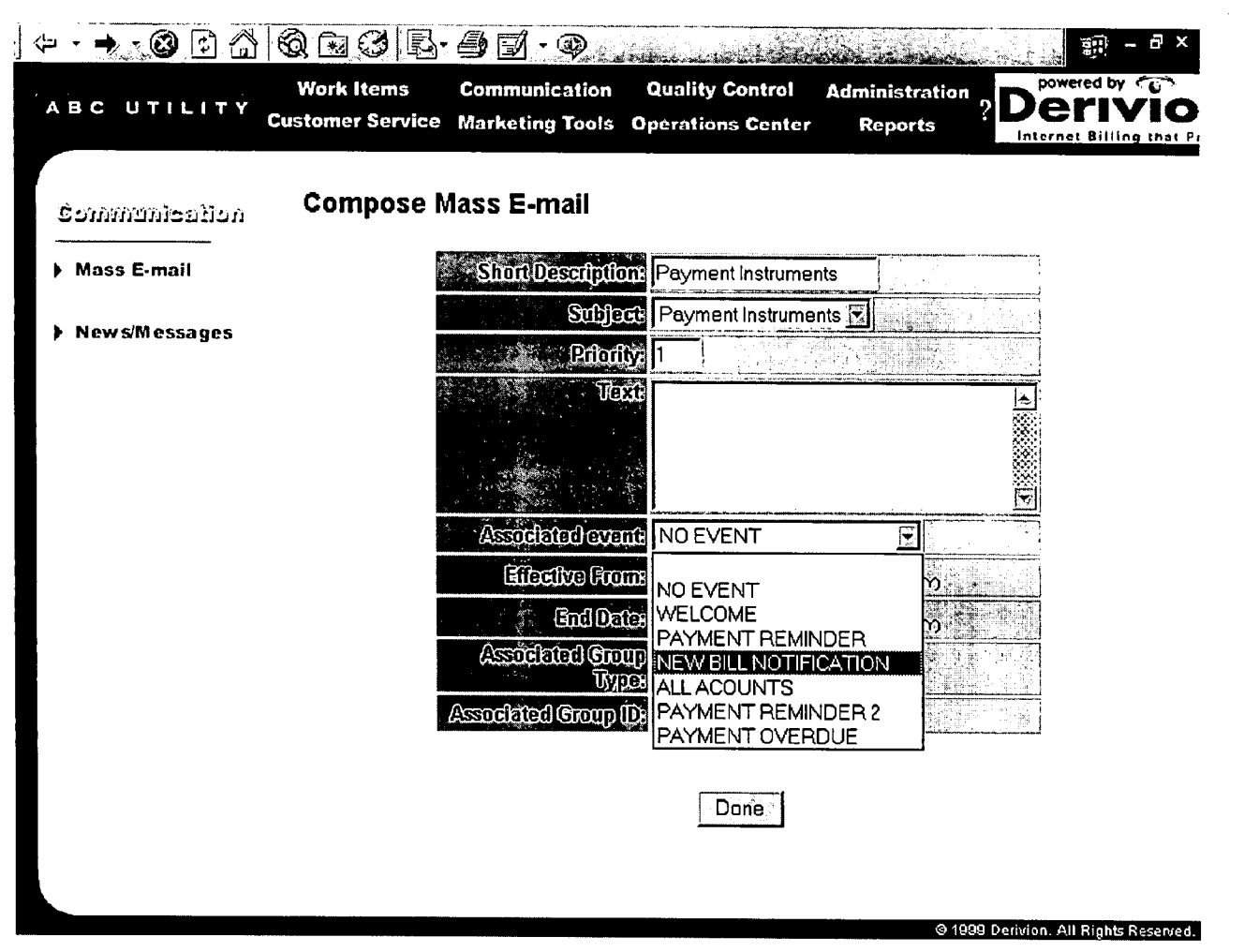
Figure 21:
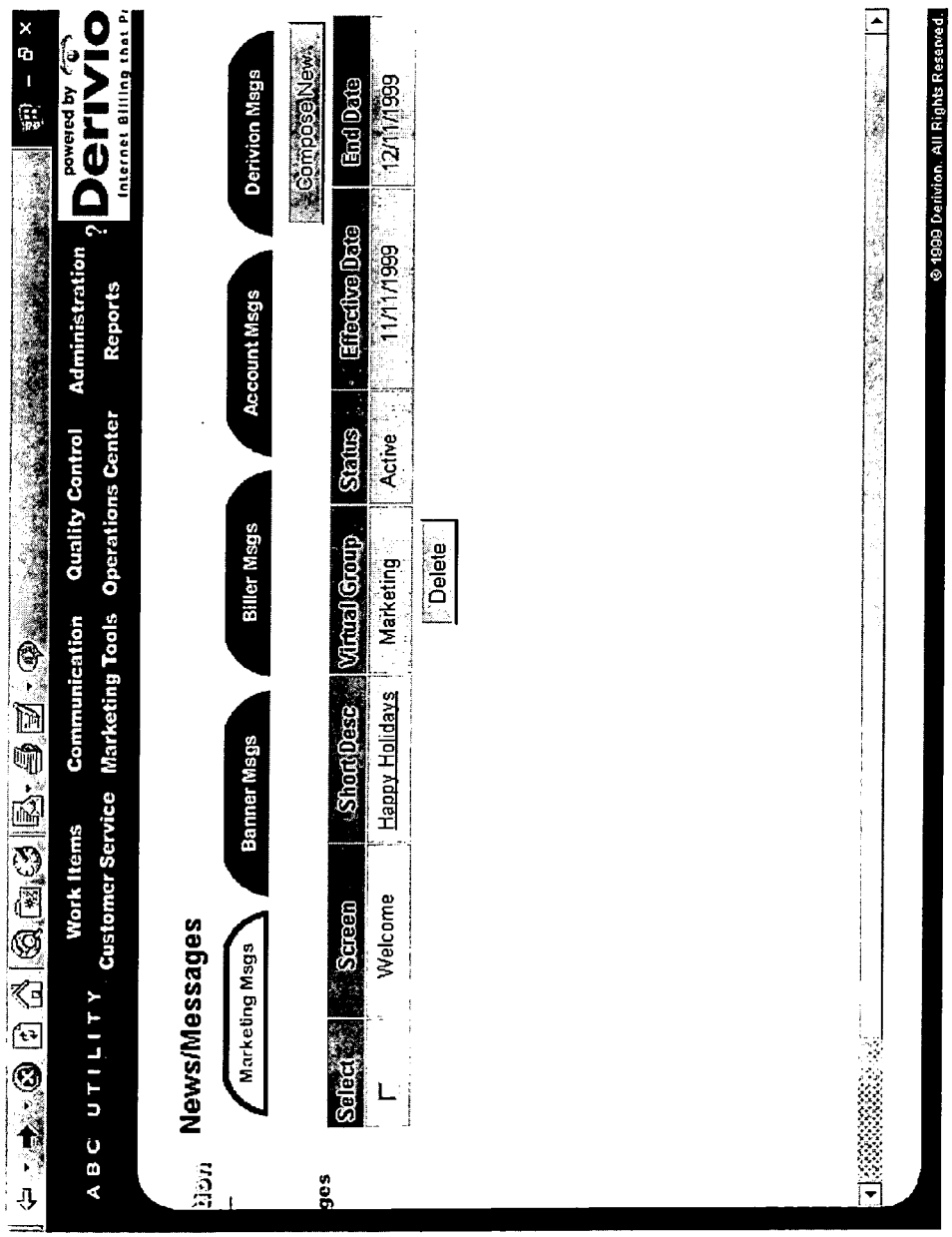
FIG. 21 is a news and messages screen shot of a biller interface generated by a preferred embodiment of systems and processes of the present invention.

FIGS. 19-21 show a series of web pages that enable billers 12 to manage communications with consumers. As shown in FIG. 20, billers 12 may send mass email messages to consumers reminding them of overdue payments, welcoming them to the EBPP program, or notifying them of new bills. Billers 12 may also compose and deliver to consumers news messages, such as marketing messages, banner messages, biller messages, and account messages.

Figure 22:
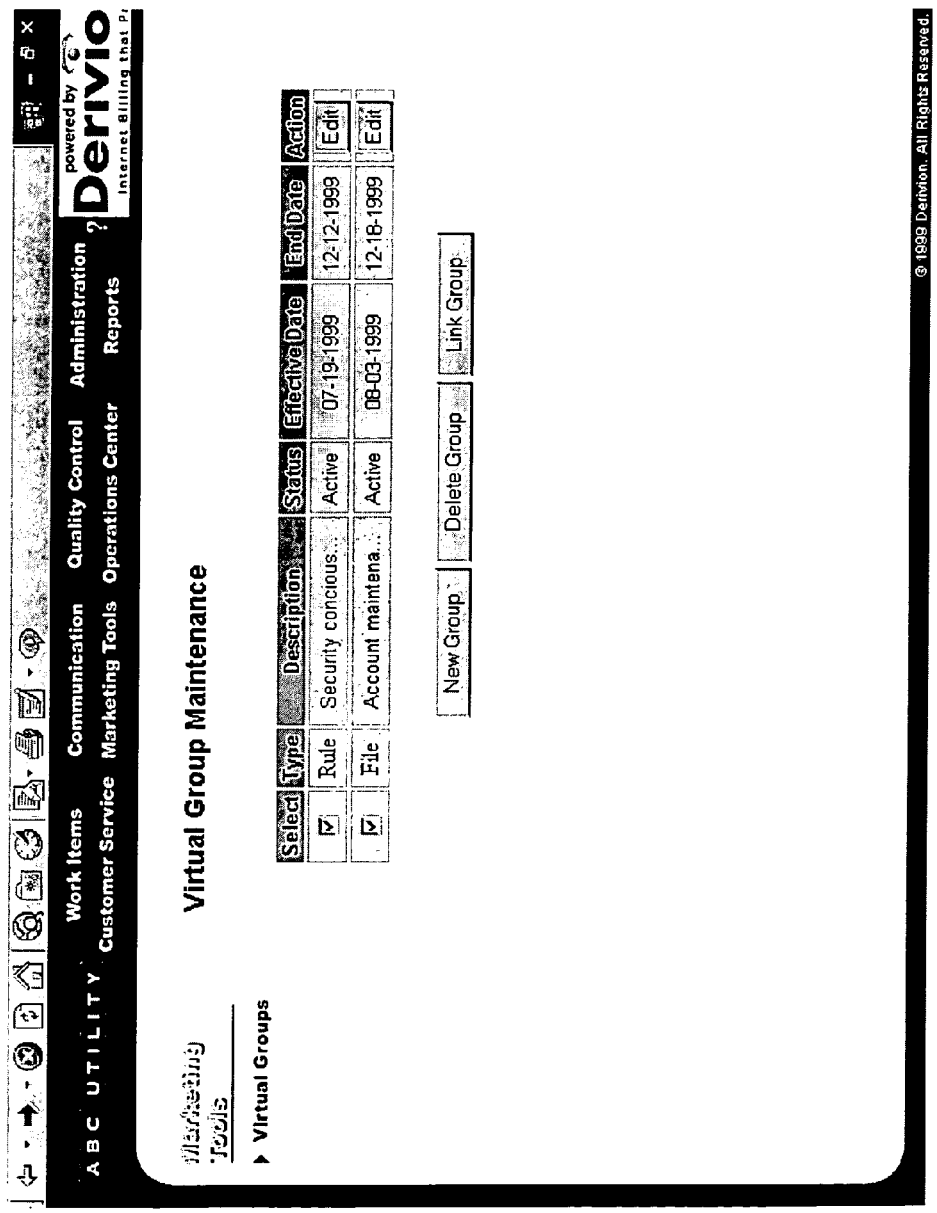
FIG. 22 is a virtual group maintenance screen shot of a biller interface generated by a preferred embodiment of systems and processes of the present invention.
Figure 23:
FIG. 23 is a virtual group edit screen shot of a biller interface generated by a preferred embodiment of systems and processes of the present invention.

The preferred embodiment of the biller interface also enables billers 12 to manage electronic bill presentment and payment marketing functions. For instance, as shown in FIG. 22, billers 12 may perform virtual group maintenance, including creating new virtual groups, deleting existing virtual groups, and linking virtual groups. FIG. 23 shows a web page that enables billers 12 to edit virtual groups by modifying existing conditions, fields, operations, and value parameters or by adding additional virtual group rules, such as those described above.

Figure 24:
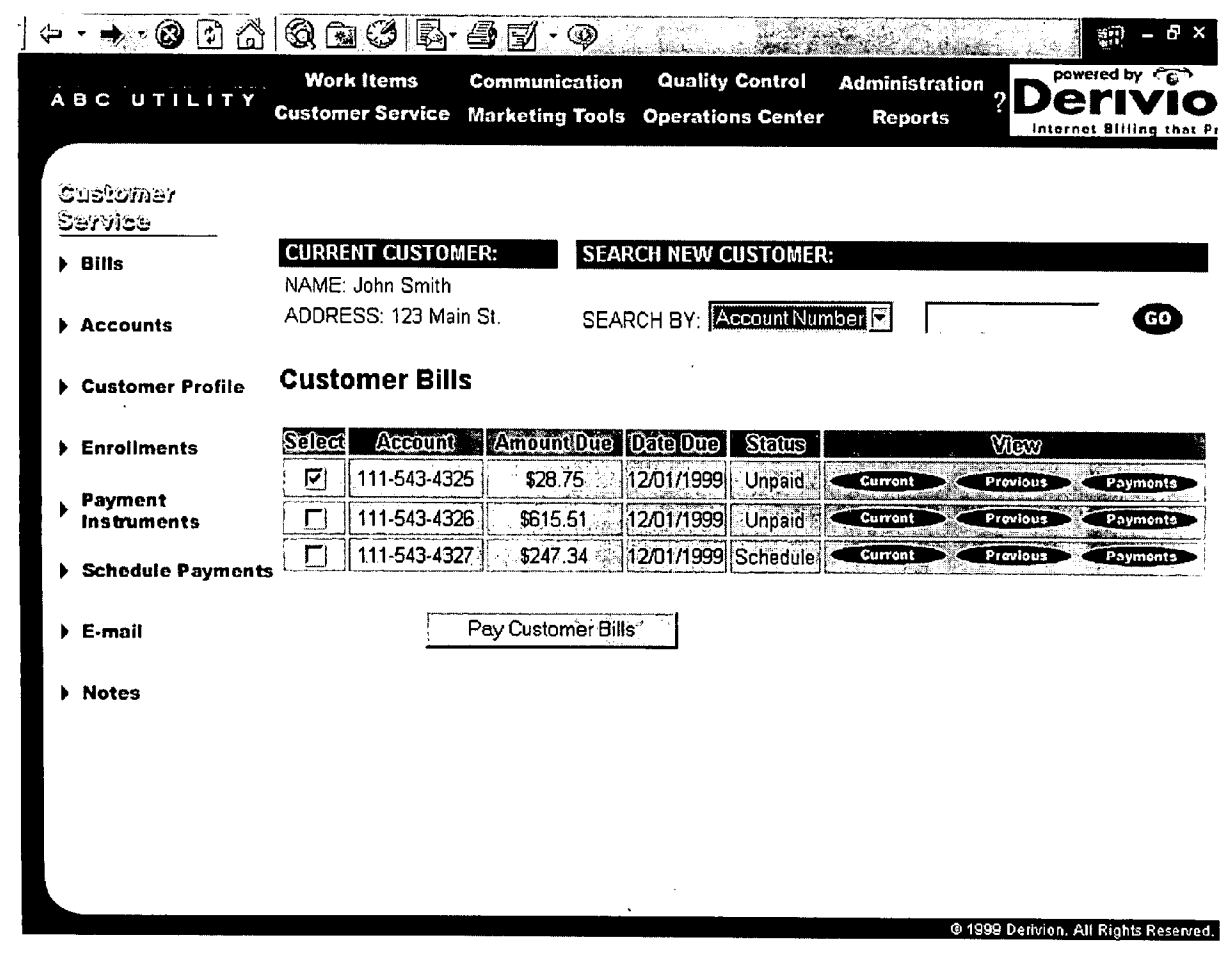
Figure 25:
FIG. 25 is a customer accounts screen shot of a biller interface generated by a preferred embodiment of systems and processes of the present invention.
Figure 27:
FIG. 27 is a customer personal information screen shot of a biller interface generated by a preferred embodiment of systems and processes of the present invention.
Figure 28:
FIG. 28 is a customer agreement screen shot of a biller interface generated by a preferred embodiment of systems and processes of the present invention.
Figure 29:
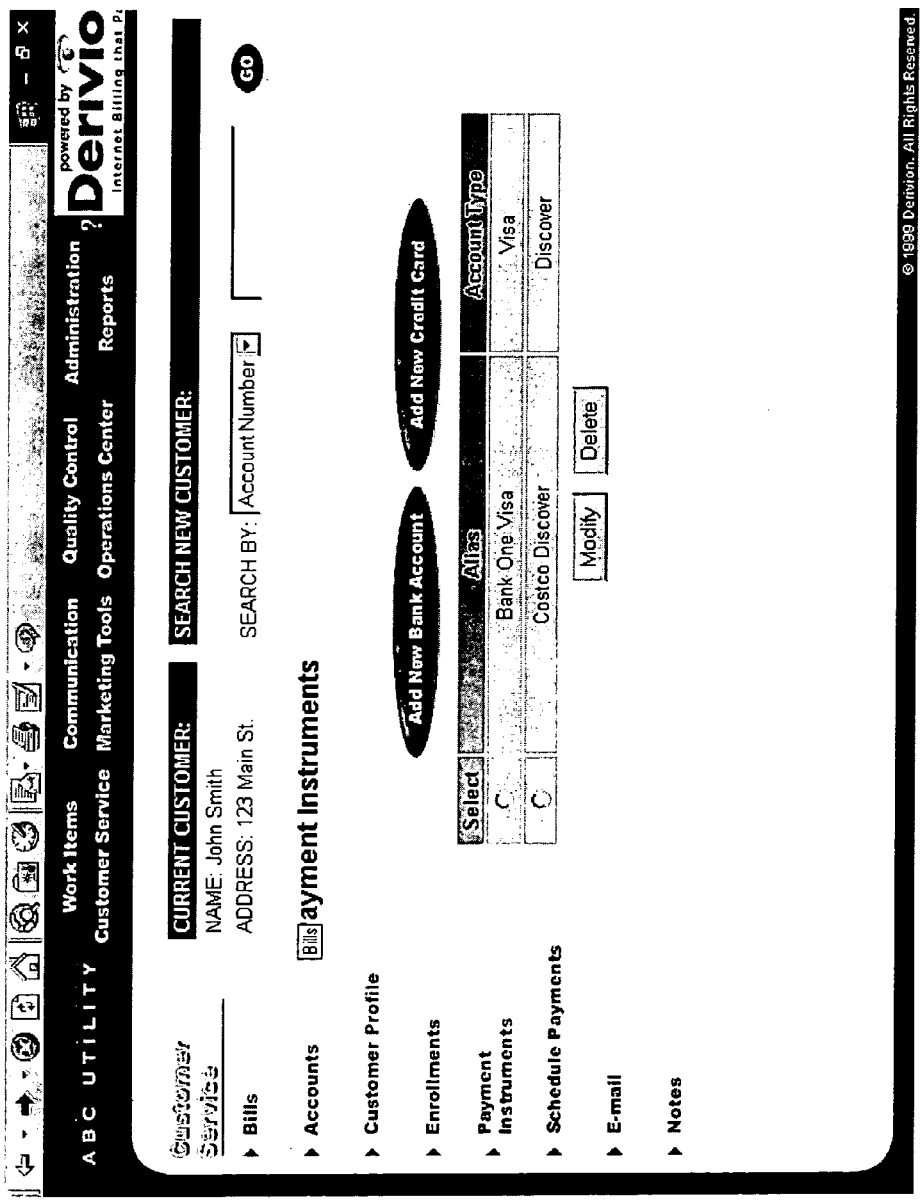
FIG. 29 is a customer payment instruments screen shot of a biller interface generated by a preferred embodiment of systems and processes of the present invention.
Figure 30:
FIG. 30 is a customer scheduled payment screen shot of a biller interface generated by a preferred embodiment of systems and processes of the present invention.
Figure 31:
FIG. 31 is a customer service email screen shot of a biller interface generated by a preferred embodiment of systems and processes of the present invention.
Figure 32:
FIG. 32 is a customer service notes screen shot of a biller interface generated by a preferred embodiment of systems and processes of the present invention.

As shown in FIGS. 24-32, billers 12 may also use the biller interface to support a customer service program. FIG. 24 shows a web page that enables billers 12 to view customer bills in the exact form as they are delivered to and viewed by consumers, which provides customer service representatives a significant benefit in resolving customer service requests. As shown in FIG. 25, billers 12 may also view, activate and deactivate biller accounts. Billers 12 may also view customer information related to customer profiles, customer agreements, customer payment instruments, and scheduled payments. Billers 12 may send email messages to a customer mailbox residing on platform 10. In addition, as shown in FIG. 32, billers 12 may monitor the status of customer service requests by creating and filing customer service notes, which may include information such as account number, subject of customer service request, action date, and whether or not a follow up is required.

System embodiment 10 also supports consumers 18 receiving electronic bills at any location of choice using any interface, such as, for instance, a conventional web browser, other online device, any wireless device, or any other device which may communicate with system embodiment 10 in any manner. Any such device is a candidate to support presentation of or transaction with platform 10 by consumers 18. Consumers 18 can also define the format of the electronic billing information. For example, the billing data may be supplied to consumers 18 in a variety of standard accounting formats. System embodiment 10 also enables consumers 18 to pay electronic bills via credit card, ACH, or electronic funds transfer or using any other mode or medium of payment or reconciliation.

Figure 33:
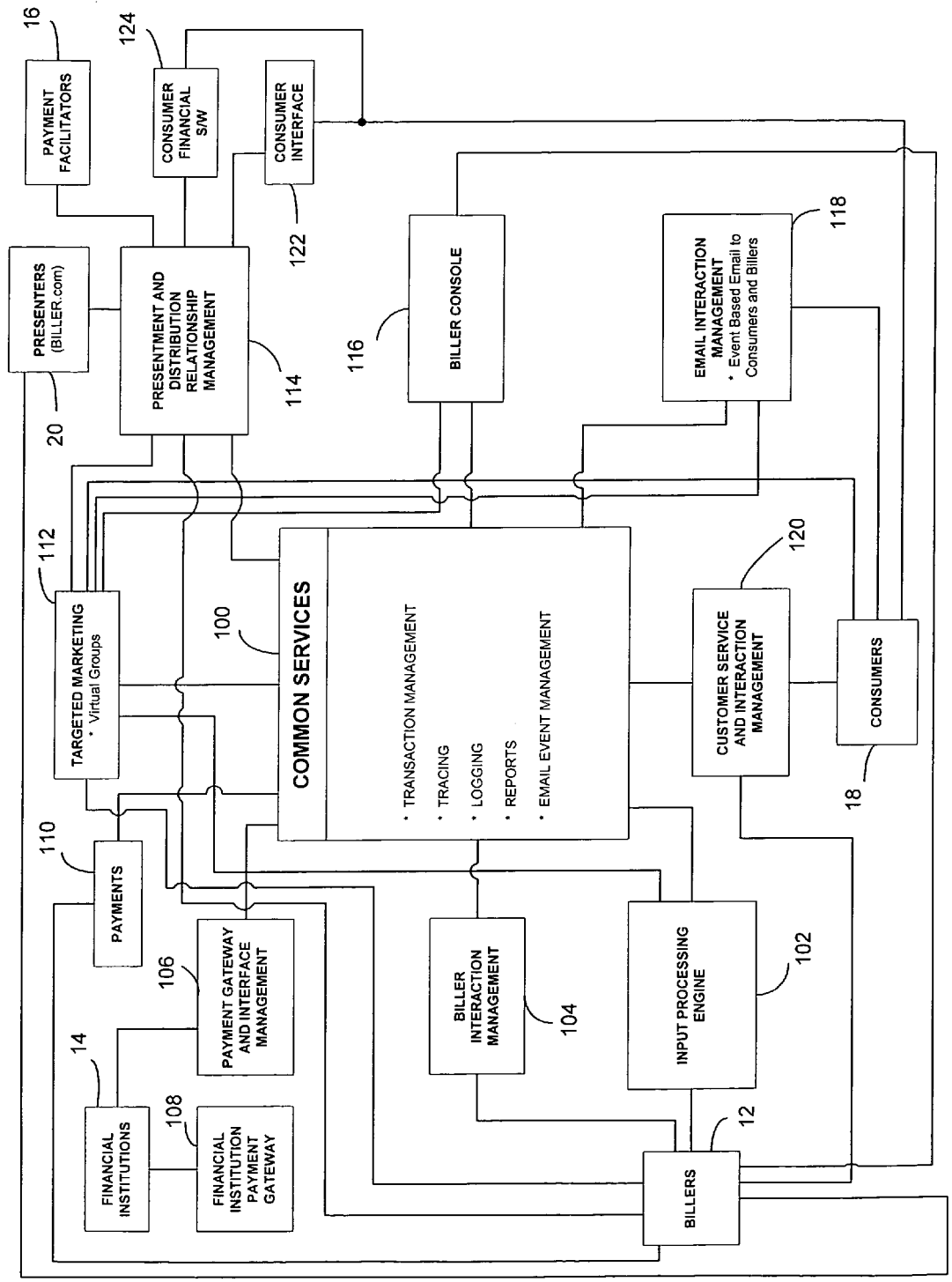
FIG. 33 is a diagram showing various functionalities which may be included in a preferred embodiment of systems and processes according to the present invention.

FIG. 33 is a functional diagram that shows functionality and services supported by platform 10 according to a preferred embodiment of the present invention. Surrounding the common document model/data model database functionality denoted as common services 100 in FIG. 33 are the input processing engine 102, biller interaction management 104, payment gateway and interface management 106, financial institution payment gateway 108, payment functionality 110, targeted marketing functionality 112, presentment and distribution management 114, biller console 116, e-mail interaction management 118 and customer service and interaction management 120. Any or all of these can couple to database 26 (common services 110) data and data attributes to accomplish their purposes, using a lingua franca such as XML. Thus, billers do not lose control over their data once it is "launched" over to the platform 10; instead, biller may, among other things:

a. control parsing rules in the input processing engine 102 to accommodate virtual groups according to virtual group functionality 112;

b. interact with customers while seeing their billing records, using customer service and interaction management functionality 120;

c. control how bills or reminders are sent to customers using e-mail, using functionality 118;

d. control appearance and other characteristics of bill presentment in real time using presentment and distribution relationship management functionality 114;

e. get reports and otherwise control the billing process (including for example, obtaining parsing reports, getting account receivable information or feeds, stopping or starting print or enrollment, and other tasks) using biller interaction management 104;

f. support its own website for presentment and payment of bills; and of course g. get paid via payment functionality 110.

From a customer's point of view, his or her bills can be supported anywhere, and customers are allowed additional communications with billers via e-mail interaction management 118 and interfaces 122.

Financial institutions (or any other entity, such as payment facilitators or other EBPP operations) are connected and can transact with their customers (who also happen to be biller's customers) more efficiently and effectively through various gateways and other interfaces. Indeed, financial institutions may if desired, fit within the category of billers, and be connected the in the same or similar manner, to accomplish the same sorts of enhanced contact with their customers to conduct electronic commerce, which may include presentment and payment of bills.

This diagram is merely logical; any of these functionalities can reside within other functionalities, and not all of them need to be included to carry out various purposes or results obtained by the present invention. Furthermore, the connections to the functionalities and between them are logical; billers may be connected via bus or to only one biller interaction functionality in order to carry out some or all of the control that systems and processes according to the present invention could allow.

Figure 34:
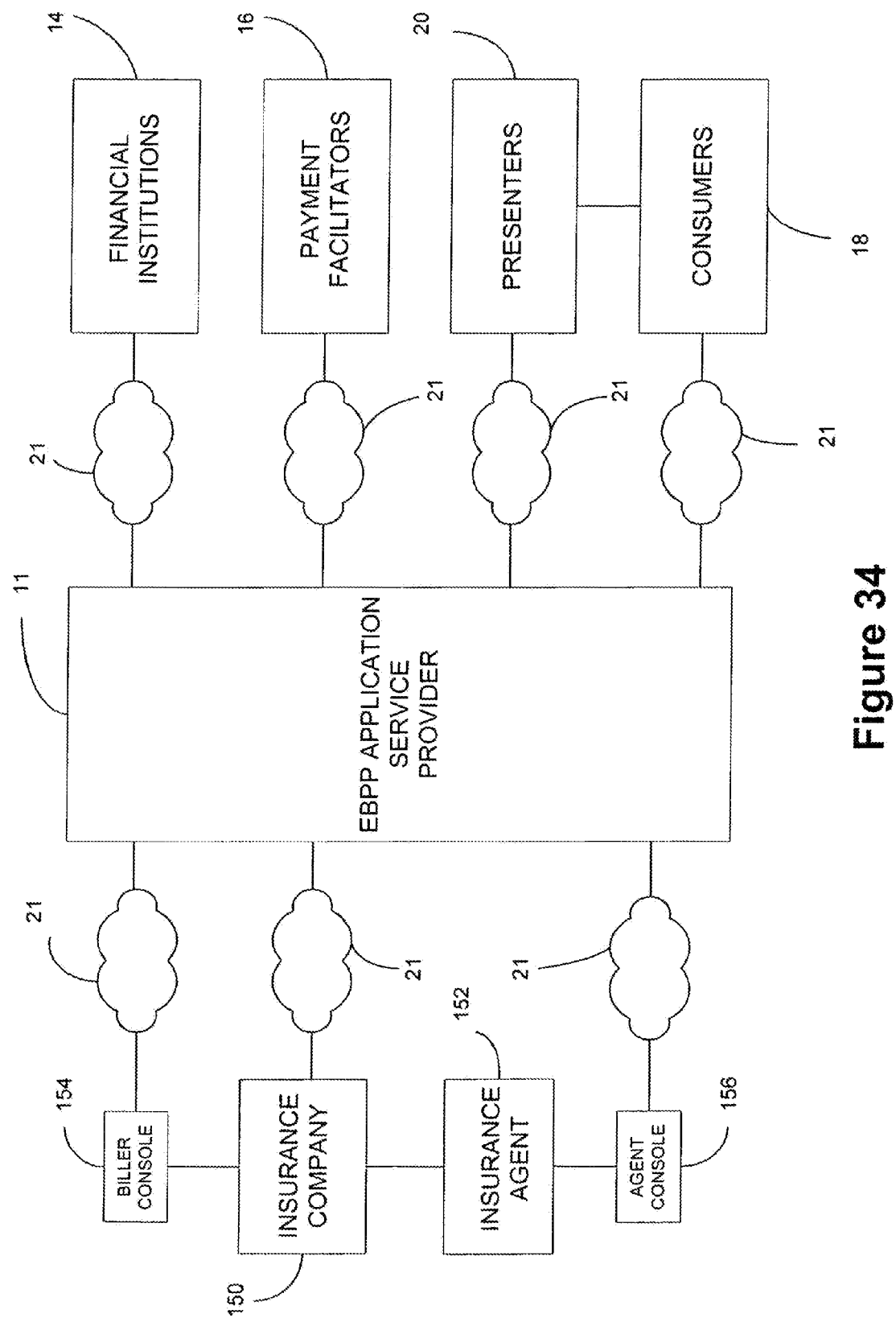
FIG. 34 is a diagram showing external connectivity of an alternative embodiment of systems and processes according to the present invention.

FIG. 34 shows merely one example of how EBPP systems and processes according to the present invention can connect to accommodate the interests of various parties in an electronic commerce context. Here a system 11 accommodates an insurance company and its agents. Sometimes agents 152 are the ones who get the premium checks, but more usually the insurance company gets the check or premium payment via direct deposit. But the agents get paid on commission from the company 150, and they want to have continual access to payment status on all their customers. EBPP system 11 allows this to occur by connecting the agent 152 and the company 150 to the EBPP system 11 via agent console or interface 156, the company 150 in the context of a biller 12. Payment can occur via check, or other forms of payment supported by EBPP system 11 through financial institutions 12, facilitators 16, credit organizations, or otherwise. The customer pays the bill which has been presented anywhere according to any desired format and the wishes of the insurance company. Immediately the insurance company 150 and the agent 152 know the bill has been paid. The agent can be paid his or her commission via system 11 if desired. The system 11 is particularly useful for policies that cover multiple insureds or lines of insurance; the company and the employer can access, according to preset permissions, the database 26 and drop employees who have left, for example, or add new employees to the coverage, and can add, drop or modify lines of insurance easily and quickly.

Figure 35:
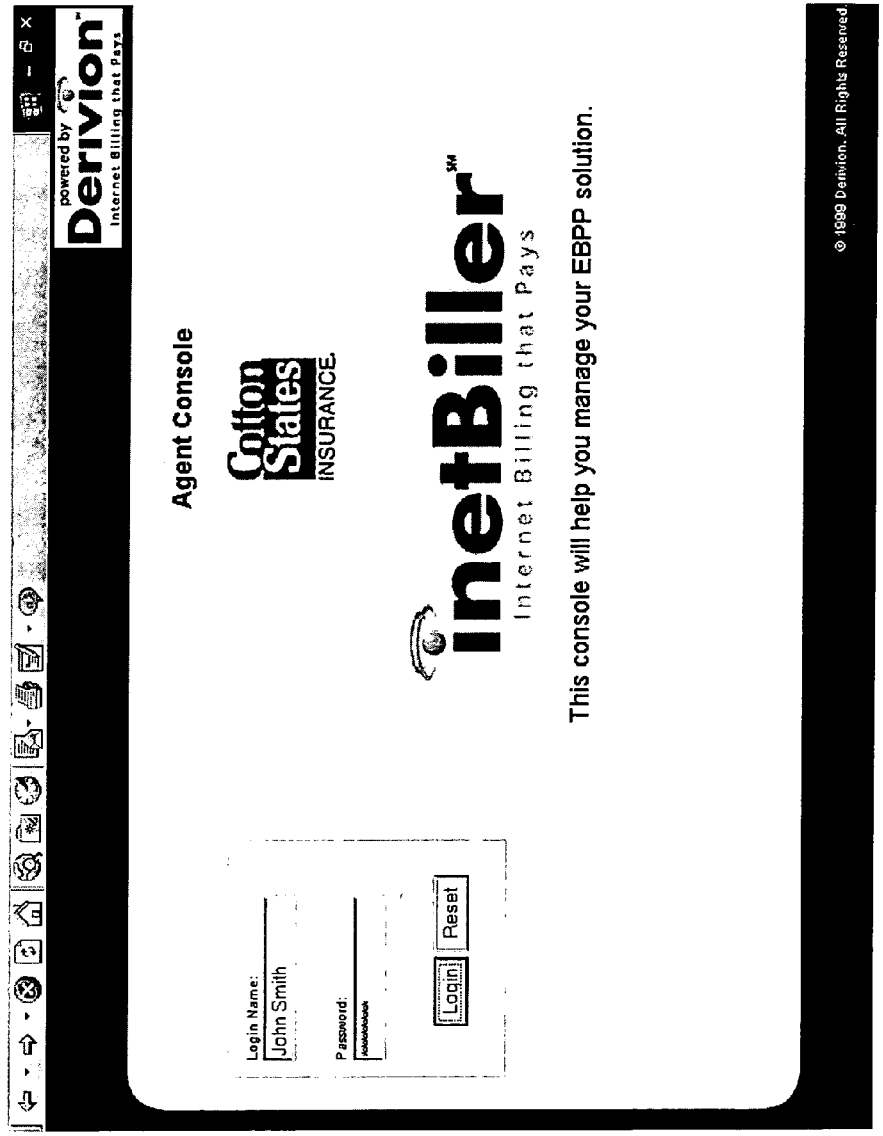
FIG. 35 is an agent sign in screen shot of an agent interface generated by a preferred embodiment of systems and processes of the present invention.

FIGS. 35-65 show a series of web pages for an agent console 156 according to a preferred embodiment of systems and processes of the present invention. In the preferred embodiment, agent console 156 enables an agent of a company, such as an insurance agent or any other agent of a company, to access information related to customers, communicate with the company and customers, and conduct electronic business transactions with the company and customers. The information may be related to customer payment status, customer profiles, customer policies, or any other information associated with the relationship between the agent, the company, and customers. FIG. 35 shows a web page that enables an agent to access EBPP system 11 by entering a login name and password. After the login name and password are authenticated against a database within system 11, the agent gains access to system 11.

Figure 36:
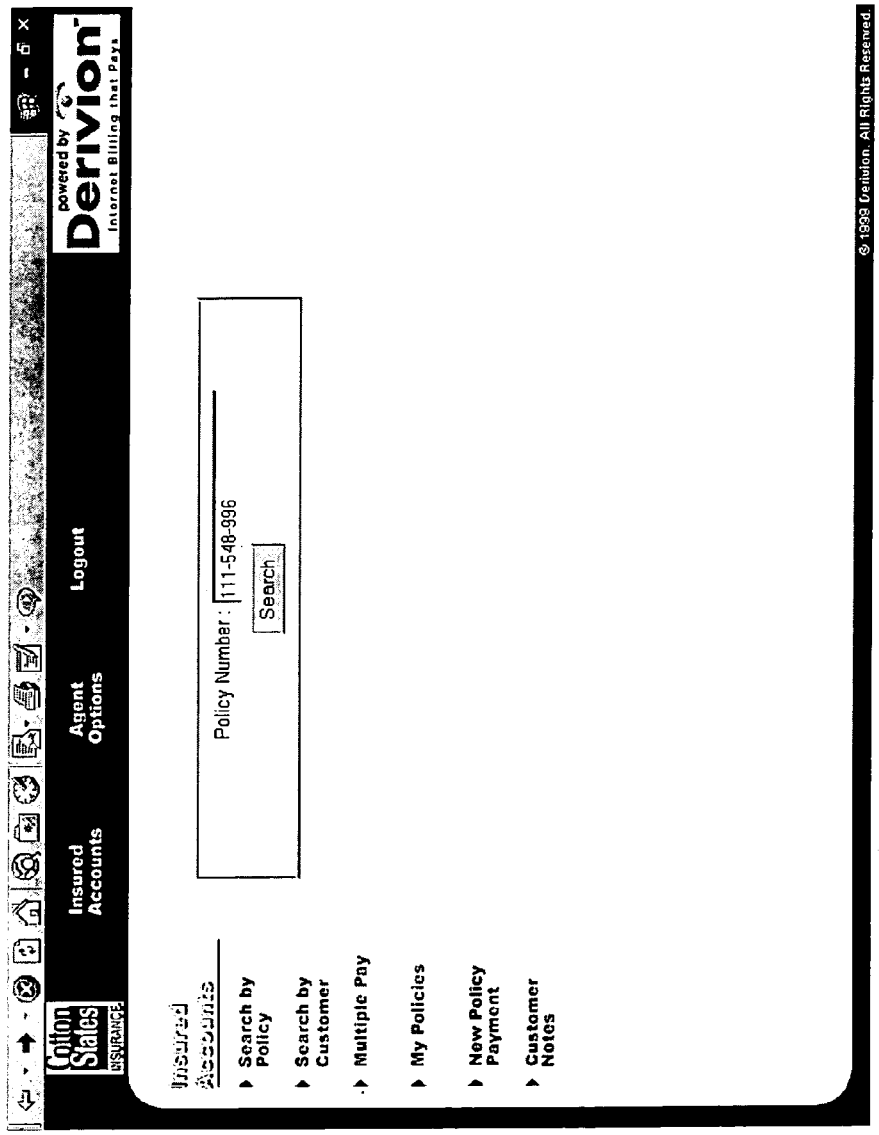
FIG. 36 is a policy number search screen shot of an agent interface generated by a preferred embodiment of systems and processes of the present invention.
Figure 37:
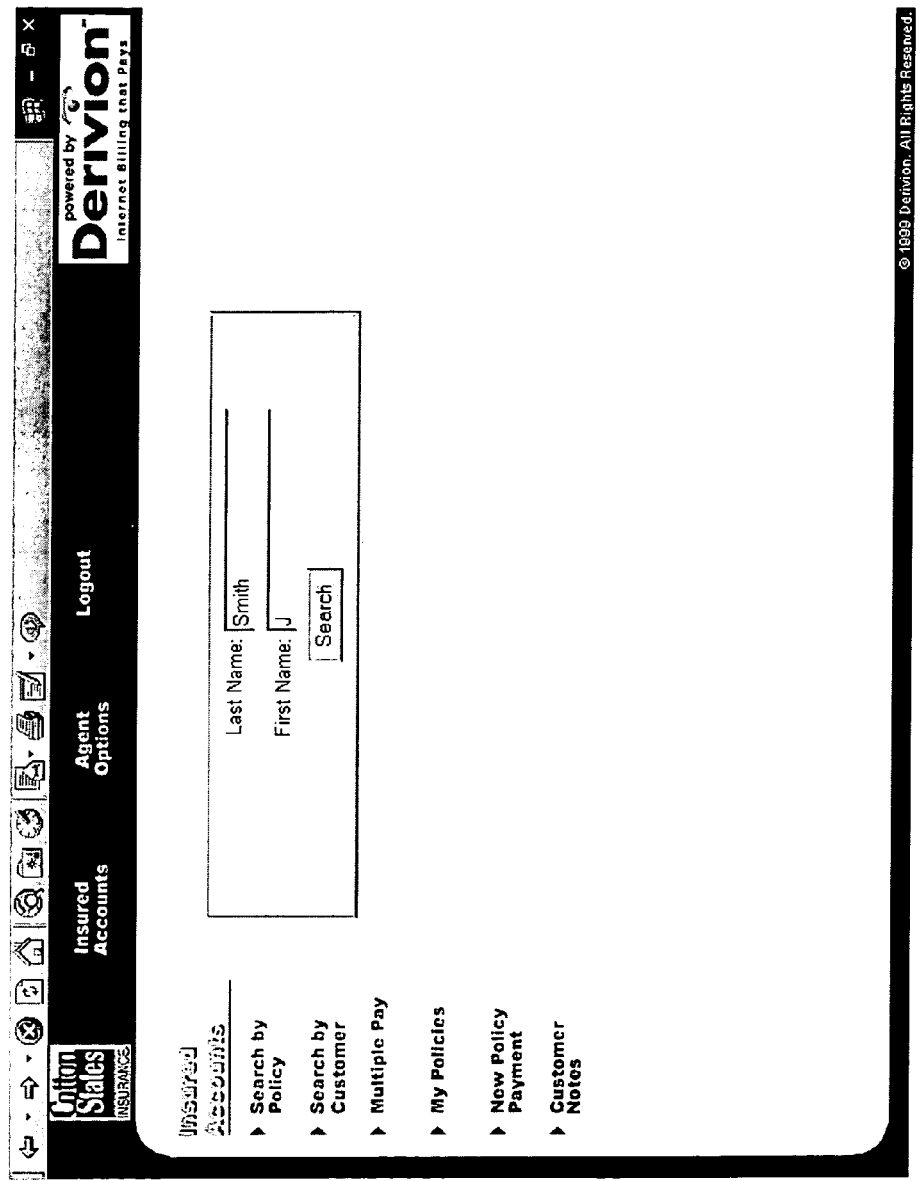
FIG. 37 is a customer name search screen shot of an agent interface generated by a preferred embodiment of systems and processes of the present invention.
Figure 38:
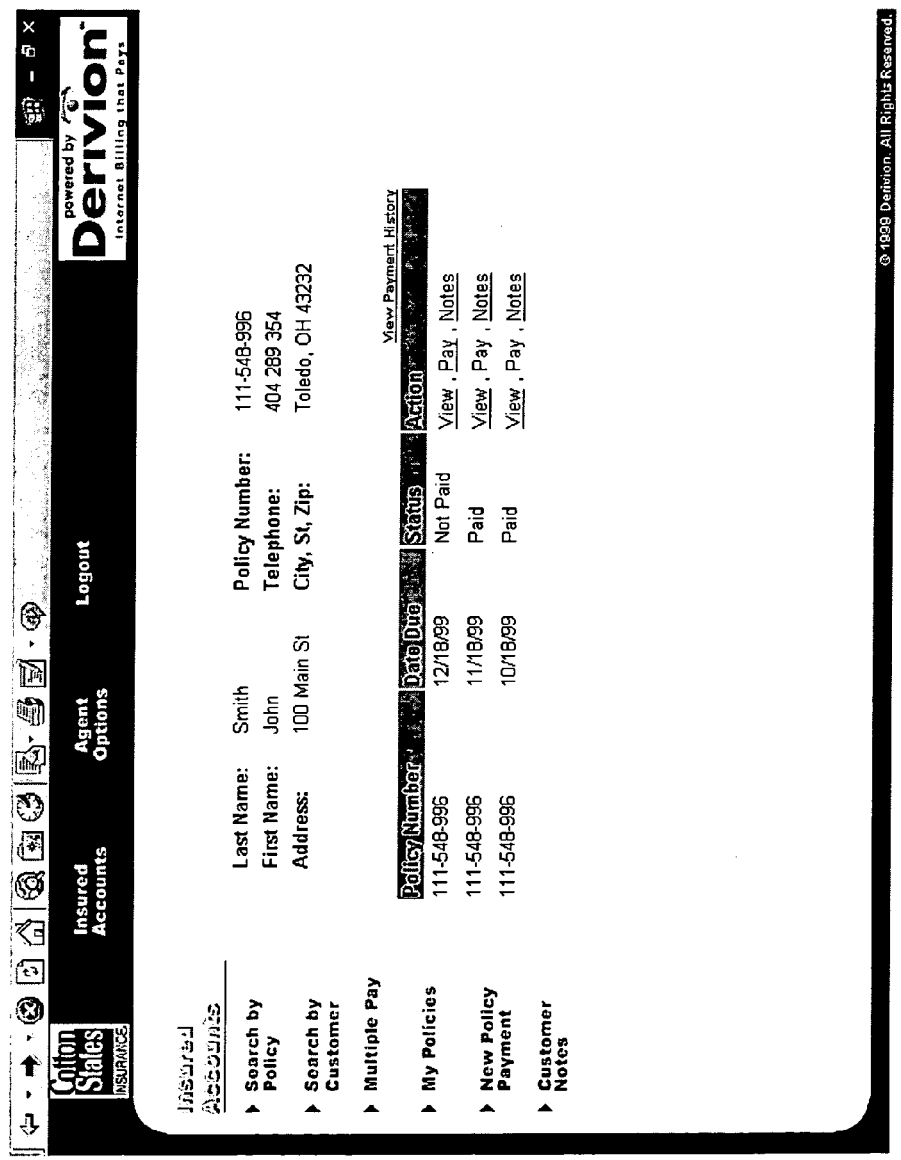
FIG. 38 is a policy information screen shot of an agent interface generated by a preferred embodiment of systems and processes of the present invention.
Figure 39:
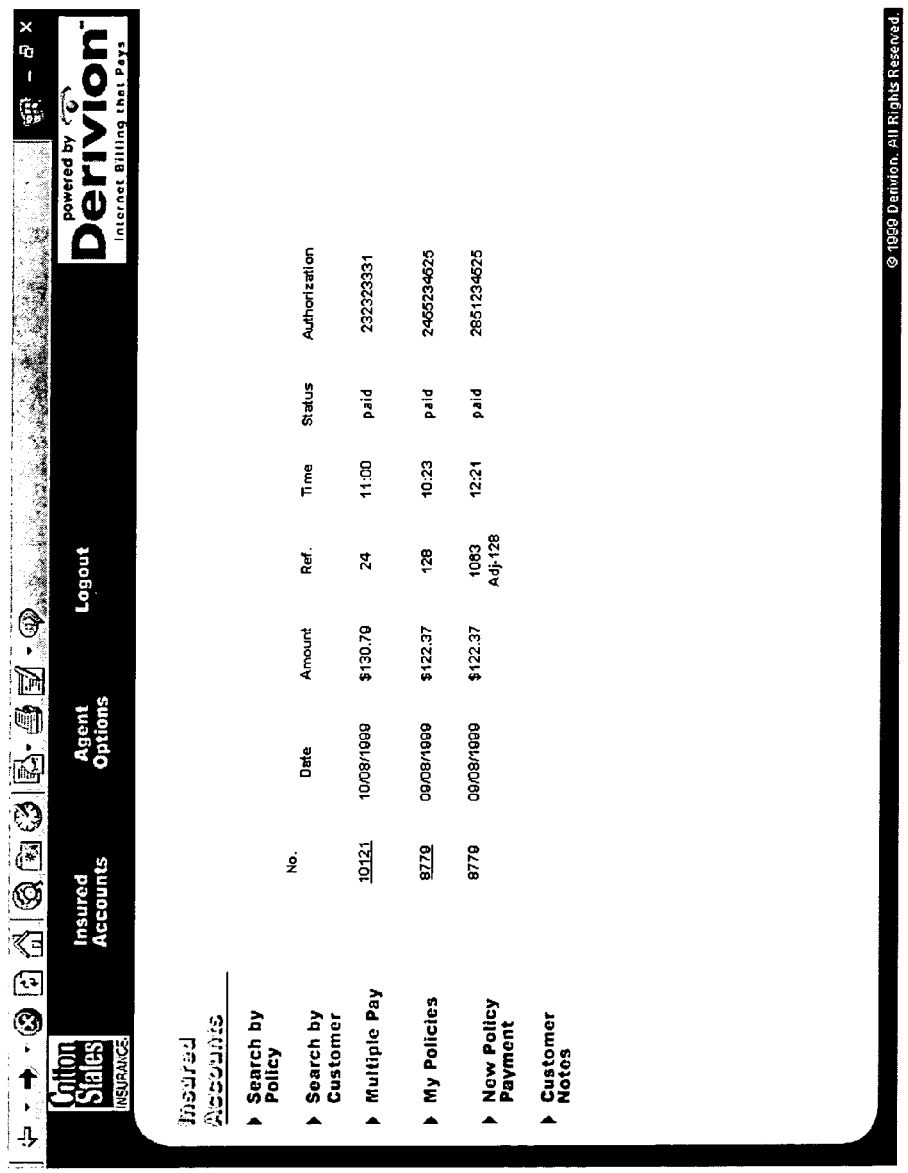
FIG. 39 is a payment history display screen shot of an agent interface generated by a preferred embodiment of systems and processes of the present invention.
Figure 40B:
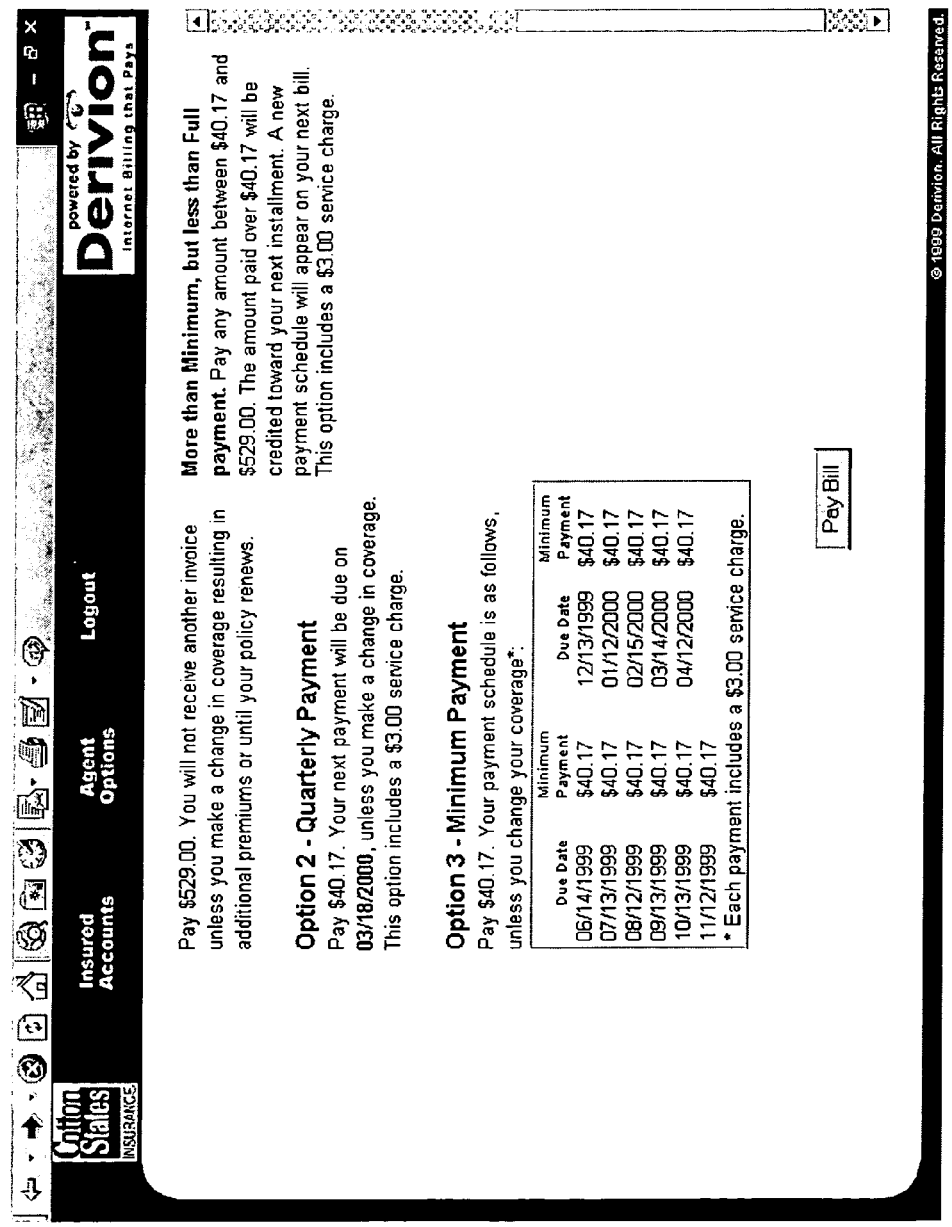
FIG. 40B is another customer policy display screen shot of an agent interface generated by a preferred embodiment of systems and processes of the present invention.
Figure 41:
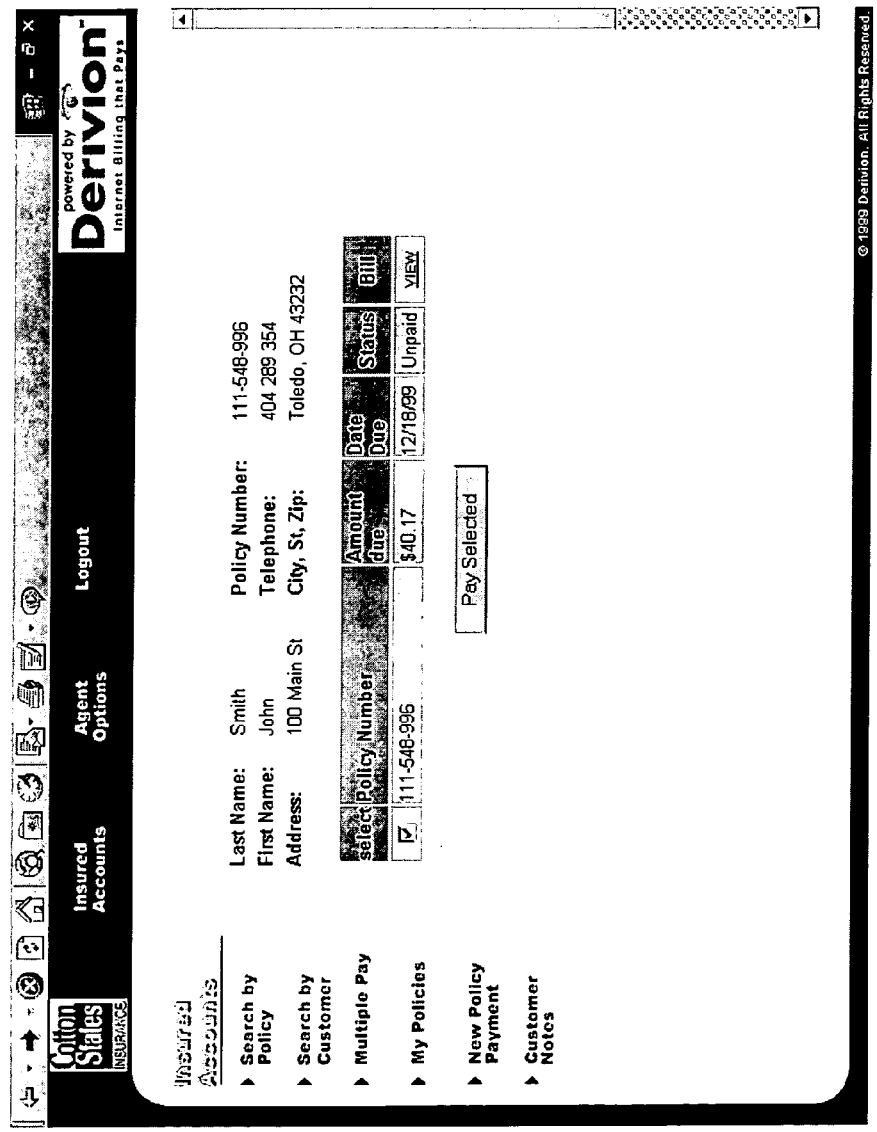
FIG. 41 is a policy payment display screen shot of an agent interface generated by a preferred embodiment of systems and processes of the present invention.
Figure 42:
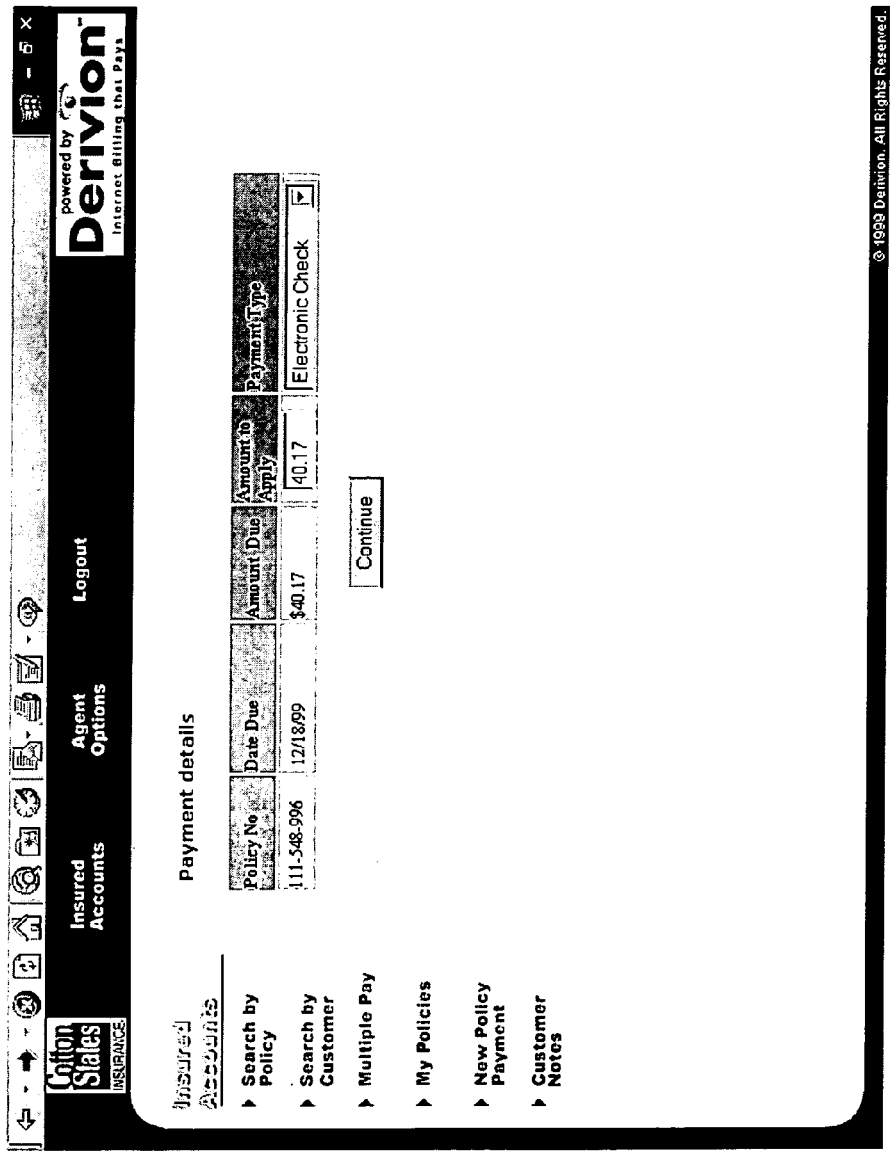
FIG. 42 is a policy payment details screen shot of an agent interface generated by a preferred embodiment of systems and processes of the present invention.
Figure 43:
FIG. 43 is another policy payment details screen shot of an agent interface generated by a preferred embodiment of systems and processes of the present invention.

FIGS. 36-59 show a series of web pages that enable an agent to perform customer account management services. For example, an agent may search for customer account information based on policy number, as shown in FIG. 36, or based on customer name, as shown in FIG. 37. FIG. 38 shows a web page that displays customer account information for a particular policy number that has been queried by an agent. An agent may view the payment history for the customer, view the customer policy and payment schedule, make payments to the company for the customer, or send electronic messages to the customer. FIG. 39 shows the linked web page that displays the payment history information for a customer, which contains a list of each transaction and related information, such as the date of payment, amount of payment, the transaction number, the authorization number, payment status, and the customer reference number. FIGS. 40A and 40B show the linked web page that enables an agent to view a customer policy and make policy payments. For instance, FIG. 41 shows the linked web page that enables an agent to view customer payment information and the electronic bill. FIGS. 42 and 43 show the linked web pages that enable an agent to select the type of payment parameters for the transaction. For example, an agent may select how much of the amount due to apply to the transaction and the type of payment, such as by electronic check, credit card, cash, money order, or any other suitable payment method. If the customer desires to pay via electronic check, the agent may also select the type of account, such as checking or savings. FIG. 44 shows a web page that enables an agent to send a note to a consumer on a personalized mailbox, which resides on platform 10 of system 11.

Figure 45:
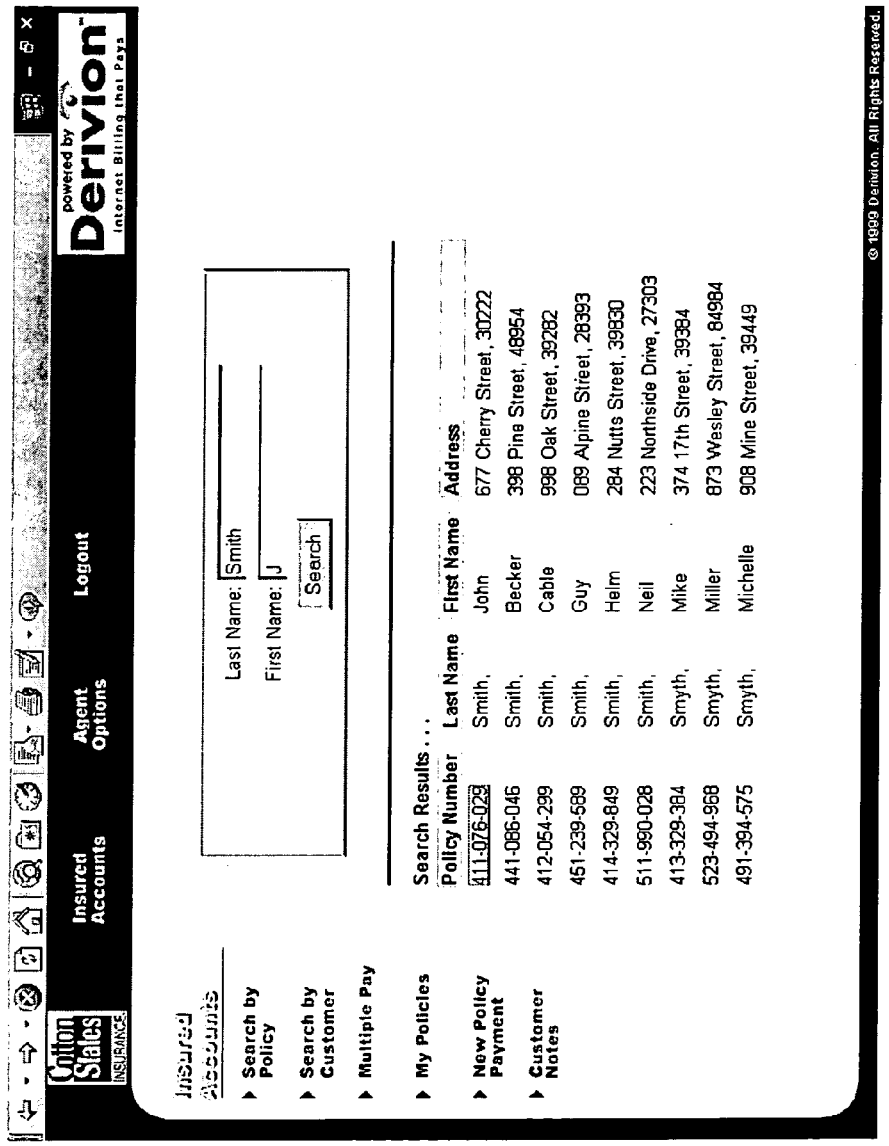
FIG. 45 is a customer name search screen shot of an agent interface generated by a preferred embodiment of systems and processes of the present invention.
Figure 46:
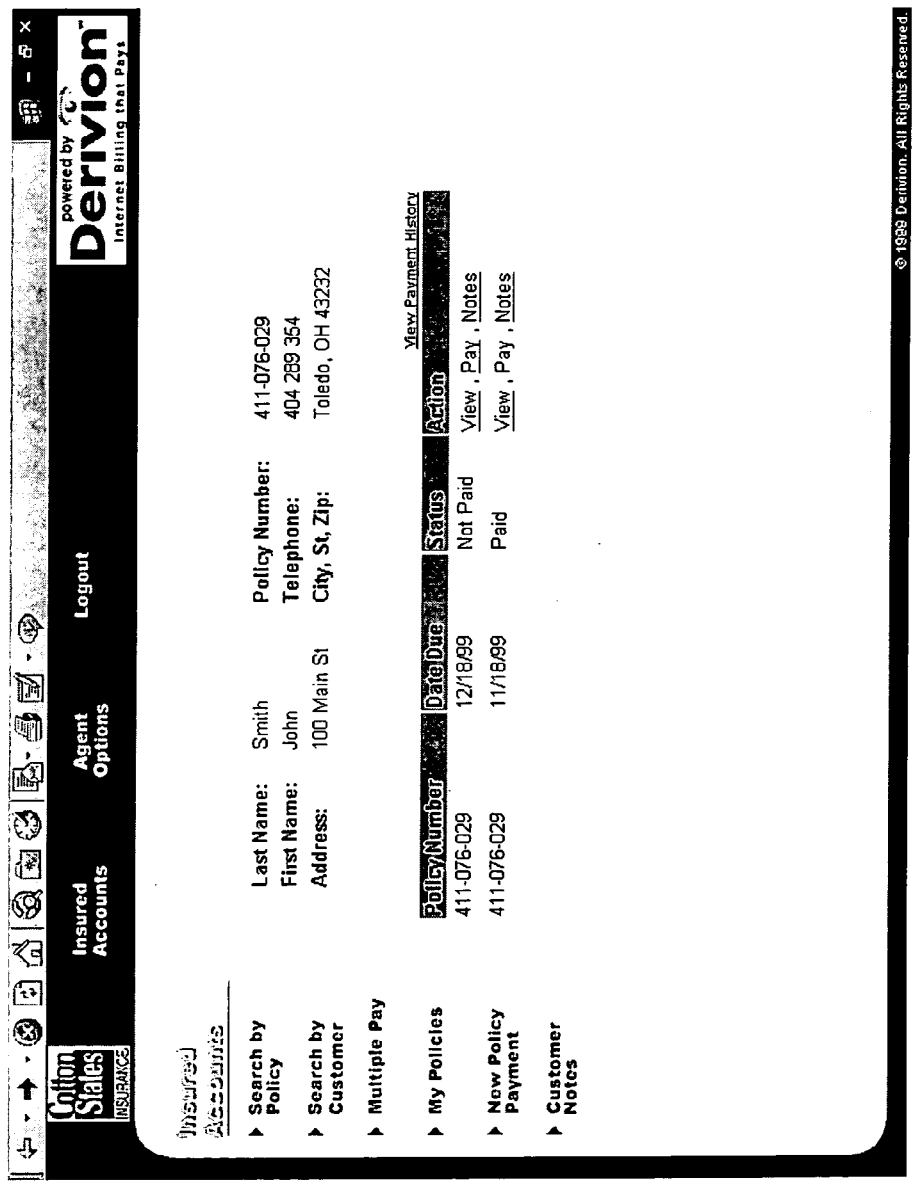
FIG. 46 is a policy information screen shot of an agent interface generated by a preferred embodiment of systems and processes of the present invention.

As mentioned above, an agent may also search for customer account information based on customer name. FIG. 45 shows a web page that enables an agent to select the appropriate customer from the search result list. FIG. 46 shows a linked web page that displays the customer account information and enables an agent to view the payment history for the customer, view the customer policy and payment schedule, make payments to the company for the customer, and send electronic messages to the customer.

Figure 47:
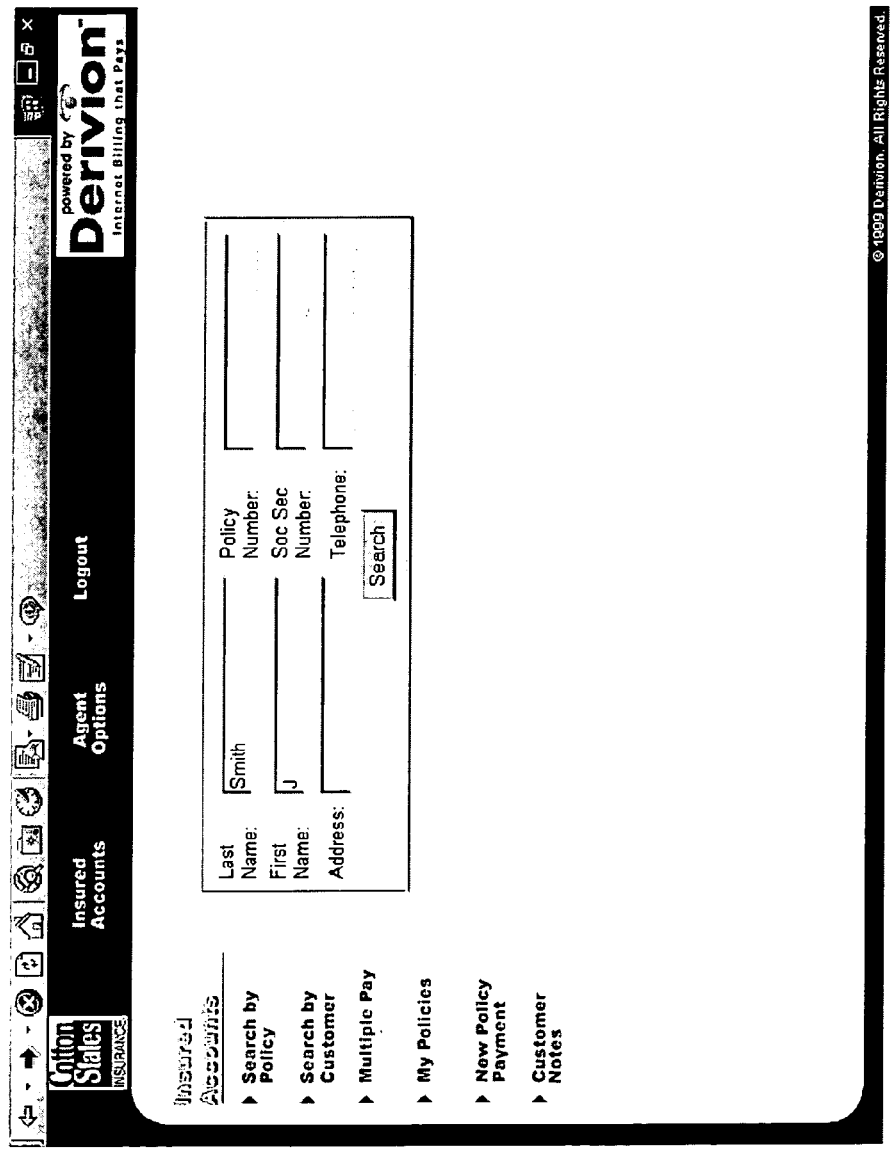
FIG. 47 is a multiple payment search screen shot of an agent interface generated by a preferred embodiment of systems and processes of the present invention.
Figure 49:
FIG. 49 is a customer policy payment screen shot of an agent interface generated by a preferred embodiment of systems and processes of the present invention.
Figure 50:
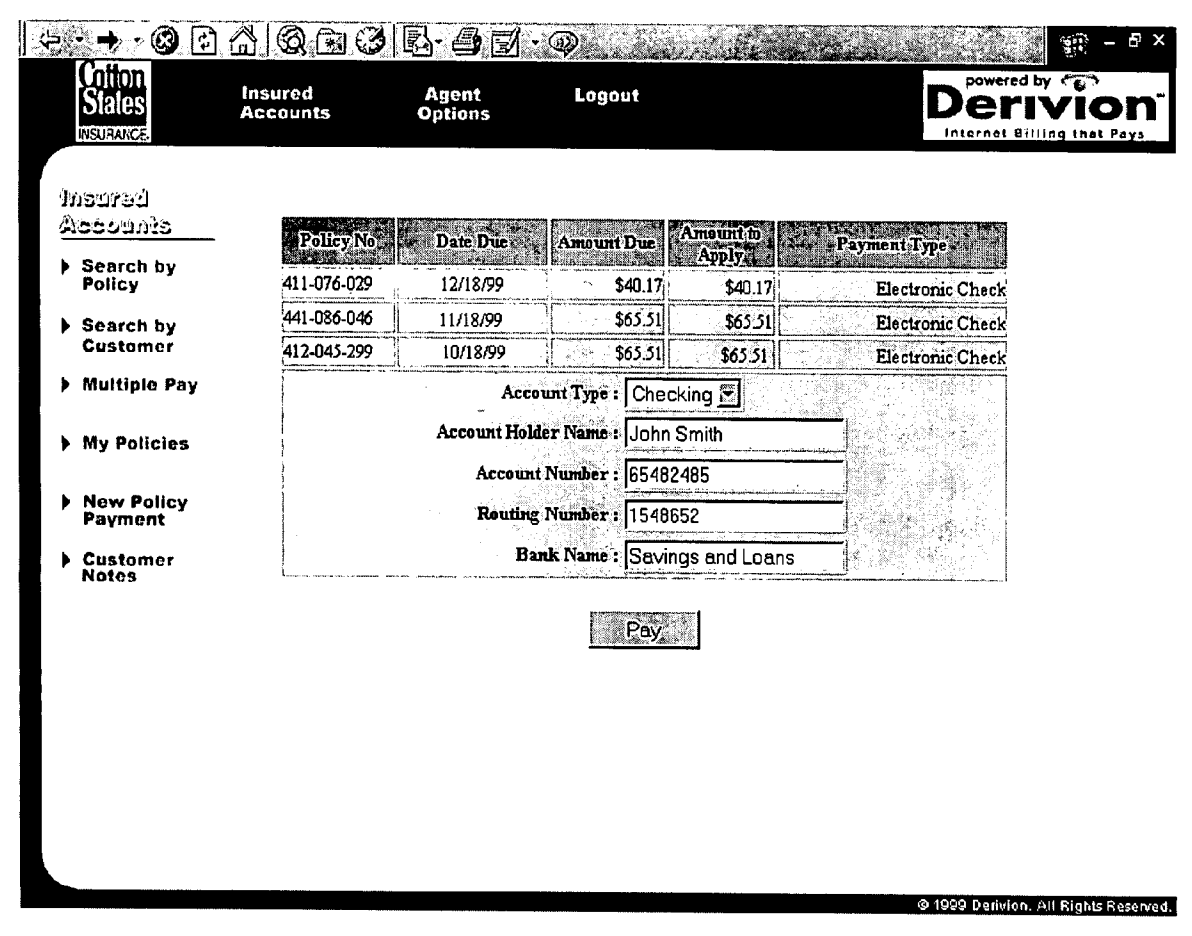
Figure 51:
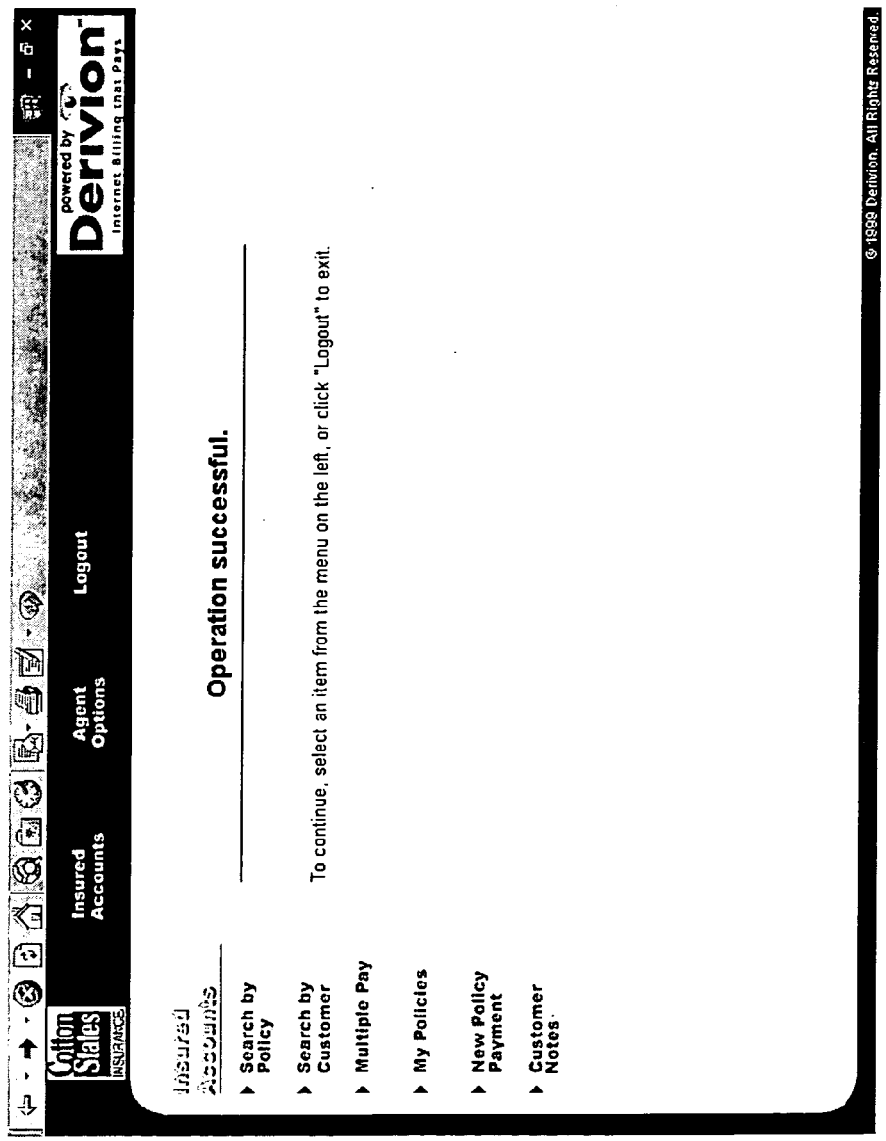
FIG. 51 is an operation successful notification screen shot of an agent interface generated by a preferred embodiment of systems and processes of the present invention.

The preferred embodiment of agent console 156 also enables efficient payment of multiple policies associated with one individual, company or other insured entity. For example, as shown in FIG. 47, an agent may search for an individual with multiple insurance policies. FIG. 48 shows a web page that displays the search results and enables an agent to select multiple policies for the same individual that the agent desires to pay. FIG. 49 shows a web page that displays the policy and account information for each policy, including the policy number, amount due, date due, amount to be applied, and the payment type, such as electronic check, money order, credit card, or cash. After the agent configures the payment parameters, as shown in FIG. 50, payment may be made and applied to the respective accounts. As shown in FIG. 51, system 11 may provide the agent with verification that the desired operation was successful.

Figure 52:
FIG. 52 is a policy list screen shot of an agent interface generated by a preferred embodiment of systems and processes of the present invention.
Figure 53A:
FIG. 53A is a portion of a customer policy display screen shot of an agent interface generated by a preferred embodiment of systems and processes of the present invention.
Figure 53B:
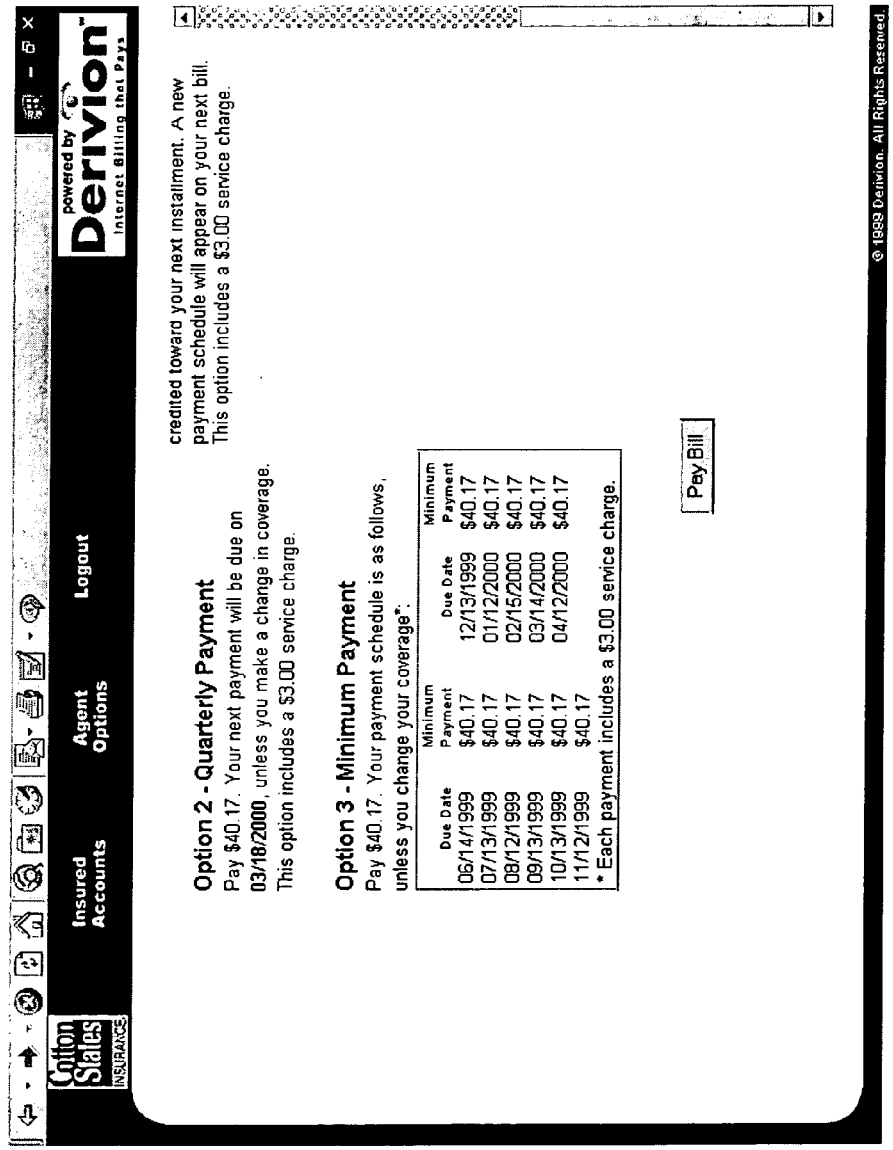
FIG. 53B is another portion of a customer policy display screen shot of an agent interface generated by a preferred embodiment of systems and processes of the present invention.

As shown in FIG. 52, an agent may also access customer account information by viewing a list of current policies. FIGS. 53A and 53B show a linked web page that enables an agent to view policy information for a selected customer and make payments for the customer as described above.

Figure 54:
FIG. 54 is a new policy payment screen shot of an agent interface generated by a preferred embodiment of systems and processes of the present invention.
Figure 55:
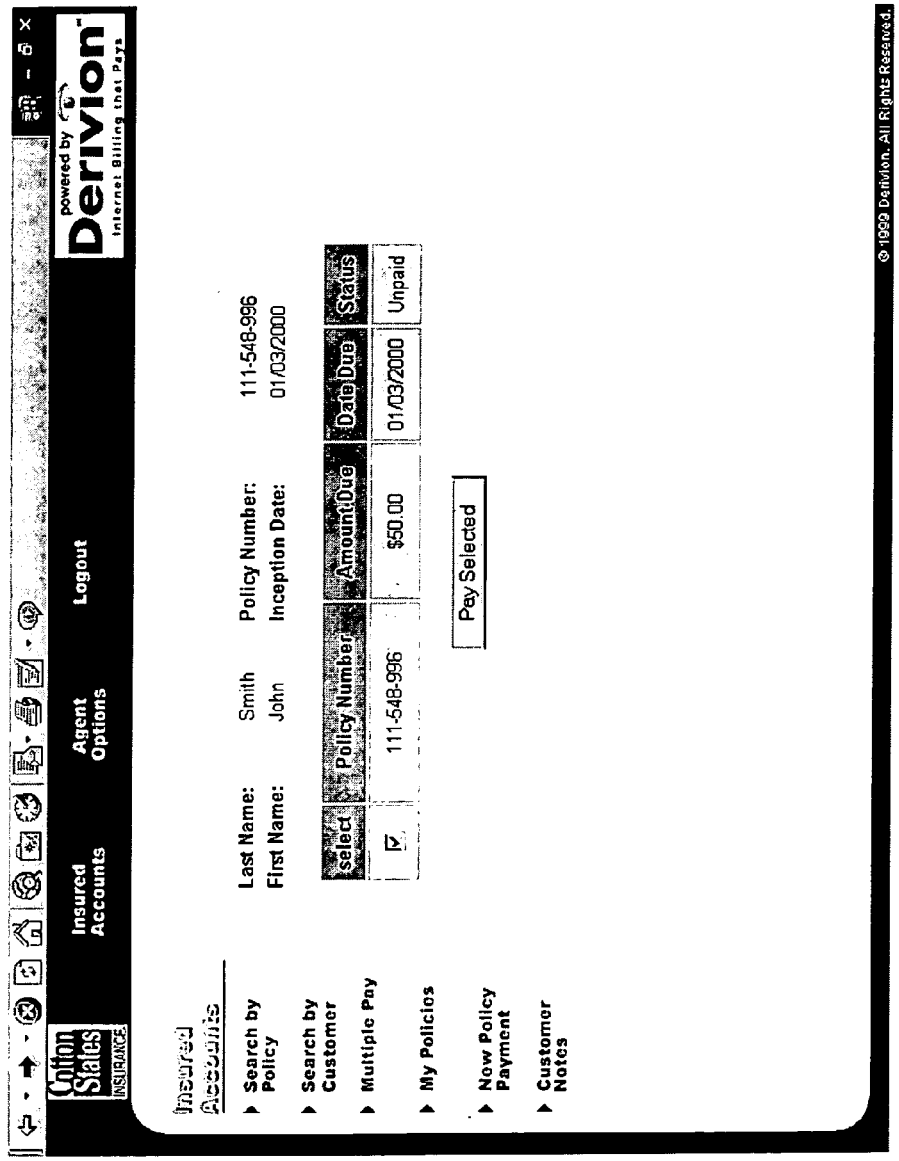
FIG. 55 is another new policy payment screen shot of an agent interface generated by a preferred embodiment of systems and processes of the present invention.
Figure 56:
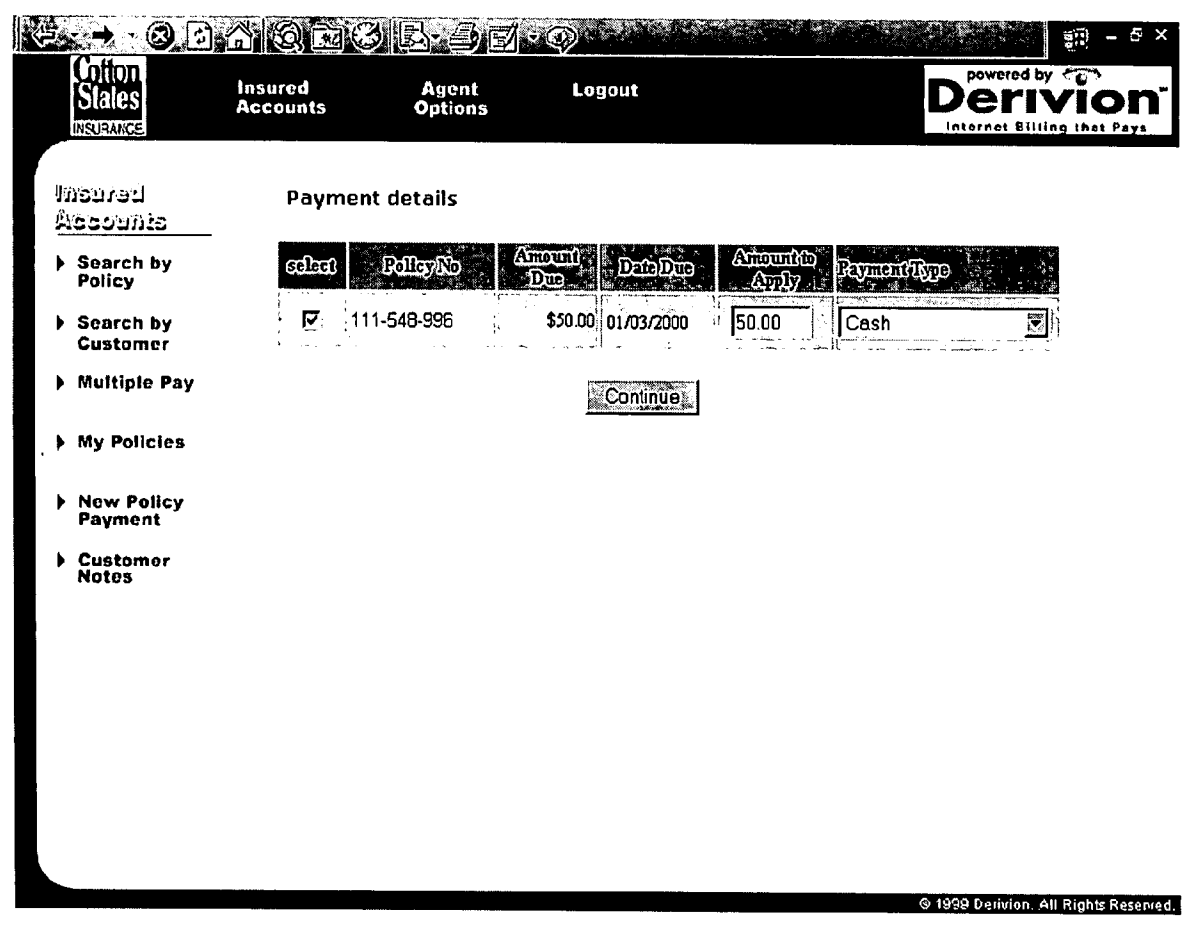
Figure 57:
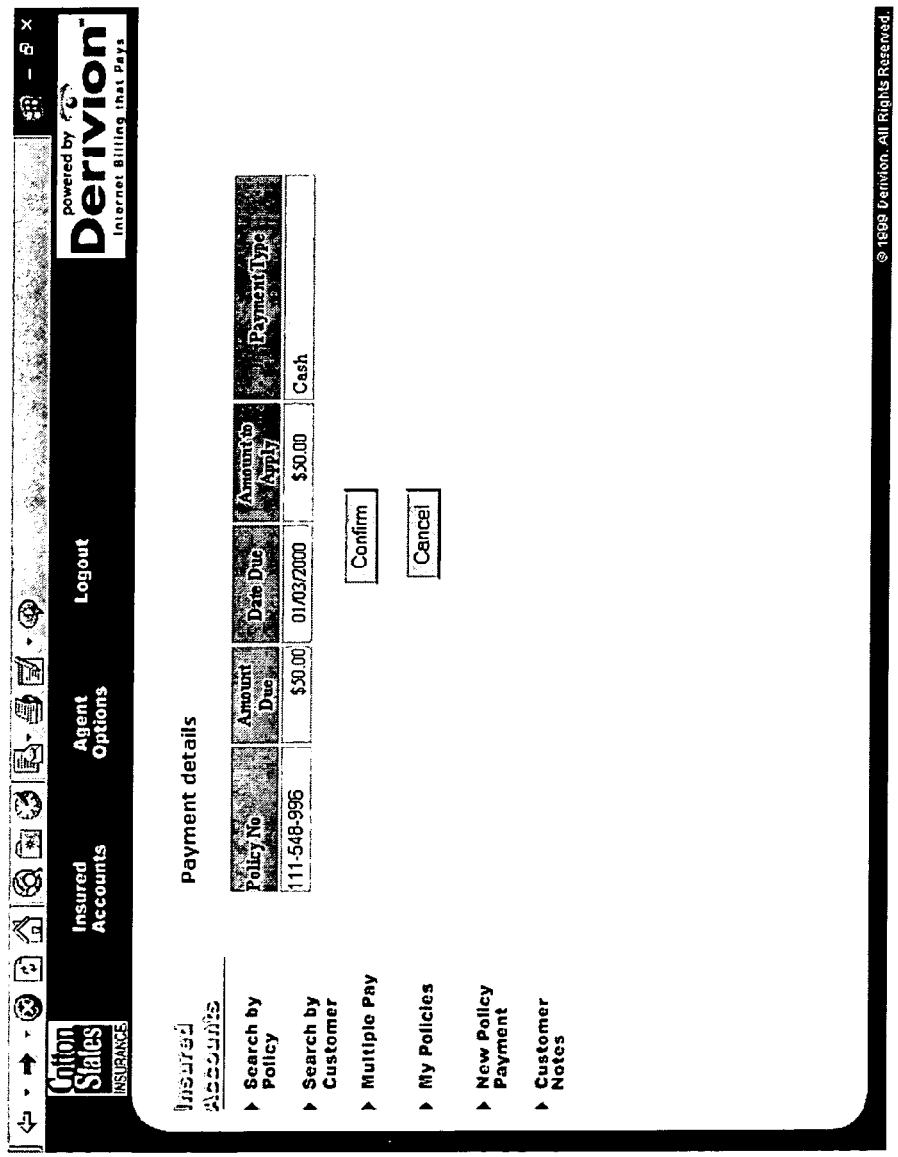
FIG. 57 is another new policy payment details screen shot of an agent interface generated by a preferred embodiment of systems and processes of the present invention.

In addition to the customer management services mentioned above, an agent may create new policies. FIG. 54 shows a web page that enables an agent to configure a new policy profile, including information, such as customer name, policy number, type of policy, such as an automobile, home or life insurance policy, payment cycle, and the amount of a current payment. As shown in FIGS. 55-57, the agent may also make initial payments for the new policy in the same manner as describe above.

Figure 58:
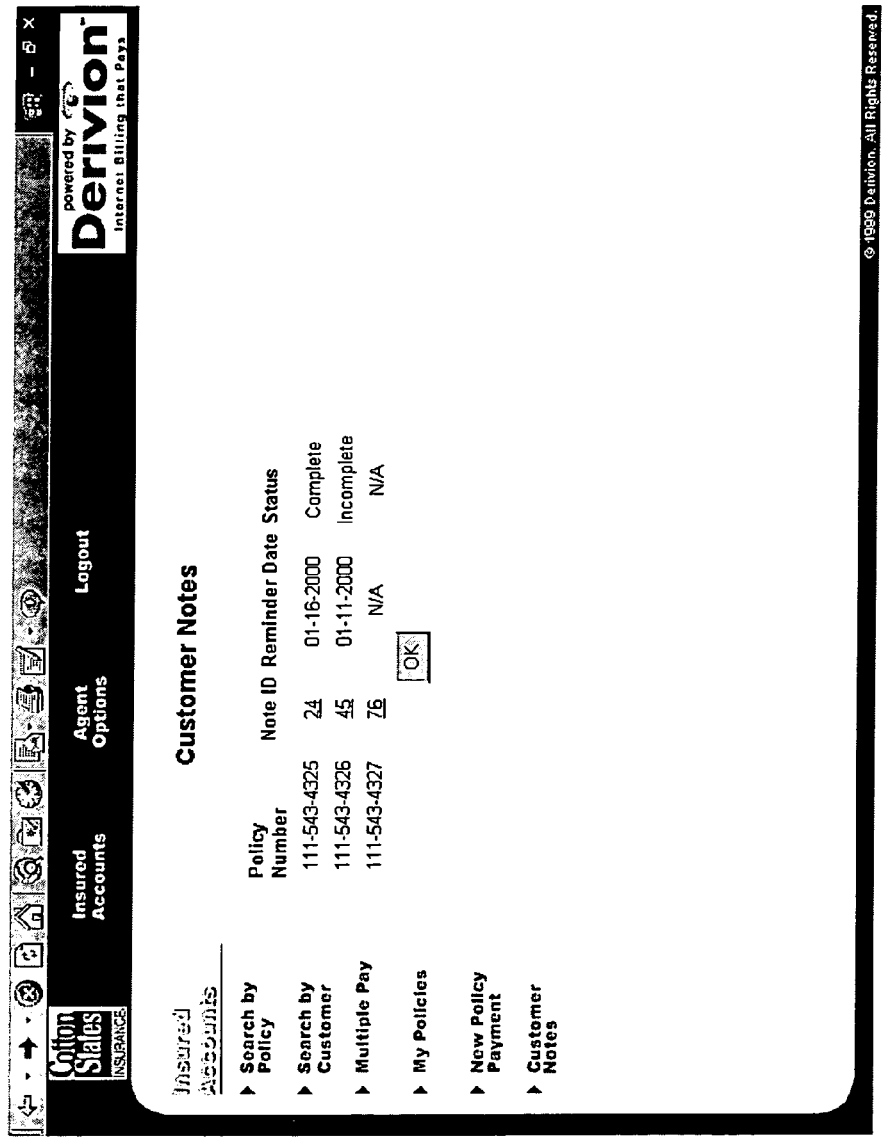
FIG. 58 is a customer notes screen shot of an agent interface generated by a preferred embodiment of systems and processes of the present invention.
Figure 59:
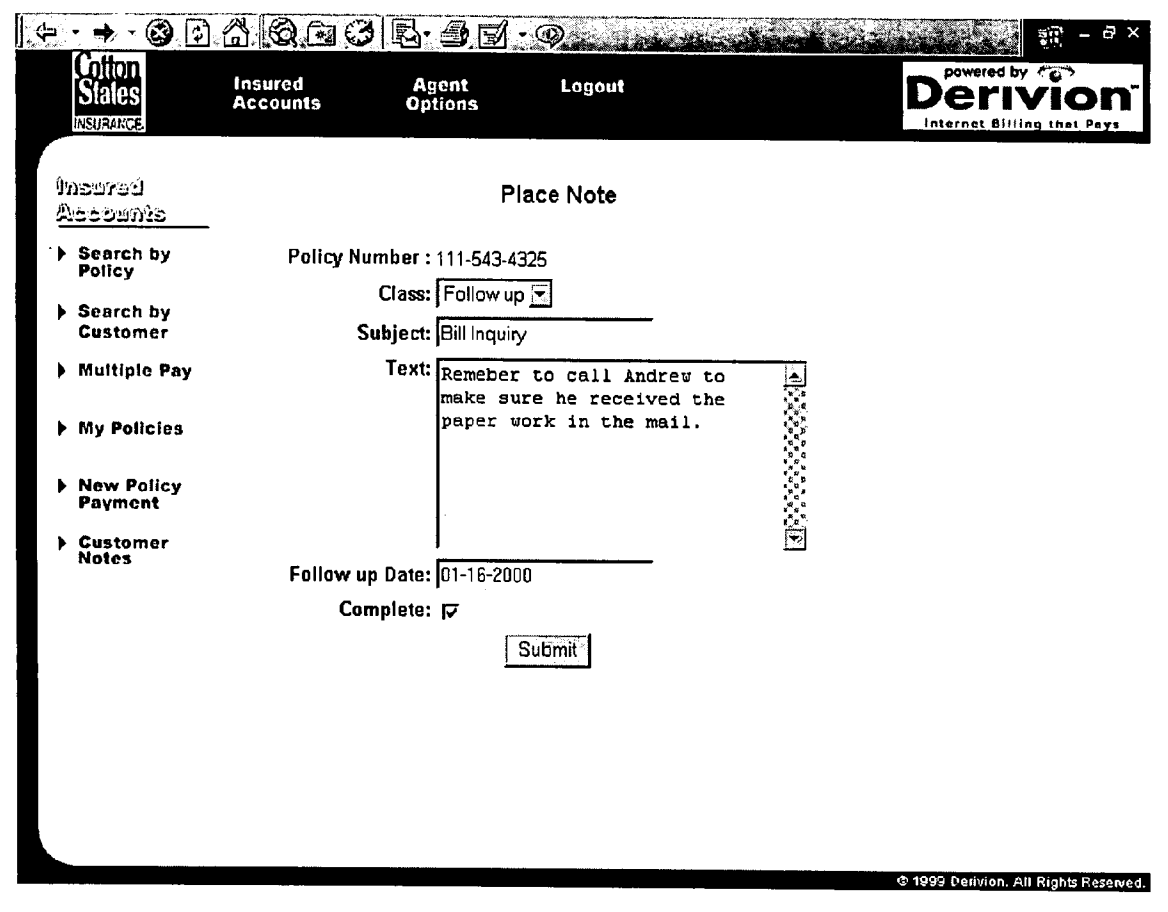

An agent may also, at any time, create and view customer notes. The agent may use the customer notes for managing customer service. For example, as shown in FIGS. 58 and 59, an agent may create a customer note reminding the agent to call a customer on a particular date to discuss a billing inquiry matter or any other customer service matter.

Figure 60:
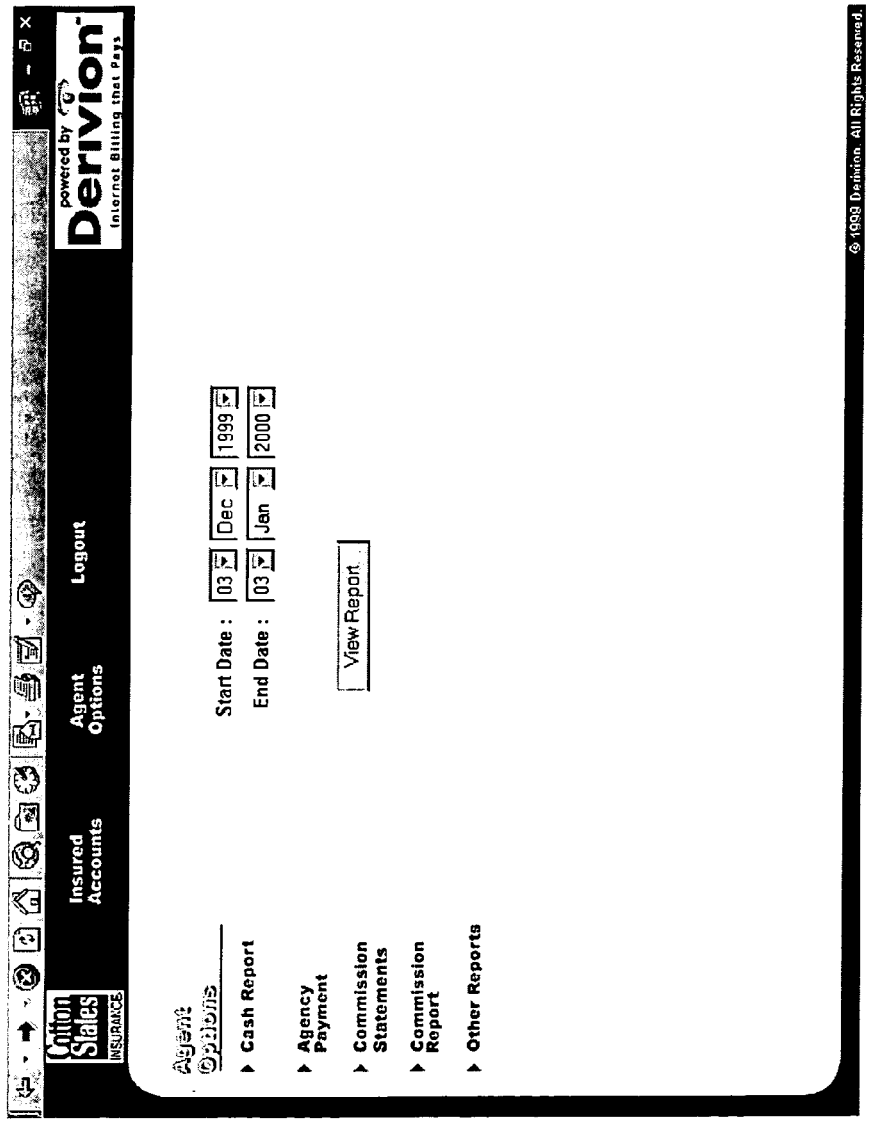
FIG. 60 is a cash report search screen shot of an agent interface generated by a preferred embodiment of systems and processes of the present invention.
Figure 61:
FIG. 61 is cash report screen shot of an agent interface generated by a preferred embodiment of systems and processes of the present invention.
Figure 62:
FIG. 62 is an agency payment screen shot of an agent interface generated by a preferred embodiment of systems and processes of the present invention.
Figure 63:
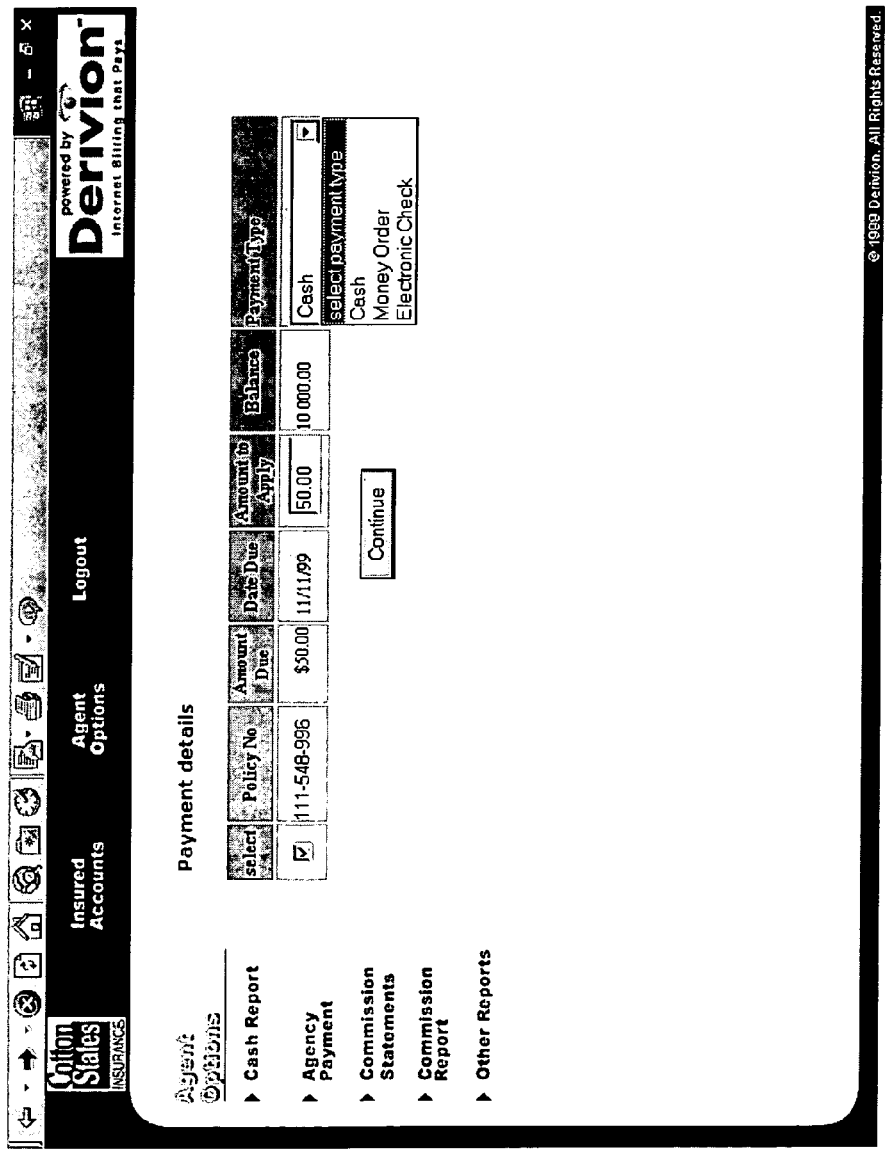
FIG. 63 is an agency payment details screen shot of an agent interface generated by a preferred embodiment of systems and processes of the present invention.
Figure 64:
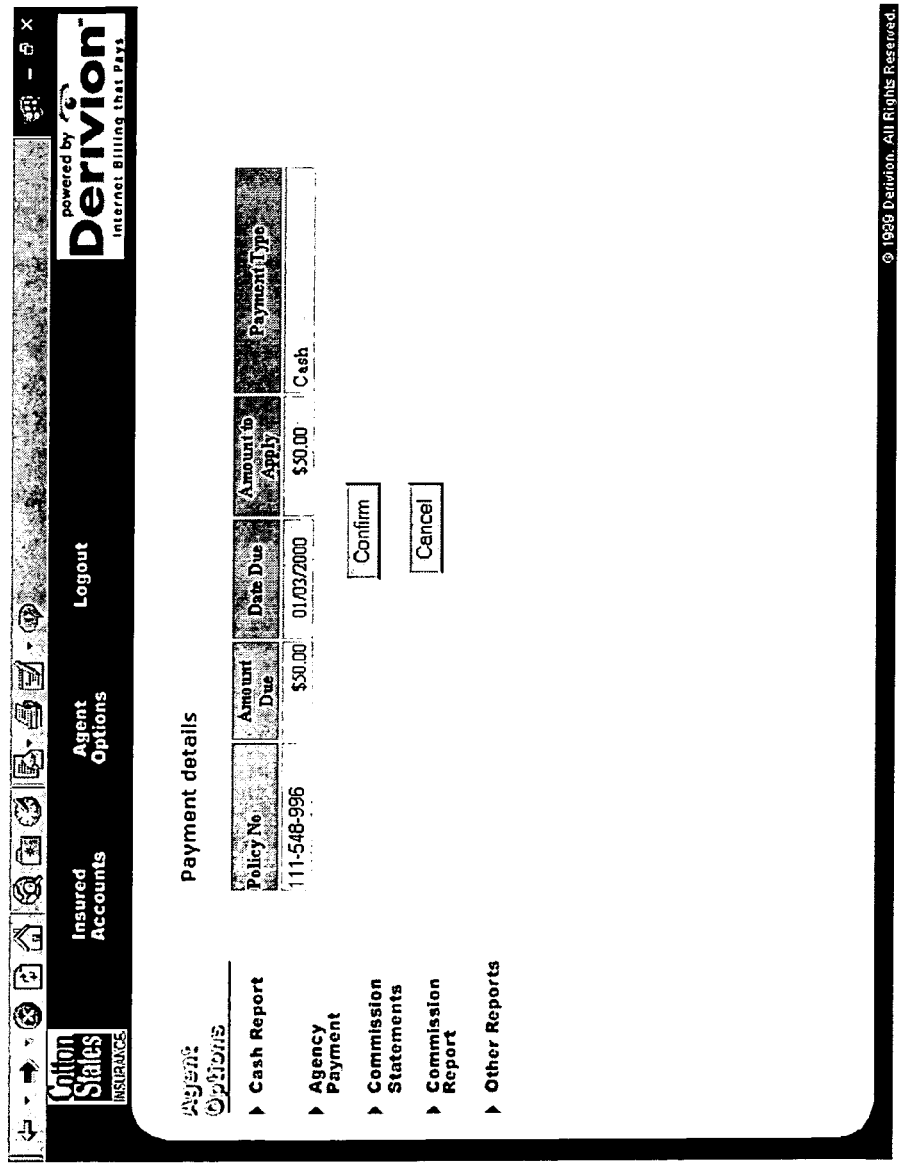
FIG. 64 is another agency payment details screen shot of an agent interface generated by a preferred embodiment of systems and processes of the present invention.

In addition to the customer management services described above, the preferred embodiment of agent console 156 also enables an agent to efficiently manage the agency relationship with the company. FIGS. 60-65, show a series of web pages that enable an agent to process and view cash reports and customer payment reports, make payments to the company, and manage agent commissions for services performed for the company. FIG. 60 shows a web page that enables an agent to select a time period and view agent transaction reports for that time period. FIG. 61 shows a linked web page that displays information related to each agent transaction that occurred during the time period, such as policy number, payment instrument and the amount paid to the agent, and an account summary, which may include information such as account balance, agency payments made, and amount owed to the company. As shown in FIG. 62, the agent may also make payment to the company. FIGS. 63 and 64 show a web page that enables an agent to select parameters for the payment to the company.

Figure 65:
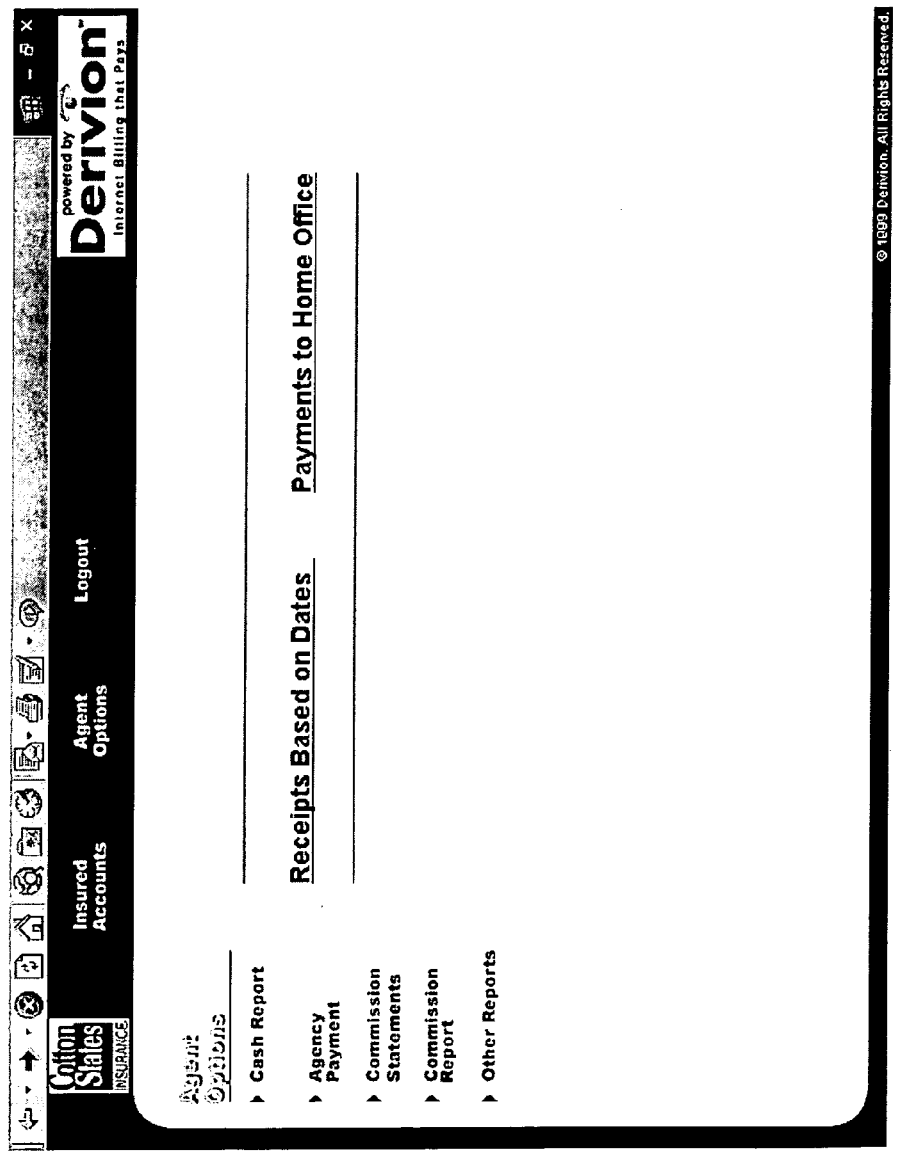
FIG. 65 is an additional reports screen shot of an agent interface generated by a preferred embodiment of systems and processes of the present invention.

The preferred embodiment of agent console 156 also enables an agent to perform a number of reporting functions related to customer receipt information and payments made to the company. As shown in FIG. 65, an agent may view, print and process receipt reports based on time period and payment type, such as cash, money orders, credit card, and checks. An agent may also view, print, and process reports of all transactions with the company.

Figure 66:
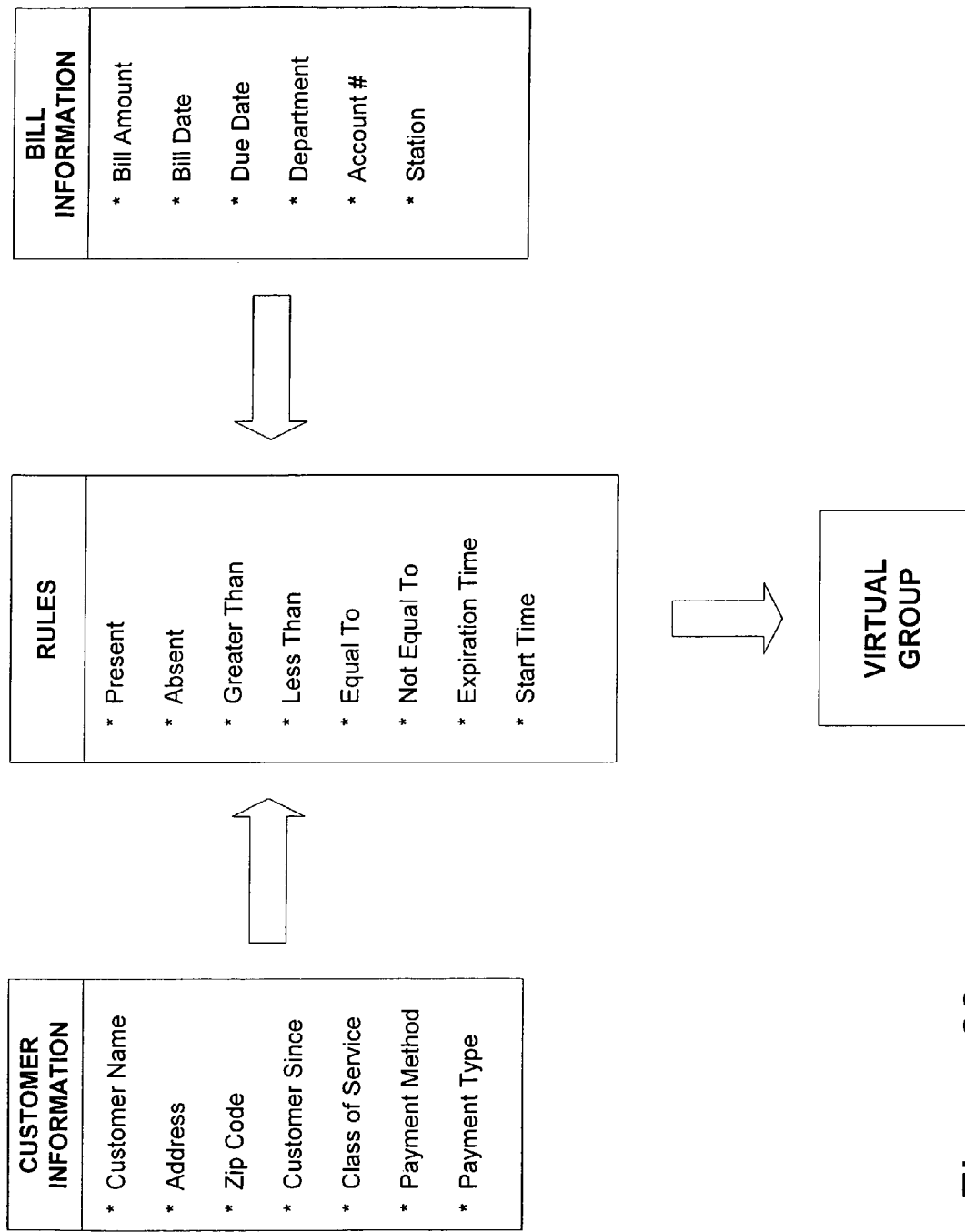
FIG. 66 is a diagram showing processes for virtual groups according to a preferred embodiment of the present invention.

FIG. 66 shows the potential for leveraging the power of systems and processes according to the present invention to create and use virtual groups of customers for purposes of customer relationship or brand building. As shown in FIG. 66, rules may be applied to data and data attributes of customer information, bill information, or any other desired information in order to classify or categorize customers, bills, or any other metadata or data stored in database 26. The virtual group may be used to alter the appearance of bills to include various content, to time delivery of the bill, to customize the bill according to certain time sensitive events, or otherwise to engage in target based marketing as it relates to bill presentment. The virtual groups can also be used to give certain incentives to those who pay regularly or who regularly pay large bills, such as applying discounts or assigning customer service reps, or awarding frequent user points. The rules may be applied at the parsing stage, at the presentment stage or any other desired point in the EBPP processes carried out by the present invention. The opportunities to use the virtual groups are unlimited; power companies can leverage from their billing base stored on database 26 combined with virtual groups to inform customers via e-mail in zip code 30327 that their power will be off from 4 to 4:30 or that power will be discounted during certain portions of the day, for example. The virtual group functionality may accordingly interact not only with the database 26, but also with any desired functionality shown in FIG. 7.

The foregoing is provided in order to disclose the invention in accordance with the patent laws, and more particularly to disclose preferred embodiments of systems and processes according to the present invention. Modifications, adaptations, and changes may be made to what is disclosed without departing from the scope or spirit of the invention, which is to provide EBPP systems and process which use a common document model/common data model into which biller data from a wide range of billers fits, in order to allow billers to outsource the billing responsibility to an EBPP organization while retaining control over and access to their data and the billing process, and accommodating the interest of customers, financial institutions and other parties as well.

What is claimed is:

1. An electronic bill presentment and payment system for presenting and paying bills via an electronic data network, comprising:
   (a) an input processing engine adapted to receive billing data from a plurality of billers in a plurality of different billing data forms;
   (b) a parsing engine adapted to parse the billing data received from the plurality of billers in a plurality of different billing data forms to transform the billing data into a common document model wherein the transformed billing data is all of the same form;
   (c) a database stored in a computer-readable medium adapted to store the transformed billing data parsed by the parsing engine;
   (d) a presentation engine coupled to the database and adapted to retrieve transformed billing data from the database and to output at least some of the retrieved transformed billing data via the electronic data network for use by bill payers; and
   (e) a biller interaction management component coupled to the database and adapted to allow the plurality of billers individually to retrieve and review transformed billing data from the database and to alter the transformed billing data in the database.

2. The system according to claim 1 wherein the electronic data network is the Internet.

3. The system according to claim 1 wherein the parsing engine is adapted to parse the billing data received from the plurality of billers to transform the billing data into a common document model using rules of conversion and a rules application process.

4. The system according to claim 3 wherein the rules of conversion are defined by an operator using a uniform rules definition language.

5. The system according to claim 1 wherein the common document model is adapted to accommodate the transformed billing data from the plurality of billers and wherein each of the plurality of billers has a subset of data and attributes accommodated by the common document model.

6. The system according to claim 1 comprising additionally a third party interactive management component coupled to the database and adapted to allow a third party to retrieve for review transformed billing data from the database and to alter the transformed billing data in the database.

7. The system according to claim 1, wherein said parsing engine is adapted to parse data from a print stream of data provided by said plurality of billers.

8. The system according to claim 1, wherein said parsing engine is adapted to parse data from a data interchange stream of data provided by said plurality of billers.

9. The system according to claim 1, wherein said parsing engine is adapted to parse data from a financial data stream provided by said plurality of billers.

10. The system according to claim 1, wherein said presentation engine is adapted to output transformed billing data for use by said bill payers using financial software.

11. The system according to claim 1, wherein said presentation engine is adapted to output transformed billing data for use by said bill payers not using financial software.

12. The system according to claim 1, wherein said presentation engine is adapted to output transformed billing data for use by said bill payers using a browser.

13. The system according to claim 1, wherein said presentation engine employs style sheet functionality in order to render transformed billing data in a form suitable for said bill payers.

14. The system according to claim 1, wherein transformed billing data is provided to said bill payers using markup language.

15. The system according to claim 1, further comprising a customer service and interaction management component adapted to detect and respond to communications from said bill payers by at least (i) retrieving transformed billing data from said database and presenting it to said bill payers in a form requested by said bill payers; and (ii) altering transformed billing data in said database corresponding to said bill payers according to said communications.

16. The system according to claim 1, wherein the biller interaction management component is adapted to allow said plurality of billers to alter appearance and content of bills presented to said bill payers, said biller interface allowing said plurality of billers to communicate with said bill payers regarding said bills.

17. The system according to claim 6, wherein the third party interactive management component is a financial source interface adapted to send and receive communications to and from at least one financial entity and to alter the transformed billing data in said database according to said financial source communications.

18. A method for presenting and paying bills via an electronic data network, comprising:
(a) receiving electronic billing data from a plurality of billers in a plurality of different billing data forms;
(b) parsing in a computer the electronic billing data received from the plurality of billers in a plurality of different billing data forms to transform the billing data into a common document model wherein the transformed billing data is all of the same form;
(c) a computer database adapted to store the transformed billing data parsed by the parsing functionality;
(d) retrieving transformed billing data from the database and outputting at least some of the retrieved transformed billing data via the electronic data network for use by bill payers; and
(e) detecting and responding to electronic communications from the plurality of billers to allow the plurality of billers individually to retrieve and review transformed billing data from the database and to alter the transformed billing data in the database.

19. The method according to claim 18 wherein the electronic data network is the Internet.

20. The method according to claim 18 wherein the parsing the billing data received from the plurality of billers to transform the billing data into a common document model includes parsing the billing data in a computer using rules of conversion and a rules application process.

21. The method according to claim 20 comprising additionally defining the rules of conversion using a uniform rules definition language.

22. The method according to claim 18 wherein the common document model is adapted to accommodate the transformed billing data from the plurality of billers and wherein each of the plurality of billers has a subset of data and attributes accommodated by the common document model.

23. The method according to claim 18 comprising additionally detecting and responding to communications from a third party to allow the third party to retrieve for review transformed billing data from the database and to alter the transformed billing data in the database.

24. The system according to claim 1 additionally comprising a consumer interface component adapted to allow said bill payers to pay bills electronically.

25. The system according to claim 1 wherein the biller interaction management component allows said plurality of billers to identify market segments of said bill payers according to market rules and information retrieved from said database.

26. The system according to claim 6 wherein the third party interactive management component includes an agent interface coupled to the database and adapted to allow a plurality of agents having agency relationships with said plurality of billers to communicate with said bill payers regarding bills.

27. The system according to claim 1 wherein the input processing engine includes a modularized input processing engine adapted to preprocess billing data corresponding to a plurality of data types from the plurality of billers and providing the preprocessed billing data to the parsing functionality for parsing.

28. The method of claim 18, wherein said billing data is received as a print stream of data provided by said plurality of billers.

29. The method of claim 18, wherein said billing data is received as a data interchange stream of data provided by said plurality of billers.

30. The method of claim 18, wherein said billing data is received as a financial data stream provided by said plurality of billers.

31. The method of claim 18, wherein said at least some of said transformed billing data is output for use by said bill payers using financial software.

32. The method of claim 18, wherein said at least some of said transformed billing data is output for use by said bill payers not using financial software.

33. The method of claim 18, wherein said at least some of said transformed billing data is output for use by said bill payers using a browser.

34. The method of claim 18, wherein said at least some of said transformed billing data is output using style sheet functionality in order to render information in a form suitable for said bill payers.

35. The method of claim 18, wherein said at least some of said transformed billing data is provided to said bill payers using markup language.

36. The method of claim 18, further comprising the step of detecting and responding to communications from bill payers by at least (i) retrieving transformed billing data from said database and presenting it to said bill payers in a form requested by said bill payers and (ii) altering transformed billing data in said database corresponding to said bill payers according to said communications.

37. The method of claim 18, further comprising the step of allowing said plurality of billers to alter appearance and content of bills presented to said bill payers.

38. The method of claim 18, further comprising the step of allowing said plurality of billers to communicate with said bill payers regarding said bills.

39. The method of claim 23, wherein detecting and responding to communications to and from a third party included detecting and responding to communication from at least one financial entity and altering and storing information according to said communications.

40. The system of claim 24, wherein said consumer interface component is adapted to allow said bill payers to specify the location of said output.

41. A system according to claim 25, wherein said biller interaction management component is further adapted to allow said plurality of billers to alter appearance and content of bills presented to said bill payers based on said market segments.

42. A system according to claim 25, wherein said biller interaction management component is further adapted to allow said plurality of billers to send marketing messages to said bill payers based on said market segments.

43. A system according to claim 25, wherein said biller interaction management component is further adapted to allow said plurality of billers to communicate with said bill payers based on said market segments.

44. A system according to claim 1, wherein said biller interaction management component and said presentation engine are further adapted to present substantially the same information to said plurality of billers and said bill payers in order to allow said plurality of billers to interact with said bill payers regarding said same information.

\* \* \* \* \*